(12) United States Patent
Ziegler et al.

(10) Patent No.: US 10,803,624 B2
(45) Date of Patent: Oct. 13, 2020

(54) APPARATUS FOR PROVIDING CALIBRATION DATA, CAMERA SYSTEM AND METHOD FOR OBTAINING CALIBRATION DATA

(71) Applicant: Fraunhofer-Gesellschaft zur Foerderung der angewandten Forschung e.V., Munich (DE)

(72) Inventors: Matthias Ziegler, Erlangen (DE); Frederik Zilly, Stuttgart (DE); Joachim Keinert, Nuremberg (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/586,077

(22) Filed: Sep. 27, 2019

(65) Prior Publication Data

US 2020/0027243 A1  Jan. 23, 2020

Related U.S. Application Data

(63) Continuation of application No. PCT/EP2018/025077, filed on Mar. 28, 2018.

(30) Foreign Application Priority Data

Mar. 29, 2017  (EP) .................................... 17163601

(51) Int. Cl.
*G06T 7/80* (2017.01)
*H04N 13/246* (2018.01)

(52) U.S. Cl.
CPC ............. *G06T 7/85* (2017.01); *H04N 13/246* (2018.05); *G06T 2207/20088* (2013.01); *G06T 2207/30244* (2013.01)

(58) Field of Classification Search
CPC ............. G06T 7/85; G06T 2207/20088; G06T 2207/30244; H04N 13/246
See application file for complete search history.

(56) References Cited

U.S. PATENT DOCUMENTS 7,512,261 B2  3/2009 Lou et al.
2009/0153669 A1  6/2009 Kim et al.
(Continued)

FOREIGN PATENT DOCUMENTS

DE  102008040985 A1  2/2010
DE  102012001858 A1  9/2012
(Continued)

OTHER PUBLICATIONS

Bajramovic, Ferid, "Self-calibration of Multi-camera Systems", Logos Verlag Berlin GmbH, 2010.
(Continued)

*Primary Examiner* — Jamie J Atala
*Assistant Examiner* — Hesham K Abouzahra
(74) *Attorney, Agent, or Firm* — Perkins Coie LLP; Michael A. Glenn

(57) ABSTRACT

An apparatus comprises a first interface for receiving a plurality of partially overlapping images of an object from a corresponding plurality of cameras being arranged along a first and a second direction according to a camera pattern. The apparatus comprises an analyzing unit configured for selecting at least one corresponding reference point in an overlap area of a set of images, and for determining displacement information along the first and the second direction of the reference point in each of the other images of the set of images. A misalignment of the plurality of images along the first and the second direction is compensated by the displacement information so as to obtain aligned images. The apparatus comprises a determining unit configured for
(Continued)

determining offset information between principal points of the plurality of cameras using at least three aligned images. The apparatus comprises a second interface for providing calibration data based on the displacement information and based on the offset information. The calibration data allows for calibrating the plurality of images so as to comply to the camera pattern.

18 Claims, 18 Drawing Sheets

(56) References Cited

U.S. PATENT DOCUMENTS

| | | |
|---|---|---|
| 2011/0211046 A1 | 9/2011 | Stumber et al. |
| 2017/0163967 A1 | 6/2017 | Maier |

FOREIGN PATENT DOCUMENTS

| | | |
|---|---|---|
| EP | 2375376 B1 | 9/2013 |
| EP | 2917895 A1 | 9/2015 |
| EP | 2571261 B1 | 3/2016 |
| EP | 2697976 B1 | 6/2016 |
| WO | 2014072511 A1 | 5/2014 |

OTHER PUBLICATIONS

Ciurea, Florian et al., "Adaptive Geometric Calibration Correction for Camera Array", Electronic Imaging, 2016(13), 2016, 1-6.
Hartley, Richard et al., "Multiple View Geometry", Cambridge University Press, 2003, uploaded in 3 parts.
Ide, Kai et al., "Automating multi-camera self-calibration", Applications of Computer Vision (WACV), 2009 Workshop on. IEEE, 2009.
Kang, Yun-Suk et al., "An efficient rectification algorithm for multi-view images in parallel camera array 3DTV Conference: The true Vision—Capture", Transmission and Display of 3D Video, 2008.
Kurillo, Gregorij et al., "Geometric and color calibration of Multiview panoramic cameras for life-size 3D immersive video", In 3D Vision-3DV 2013, 2013 International Conference on (pp. 374-381). IEEE, Jun. 2013, pp. 374-381.
Li, Zeyu et al., "Projective epipolar rectification for a linear multi-imager array", In 3DPVT (2010), 2010.
Svoboda, Tomas et al., "A convenient multicamera selfcalibration for virtual environments", Presence 14.4, 2005, 407-422.
Wilburn, Bennett et al., "High Performance Imaging Using Large Camera Arrays", Proc. of ACM SIGGRAPH 2005, vol. 24, No. 3, 2005, pp. 765-776.
Xu, Yichao et al., "Camera array calibration for light field acquisition", Frontiers of Computer Science, 9(5), 2015, 691-702.
Zhang, Zhengyou, "A flexible new technique for camera calibration", Pattern Analysis and Machine Intelligence, IEEE Transactions on, 22(11), 1330-1334.
Zilly, Frederik et al., "Multi-camera rectification using linearized trifocal tensor", 21st International Conference on Pattern Recongition (ICPR), 2012.
Zilly, Frederik, Method for the automated analysis, control and correction of stereoscopic distortions and parameters for 3D-TV applications, TU Berlin, 2015, http://dx.doi.org/10.14279/depositonce-4618, 2015, uploaded in 3 parts.

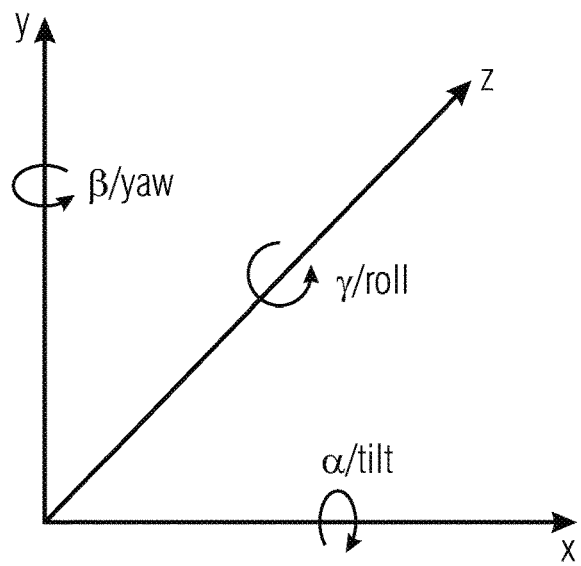
Fig. 2c
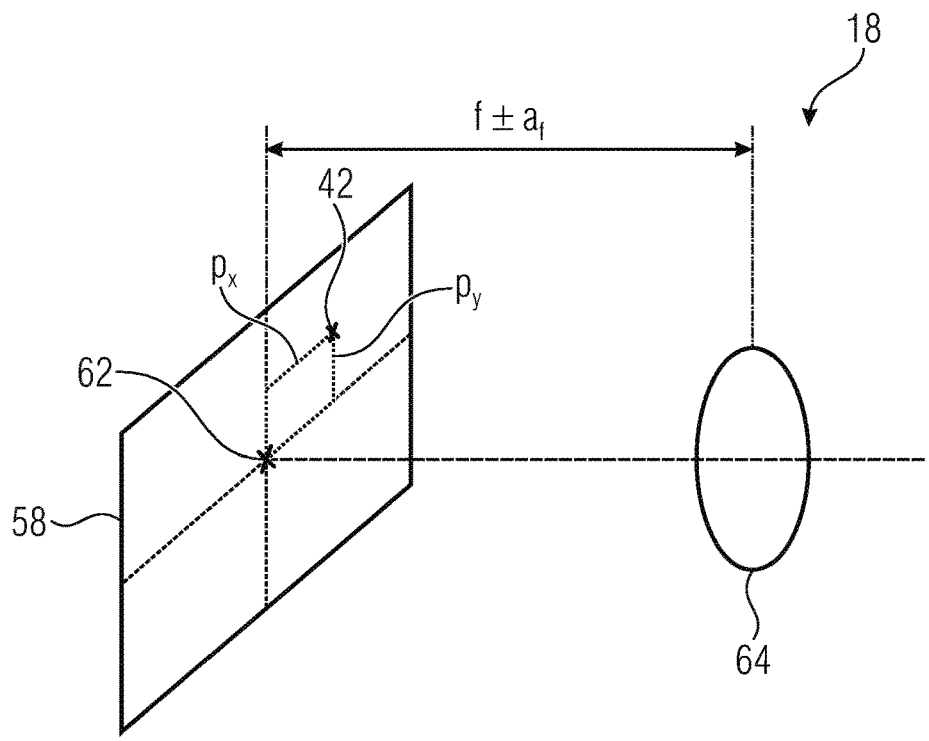
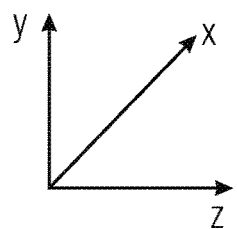
Fig. 2d

500

- 510: Receiving a plurality of partially overlapping images of an object from a corresponding plurality of cameras being arranged along a first and a second direction according to a camera pattern

- 520: Selecting a reference point in an overlap area of one of the images, and determining a displacement information along the first and the second direction of the reference point in each of the other images, such that a misalignment of the plurality of images along the first and the second direction is compensated by the displacement information so as to obtain aligned images

- 530: Determining a distance information between principal points of the plurality of cameras using at least three aligned images

- 540: Providing calibration data based on the displacement information and based on the distance information, the calibration data allowing for calibrating the plurality of images so as to comply to the camera pattern

Fig. 5

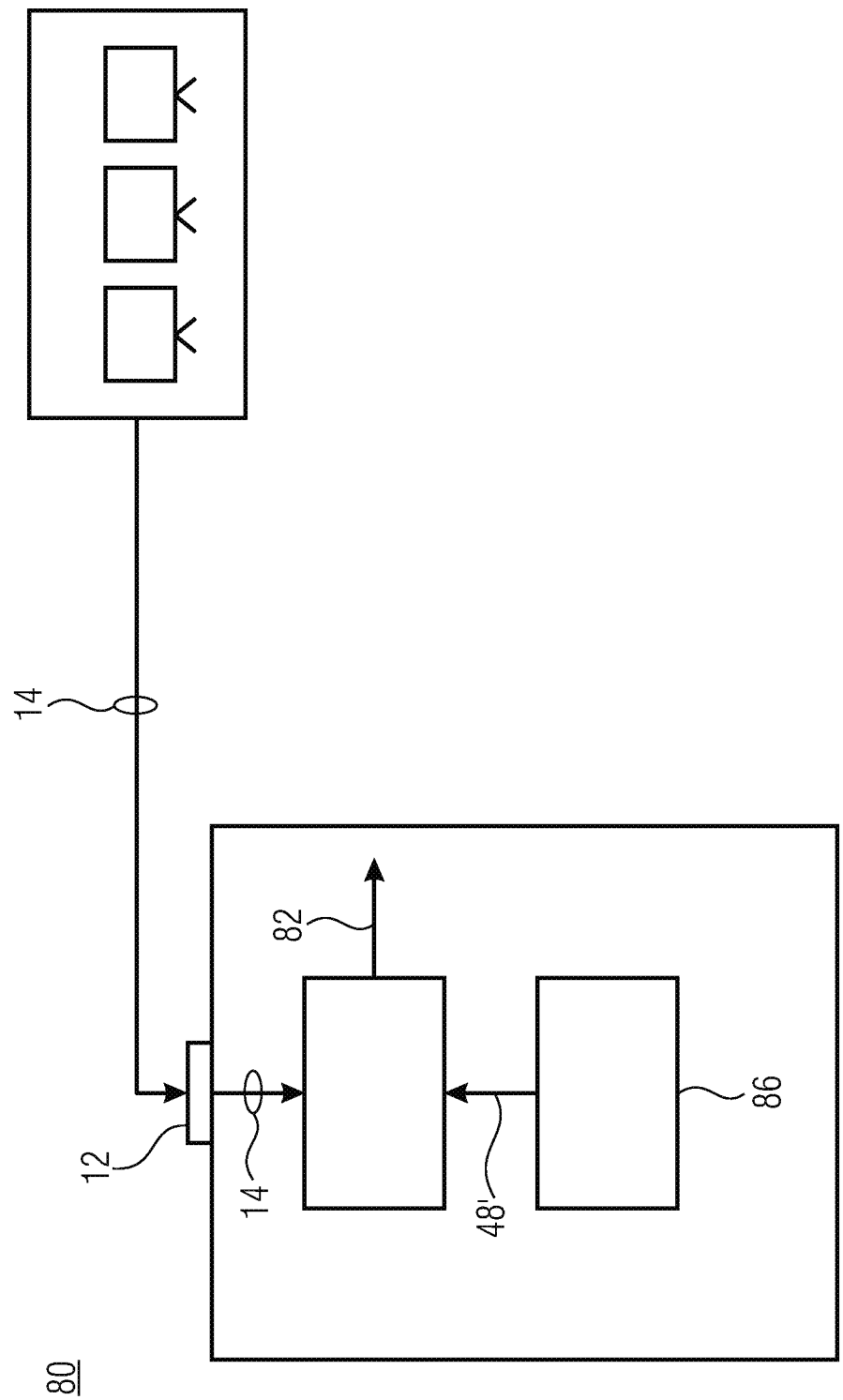

APPARATUS FOR PROVIDING CALIBRATION DATA, CAMERA SYSTEM AND METHOD FOR OBTAINING CALIBRATION DATA

CROSS-REFERENCE TO RELATED APPLICATIONS

This application is a continuation of copending International Application No. PCT/EP2018/025077, filed Mar. 28, 2018, which is incorporated herein by reference in its entirety, and additionally claims priority from European Application No. EP 17163601.2, filed Mar. 29, 2017, which is also incorporated herein by reference in its entirety.

The present invention is directed to an apparatus for providing calibration data, in particular, for calibrating images from a plurality of cameras. The present invention is further directed to a camera system, to a method for obtaining calibration data and to a non-transitory storage medium having stored thereon a computer program. The present invention is further directed to a multi-camera rectification for planar and non-planar camera arrays.

BACKGROUND OF THE INVENTION

Multi-camera systems are the base for modern visual effects like refocus or novel-view-synthesis as well as geometric analysis and depth reconstruction. An important requirement for high quality and high efficiency image processing is precise camera positioning and orientation. Due to mechanical deviations, like small deviations from an ideal orientation, this requirement is, in general, not met.

The general task of camera calibration is to estimate values for the internal (intrinsic) and external (extrinsic) parameters of a (digital) camera. The most important intrinsic parameters are focal length and principal point of the camera. Extrinsic parameters denote position and orientation of a camera. In the context of media production, camera calibration is, for example, needed when one likes to add computer generated (CG) objects to the scene: When the physical camera is moving through the scene, the computer generated objects shall move consistently with the real world objects. Therefore, the path of the camera through the scene needs to be known precisely to control the path of a CG camera in a 3D environment. This process is also known as camera tracking or match-moving.

In case of stereoscopic productions, camera images need to be aligned such that corresponding image points are in the same image line. Such a precise alignment is, in general, not possible by mechanical setups and needs to be done by digital image processing. This process is also known as rectification. A typical stereoscopic production usually involves two identical cameras precisely mounted on a rig. This initial, mechanical calibration ensures that camera images are already close to the rectified state. A more general approach for stereoscopic production is presented in [1]. In this work, three cameras on a line are used to virtually manipulate the interocular distance of the stereo system. Therefore, the stereo calibration process is extended towards a three camera system.

A widely used camera model is the pinhole camera. It is typically described by up to 11 individual parameters composed in the projection matrix P. These 11 parameters are focal length (horizontal and vertical), skew, principal point (horizontal and vertical), orientation comprising 3 angular components and location comprising three components of a 3D coordinate. This matrix may also be represented as a product of the camera matrix K, the rotation matrix R and the position C of the camera given as a 3D world coordinate. More parameters such as to model lens-distortion can be added if needed yielding more than 11 parameters.

Estimating intrinsic and extrinsic parameters for a single camera or a system of cameras can be done using calibration charts or based purely on images. In the first case, usage of calibration charts allows the reconstruction of camera parameters in metric units; for example, a focal length of the camera may be given in a mm unit, i.e., millimeters. Such a calibration needs to be done right before or after capturing a shot on a set. The calibration chart is placed in front of the cameras and each camera captures an image of the chart. It is important that the physical properties such as focal length, orientation or position of a multi-camera system do not change between the calibration shot and the shot one wants to capture and process. Otherwise, calibration might be unreliable. However, many algorithms known for calibrating multi-camera systems entail that the calibration chart is completely visible in every image. For large camera arrays, this is challenging.

The second case is widely known as self-calibration or auto-calibration and typically needs at least two images from a set of stereo cameras or two images from the same camera taken at different positions. The advantage of self-calibration compared to methods using calibration charts is that the cameras can be calibrated even if the captured content was not specifically intended for calibration. This is, for example, the case when the content was not intentionally shot for integration of CG elements but integrating CG elements is needed in post-production. In contrast to chart-based methods, camera parameters can also be re-estimated if physical parameters change within a running capture. Self-calibration methods estimate camera parameters in non-metric units. As self-calibration algorithms exploit the correspondence between several images, such algorithms typically involve that at least two or more images have overlapping image areas. Therefore, parts of the captured scene need to be visible in more than one image.

SUMMARY

According to an embodiment, an apparatus may have: a first interface for receiving a plurality of partially overlapping images of an object from a corresponding plurality of camera positions being arranged along a first and a second direction according to a two-dimensional or three-dimensional camera pattern, wherein patterns having camera positions that differ in two directions are two-dimensional patterns and patterns having camera positions that differ in three directions are three-dimensional patterns; an analyzing unit configured for selecting at least one corresponding reference point in an overlap area of a set of overlapping images, and for determining a displacement information along the first and the second direction of the reference point in each of the other images of the set of images, wherein a misalignment of the plurality of images along the first and the second direction is compensated by the displacement information so as to obtain aligned images; a determining unit configured for determining an offset information between principal points at the plurality of camera positions using at least three aligned images; and a second interface for providing calibration data based on the displacement information and based on the offset information, the calibration data allowing for calibrating the plurality of images so as to comply to the camera pattern; wherein the analyzing unit is configured to determine the displacement information minimizing an error of a first minimization criteria, wherein for a 2D camera pattern the first minimization criteria is based on the determination rule;

$$\underset{x_1, x_2, x_3, \ldots, x_N}{\operatorname{argmin}} \sum_{(p,q) \in \Omega} \|v(H(x_p, C_p, C_q) \cdot m_{p,q}^{(p)}) - v(H(x_q, C_p, C_q) \cdot m_{p,q}^{(q)})\|$$

with $\|x\| = \sum_l x_l^2$ wherein the determining unit is configured to determine the offset information minimizing an error of a second minimization criteria, wherein for the 2D camera pattern the second minimization criteria is based on the determination rule $$\underset{x_1, x_2, x_3, \ldots, x_N}{\operatorname{argmin}}$$

$$\sum_{(p,q,r) \in \Psi} \left\| (u(H(x_p, C_p, C_q) \cdot m_{p,q,r}^{(p)}) - u(H(x_q, C_p, C_q) \cdot m_{p,q,r}^{(q)})) \frac{1}{d(C_p - C_q)} - (u(H(x_p, C_p, C_r) \cdot m_{p,q,r}^{(p)}) - u(H(x_r, C_p, C_r) \cdot m_{p,q,r}^{(r)})) \frac{1}{d(C_p - C_r)} \right\|$$

with $\|x\| = \sum_l x_l^2$ wherein argmin denotes the minimization criteria and p, q and r denote indices of individual cameras. $C_p$, $C_q$, $C_r$ denote camera positions of cameras p, q and r, $d(C_p-C_q)$ is a distance between the camera positions, $x_p$, $x_q$ and $x_r$ are vectors with parameters to be determined so as to minimizing the error for camera p, q and r, $H(\cdot)$ is a function providing a homography matrix undistorting points according to a parameter vector $x_p$ and camera positions $C_p$ and $C_q$, $m_{p,q} = [m^{(p)}_{p,q} \ m^{(q)}_{p,q}]$ denotes a set of reference points wherein $m^{(p)}_{p,q}$ corresponds to the respective reference points in camera p, $m_{p,q,r} = [m^{(p)}_{p,q,r} \ m^{(q)}_{p,q,r} \ m^{(r)}_{p,q,r}]$ denotes a set of reference points wherein $m^{(p)}_{p,q,r}$ corresponds to the respective reference points in camera p, Functions $u(\cdot)$ and $v(\cdot)$ extract the horizontal/vertical component of an image point respectively, the set $\Omega$ includes all pairs of partially overlapping images; the set $\psi$ includes triplets of partially overlapping images; such that each of the N cameras considered in the minimization problem is comprised in at least one pair of cameras contained in $\Omega$ and at least in one triplet of cameras contained in $\psi$; and/or wherein the analyzing unit is configured to determine the displacement information minimizing an error of a linearized first minimization criteria, wherein for a 2D camera pattern the linearized first minimization criteria is based on the determination rule;

$$\underset{x_1, x_2, x_3, \ldots, x_N}{\operatorname{argmin}} \sum_{(p,q) \in \Omega} [J_{p,q}^{(p)} | J_{p,q}^{(q)}] \cdot \begin{bmatrix} x_p^T \\ x_q^T \end{bmatrix} + b_{p,q}$$

wherein $$(v(H(x_p, C_p, C_q) \cdot m_{p,q}^{(p)}) - v(H(x_q, C_p, C_q) \cdot m_{p,q}^{(q)}))^2 \approx [J_{p,q}^{(p)} | J_{p,q}^{(q)}] \cdot \begin{bmatrix} x_p^T \\ x_q^T \end{bmatrix} + b_{p,q}$$

wherein the determining unit is configured to determine the offset information minimizing an error of a linearized second minimization criteria, wherein for the 2D camera pattern the linearized second minimization criteria is based on the determination rule $$\underset{x_1, x_2, x_3, \ldots, x_N}{\operatorname{argmin}} \sum_{(p,q,r) \in \Psi} [J_{p,q,r}^{(p)} \ J_{p,q,r}^{(q)} \ J_{p,q,r}^{(r)}] \cdot \begin{bmatrix} x_p^T \\ x_q^T \\ x_r^T \end{bmatrix} + b_{p,q,r}$$

wherein $$\left( (u(H(x_p, C_p, C_q) \cdot m_{p,q,r}^{(p)}) - u(H(x_q, C_p, C_q) \cdot m_{p,q,r}^{(q)})) \frac{1}{d(C_p - C_q)} - (u(H(x_p, C_p, C_r) \cdot m_{p,q,r}^{(p)}) - u(H(x_q, C_p, C_r) \cdot m_{p,q,r}^{(r)})) \frac{1}{d(C_p - C_r)} \right)^2 \approx$$

$$[J_{p,q,r}^{(p)} \ J_{p,q,r}^{(q)} \ J_{p,q,r}^{(r)}] \cdot \begin{bmatrix} x_p^T \\ x_q^T \\ x_r^T \end{bmatrix} + b_{p,q,r}$$

wherein argmin denotes the minimization criteria p, q and r denote indices of individual cameras, $C_p$, $C_q$, $C_r$ denote camera positions of cameras p, q and r, $d(C_p-C_q)$ is a distance between the camera positions, $H(\cdot)$ is a function providing a homography matrix undistorting points according to a parameter vector $x_p$ and camera positions $C_p$ and $C_q$, corresponding to camera p with parameter vector $x_p$, $x_q$ and $x_r$, are vectors with parameters to be determined so as to minimizing the error for camera p, q and r, $m_{p,q} = [m^{(p)}_{p,q} \ m^{(q)}_{p,q}]$ denotes a set of reference points wherein $m^{(p)}_{p,q}$ corresponds to the respective reference points in camera p, $m_{p,q,r} = [m^{(p)}_{p,q,r} \ m^{(q)}_{p,q,r} \ m^{(r)}_{p,q,r}]$ denotes a set of reference points wherein $m^{(p)}_{p,q,r}$ corresponds to the respective reference points in camera p, the set $\Omega$ includes all pairs of partially overlapping images; the set $\psi$ includes triplets of partially overlapping images; such that each of the N cameras considered in the minimization problem is included in at least one pair of cameras contained in $\Omega$ and in at least one triplet of cameras contained in $\psi$, functions $u(\cdot)$ and $v(\cdot)$ extract the horizontal/vertical component of an image point respectively, $J_{p,q} = [J^{(p)}_{p,q} \ J^{(q)}_{p,q}]$ and $J_{p,q,r} = [J^{(p)}_{p,q,r} \ J^{(q)}_{p,q,r}]$ denote the Jacobi matrices for camera pairs and camera triplets, respectively, $J^{(p)}_{p,q}$ and $J^{(p)}_{p,q,r}$ denote sub-matrices corresponding to a camera p, $b_{p,q}$ and $b_{p,q,r}$ denote residual elements.

Another embodiment may have a camera system including at least one camera being configured to provide a plurality of images from a corresponding plurality of camera positions and including a memory having stored thereon calibration information derived from calibration data generated from an apparatus according to one of previous claims, wherein the calibration information is the calibration data or incorporates at least part thereof.

According to another embodiment, a method for obtaining calibration data may have the steps of: receiving a plurality of partially overlapping images of an object from a corresponding plurality of camera positions being arranged along a first and a second direction according to a two-dimensional or three-dimensional camera pattern, wherein patterns having camera positions that differ in two directions are two-dimensional patterns and patterns having camera positions that differ in three directions are three-dimensional patterns; selecting at least one corresponding reference point in an overlap area of a set of overlapping images, and determining a displacement information along the first and the second direction of the reference point in each of the other images of the set of images, such that a misalignment of the plurality of images along the first and the second direction is compensated by the displacement information so as to obtain aligned images; determining an offset information between principal points at the plurality of camera positions using at least three aligned images; and providing calibration data based on the displacement information and based on the offset information, the calibration data allowing for calibrating the plurality of images so as to comply to the camera pattern; and determining the displacement information minimizing an error of a first minimization criteria, wherein for a 2D camera pattern the first minimization criteria is based on the determination rule;

$$\operatorname*{argmin}_{x_1, x_2, x_3, \ldots, x_N} \sum_{(p,q) \in \Omega} \| v(H(x_p, C_p, C_q) \cdot m_{p,q}^{(p)}) - v(H(x_q, C_p, C_q) \cdot m_{p,q}^{(q)}) \|$$

with $\|x\| = \sum_l x_l^2$ determining the offset information minimizing an error of a second minimization criteria, wherein for the 2D camera pattern the second minimization criteria is based on the determination rule $$\operatorname*{argmin}_{x_1, x_2, x_3, \ldots, x_N} \sum_{(p,q,r) \in \Psi}$$

$$\left\| (u(H(x_p, C_p, C_q) \cdot m_{p,q,r}^{(p)}) - u(H(x_q, C_p, C_q) \cdot m_{p,q,r}^{(q)})) \frac{1}{d(C_p - C_q)} - \right.$$
$$\left. (u(H(x_p, C_p, C_r) \cdot m_{p,q,r}^{(p)}) - u(H(x_q, C_p, C_r) \cdot m_{p,q,r}^{(r)})) \frac{1}{d(C_p - C_r)} \right\|$$

with $\|x\| = \sum_l x_l^2$ wherein argmin denotes the minimization criteria and p, q and r denote indices of individual cameras. $C_p$, $C_q$, $C_r$ denote camera positions of cameras p, q and r, $d(C_p - C_q)$ is a distance between the camera positions, $x_p$, $x_q$ and $x_r$ are vectors with parameters to be determined so as to minimizing the error for camera p, q and r, $H(\bullet)$ is a function providing a homography matrix undistorting points according to a parameter vector $x_p$ and camera positions $C_p$ and $C_q$, $m_{p,q} = [m^{(p)}_{p,q} \ m^{(q)}_{p,q}]$ denotes a set of reference points wherein $m^{(p)}_{p,q}$ corresponds to the respective reference points in camera p, $m_{p,q,r} = [m^{(p)}_{p,q,r} \ m^{(q)}_{p,q,r} \ m^{(r)}_{p,q,r}]$ denotes a set of reference points wherein $m^{(p)}_{p,q,r}$ corresponds to the respective reference points in camera p, Functions $u(\bullet)$ and $v(\bullet)$ extract the horizontal/vertical component of an image point respectively, the set $\Omega$ includes all pairs of partially overlapping images; the set $\psi$ includes triplets of partially overlapping images; such that each of the N cameras considered in the minimization problem is included in at least one pair of cameras contained in $\Omega$ and at least in one triplet of cameras contained in $\psi$; and/or determining the displacement information minimizing an error of a linearized first minimization criteria, wherein for a 2D camera pattern the linearized first minimization criteria is based on the determination rule;

$$\operatorname*{argmin}_{x_1, x_2, x_3, \ldots, x_N} \sum_{(p,q) \in \Omega} [J^{(p)}_{p,q} | J^{(q)}_{p,q}] \cdot \begin{bmatrix} x_p^T \\ x_q^T \end{bmatrix} + b_{p,q}$$

wherein $$(v(H(x_p, C_p, C_q) \cdot m_{p,q}^{(p)}) - v(H(x_q, C_p, C_q) \cdot m_{p,q}^{(q)}))^2 \approx$$

$$[J^{(p)}_{p,q} | J^{(q)}_{p,q}] \cdot \begin{bmatrix} x_p^T \\ x_q^T \end{bmatrix} + b_{p,q}$$

determining the offset information minimizing an error of a linearized second minimization criteria, wherein for the 2D camera pattern the linearized second minimization criteria is based on the determination rule $$\operatorname*{argmin}_{x_1, x_2, x_3, \ldots, x_N} \sum_{(p,q,r) \in \Psi} [J^{(p)}_{p,q,r} \ J^{(q)}_{p,q,r} \ J^{(r)}_{p,q,r}] \cdot \begin{bmatrix} x_p^T \\ x_q^T \\ x_r^T \end{bmatrix} + b_{p,q,r}$$

wherein $$\left( (u(H(x_p, C_p, C_q) \cdot m_{p,q,r}^{(p)}) - u(H(x_q, C_p, C_q) \cdot m_{p,q,r}^{(q)})) \frac{1}{d(C_p - C_q)} - \right.$$
$$\left. (u(H(x_p, C_p, C_r) \cdot m_{p,q,r}^{(p)}) - u(H(x_q, C_p, C_r) \cdot m_{p,q,r}^{(r)})) \frac{1}{d(C_p - C_r)} \right)^2 \approx$$

$$[J^{(p)}_{p,q,r} \ J^{(q)}_{p,q,r} \ J^{(r)}_{p,q,r}] \cdot \begin{bmatrix} x_p^T \\ x_q^T \\ x_r^T \end{bmatrix} + b_{p,q,r}$$

wherein argmin denotes the minimization criteria p, q and r denote indices of individual cameras, $C_p$, $C_q$, $C_r$ denote camera positions of cameras p, q and r, $d(C_p - C_q)$ is a distance between the camera positions, $H(\bullet)$ is a function providing a homography matrix undistorting points according to a parameter vector $x_p$ and camera positions $C_p$ and $C_q$, corresponding to camera p with parameter vector $x_p$, $x_q$ and $x_r$ are vectors with parameters to be determined so as to minimizing the error for camera p, q and r, $m_{p,q} = [m^{(p)}_{p,q} \ m^{(q)}_{p,q}]$ denotes a set of reference points wherein $m^{(p)}_{p,q}$ corresponds to the respective reference points in camera p, $m_{p,q,r} = [m^{(p)}_{p,q,r} \ m^{(q)}_{p,q,r} \ m^{(r)}_{p,q,r}]$ denotes a set of reference points wherein $m^{(p)}_{p,q,r}$ corresponds to the respective reference points in camera p, the set $\Omega$ includes all pairs of partially overlapping images; the set $\psi$ includes triplets of partially overlapping images; such that each of the N cameras considered in the minimization problem is included in at least one pair of cameras contained in $\Omega$ and in at least one triplet of cameras contained in $\psi$, functions $u(\bullet)$ and $v(\bullet)$ extract the horizontal/vertical component of an image point respectively, $J_{p,q} = [J^{(p)}_{p,q} \ J^{(q)}_{p,q}]$ and $J_{p,q,r} = [J^{(p)}_{p,q,r} \ J^{(q)}_{p,q,r} \ J^{(r)}_{p,q,r}]$ denote the Jacobi matrices for camera pairs and camera triplets, respectively, $J^{(p)}_{p,q}$ and $J^{(p)}_{p,q,r}$ denote submatrices corresponding to a camera p, $b_{p,q}$ and $b_{p,q,r}$ denote residual elements.

Another embodiment may have a non-transitory digital storage medium having a computer program stored thereon to perform the inventive method for obtaining calibration data, when said computer program is run by a computer.

A recognition of the invention consists of having detected that, by determining displacement information that allows for aligning images along a first direction and along a second direction and by determining offset information between principal points of cameras of the camera pattern, the offset information may be determined with respect to pre-aligned images such that it is sufficient to determine the offset information along one of the two directions such that the computational effort for determining the offset information along the second direction may be saved which allows for computational efficiency. This further allows for a high precision and reliability of obtained image information such as offset information in 3D picture by having at least two independent, but correlating measurements.

Embodiments provide an apparatus that comprises a first interface for receiving a plurality of partially overlapping images of an object from a corresponding plurality of camera positions imaged by at least one camera, the camera positions being arranged along a first and a second direction and being arranged according to a camera pattern. The apparatus comprises an analyzing unit configured for selecting at least one corresponding reference point in an overlap area of a set of overlapping images, and for determining displacement information along the first and the second direction of the reference point in each of the other images of the set of images, i.e., a displacement of the reference point in the different images. A misalignment of the plurality of images along the first and the second direction is compensated for by the displacement information so as to obtain aligned images. The apparatus comprises a determining unit configured for determining offset information between principal points at the plurality of camera positions, using at least three aligned images. The apparatus further comprises a second interface for providing calibration data based on the displacement information and based on the offset information, the calibration data allowing for calibrating the plurality of images so as to comply to the camera pattern. In a multi-camera system that comprises more than two cameras, more stereoscopic views may be obtained such as between a first and a second camera and between a second and a third camera. Those two stereoscopic views may be brought into consistency based on the offset information. Based on the aligned images, it is sufficient to determine the offset information along the first or second direction which may be advantageous for at least three cameras arranged in a single row but which is especially advantageous for a two-dimensional or even three-dimensional camera pattern. This further allows for a high precision and reliability of obtained image information such as offset information in 3D picture by having at least two independent, but correlating measurements.

According to an embodiment, the analyzing unit is configured to determine the displacement information using a set of parameters indicating a real or actual condition of the at least one camera at the plurality of camera positions, the parameters comprising a non-linear relationship with respect to each other. The analyzing unit is configured to use a linearized version of the set of parameters and to determine the displacement information by minimizing an error of the linearized version with respect to a desired, e.g., error-free condition of the plurality of camera positions. Linearization allows expansion of a low amount of computational power. Based on the linearization, the displacement information along the first and second direction may, furthermore, be obtained one after the other that allows for a high robustness of the indetermination.

According to an embodiment, the analyzing unit is configured to iteratively minimize the error of the linearized version. This allows for a stepwise reduction and, therefore, for an efficient determination.

According to an embodiment, the analyzing unit is configured to minimize the error based on a determination rule that is based on a Jacobian matrix system that corresponds to a vector of constant values when being multiplied with the linearized version of the parameters. This allows for a further reduction of computational effort.

According to an embodiment, the analyzing unit is configured to determine the displacement information pair-wise for a pair of the plurality of images. This allows obtaining the displacement information pair-wise and, thus, while considering a low amount of parameters. This may be done repeatedly so as to obtain the displacement information of one image with respect to a different image.

According to an embodiment, the analyzing unit is configured to first determine the displacement information along one of the first and the second direction and to subsequently determine the displacement information for the other direction. This allows for a high robustness of the result against computational errors and non-linearity as only a subset of unknown values is determined at an instance.

According to an embodiment, the analyzing unit is configured to determine the displacement information along the first direction independent from the displacement information along the second direction. This allows for a small subset of unknown variables that may be determined in a robust manner as errors along one direction may have no or low influence on determinations of the other direction.

According to an embodiment, the calibration data is based on angles that describe a rotation of the cameras, to a focal length of the camera and to a principal point of the cameras. The calibration data does not contain information indicating the plurality of camera positions. This allows for a low computational effort as the positions of the cameras may be considered as being constant and may thus remain uncomputed as variables.

According to an embodiment, the apparatus further comprises at least one camera being configured to provide the plurality of images from the plurality of camera positions. The apparatus is configured to determine a depth map of an object region comprising a plurality of sub regions. The at least one camera is configured to provide the corresponding image by projecting one of the plurality of sub regions. This allows for a self-calibration.

According to an embodiment, the apparatus is configured to apply the calibration data to the plurality of images so as to obtain a plurality of rectified images and to provide the plurality of rectified images. This allows for precise images.

According to an embodiment, a camera system comprises a at least one camera to provide images from the plurality of camera positions and comprises a memory having stored thereon calibration information derived from calibration data generated from an apparatus according to one of the previous claims. This allows for rectifying the images obtained from the plurality of camera positions even if the calibration data is not determined for an actual image but has been pre-determined.

According to an embodiment, the camera system comprises an apparatus for providing calibration data. This allows for an apparatus that is able to self-calibrate.

According to an embodiment, a method for obtaining calibration data comprises receiving a plurality of partially overlapping images of an object from a corresponding plurality of camera positions being arranged along a first and a second direction according to a camera pattern. The method comprises selecting a reference point in an overlap area of one of the images and determining displacement information along the first and the second direction of the reference point in each of the other images, such that a misalignment of the plurality of images along the first and the second direction is compensated by the displacement information so as to obtain aligned images. The method comprises determining offset information between principal points of the at least one camera at the plurality of camera positions using at least three aligned images. The method comprises providing calibration data based on the displacement information and based on the offset information.

According to an embodiment, a non-transitory storage medium has stored thereon a computer program having a program code for performing, when running on a computer, a method according to embodiments described herein.

BRIEF DESCRIPTION OF THE DRAWINGS

Embodiments of the present invention will be detailed subsequently referring to the appended drawings, in which:

FIG. 2c is a schematic diagram that illustrates parameters of embodiments described herein;

FIG. 2d is a schematic perspective view of a camera that may be used in embodiments;

FIG. 3b is a schematic view of picture positions of the pattern that has been described in connection with FIG. 3a;

FIG. 4b is a schematic view of example images arranged according to the pattern of FIG. 4a;

FIG. 5 is a schematic flow chart of method for obtaining calibration data according to an embodiment;

FIG. 8 is a schematic block diagram of a camera system according to an embodiment that comprises a plurality of cameras and comprises a memory having stored thereon calibration information.

DETAILED DESCRIPTION OF THE INVENTION

Figure 1:
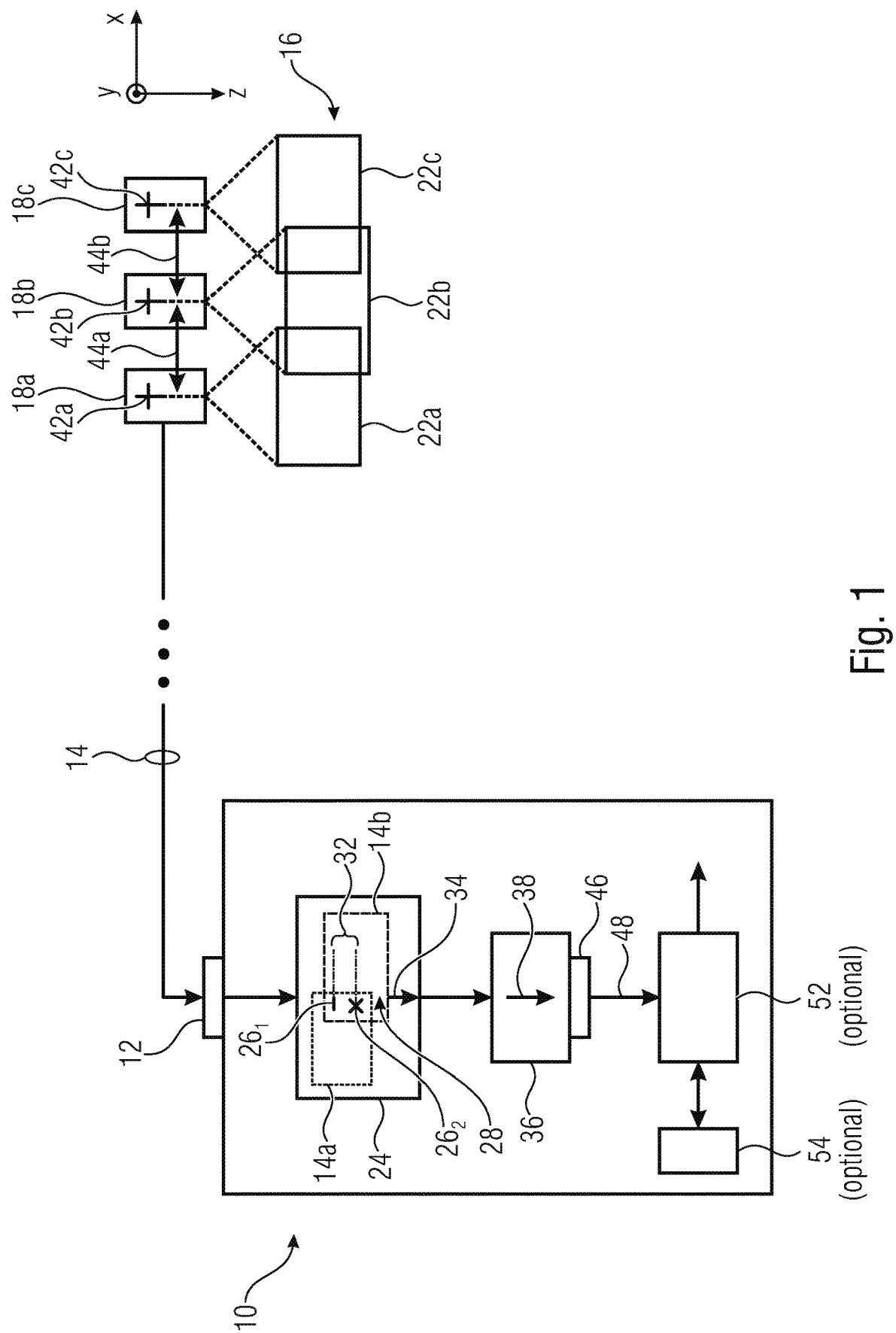
FIG. 1 is a schematic block diagram of an apparatus according to an embodiment.

Equal or equivalent elements or elements with equal or equivalent functionality are denoted in the following description by equal or equivalent reference numerals even if occurring in different figures.

In the following description, a plurality of details is set forth to provide a more thorough explanation of embodiments of the present invention. However, it will be apparent to those skilled in the art that embodiments of the present invention may be practiced without these specific details. In other instances, well known structures and devices are shown in block diagram form rather than in detail in order to avoid obscuring embodiments of the present invention. In addition, features of the different embodiments described hereinafter may be combined with each other, unless specifically noted otherwise.

In the following, reference is made to camera arrays comprising a plurality of cameras that are arranged at different positions. Such arrays are described herein as being arranged according to a two-dimensional pattern for illustrating the advantages of the embodiments. Although referring to a two-dimensional pattern, other patterns may also be used that comprise cameras being arranged according to a three-dimensional pattern. For example, this may be considered when allowing for divergences of the focal length of a camera. According to other embodiments, the camera pattern may comprise only one dimension, i.e., the cameras are arranged along a single line (or row). Some embodiments are described as one camera being arranged at each camera position such that embodiments that relate to a plurality of partially overlapping images of an object being received from a corresponding plurality of camera positions may be understood as the plurality of images being received from a corresponding plurality of cameras.

Without limitation one camera may capture two or more images at different locations when being moved from a location to another such that images from different camera positions may be captured by a single camera.

Embodiments described herein are explained in terms of stepwise rectifying images. This may relate to rectify or transform images so as to obtain transformed images and to use such transformed images for further steps or for further processing. Without any limitation, such descriptions rate to correction data that is obtained stepwise, i.e., the original images may remain partially or completely unchanged, wherein a transformation of the images is only theoretically performed, e.g., when determining displacement data. Thus, rectifying or transforming the images may be equivalent to determining the amount of the transformation that has to be applied to the images.

Embodiments described herein relate to a displacement of images with respect to each other and/or with respect to a camera pattern. The displacement relates to a transformation according to a first and/or second direction parallel to an object plane but also relates to a rotation of the image in the three-dimensional space. In the following, reference is made to rectifying images, i.e., to calibration of images. Such rectification may comprise a transformation of images. Such transformation may relate to a shifting or a movement of the image along at least one image direction, to a rotation of the image in the image plane and/or to a scaling (skew) of images. Thus and unless stated otherwise, reference made herein that relates to a shift of an image also relates to a rotation and/or a scaling of the image.

FIG. 1 is a schematic block diagram of an apparatus 10 according to an embodiment. The apparatus 10 comprises an input interface 12 for receiving a plurality of partially overlapping images of an object or object area 16. The images 14 are provided from a corresponding plurality of cameras 18a to 18c that project the object 16 by projecting sub areas 22a to 22c of the object 16 wherein each sub area 22a to 22c may correspond to one of the plurality of images 14. An overlap of the sub regions or sub areas 22a to 22c may correspond to an image overlap of the images 14. The plurality of cameras 18a to 18c is arranged according to a pattern along a first direction x and along a second direction y, for example, in an x/y plane. The apparatus 10 comprises an analyzing unit 24 configured for selecting one or more reference points 26 in an overlap area 28 of one of the images 14 which is illustrated, by non-limiting example only, for reference point $26_1$ in an image 14a of the plurality of images 14. The image 14a overlaps with another image 14b of the plurality of images 14 in the overlap area 28, i.e., in the overlap area 28, both images 14a and 14b show the same part of the object 16. The reference point 26 contained as reference point $26_1$ in the image 14a is also contained as reference point $26_2$ in the image 14b. For example, the image 14a is captured by camera 18a and the image 14b is captured by camera 18b. Due to a misalignment between the cameras 18a and 18b, the reference points $26_1$ and $26_2$ are displaced by a displacement 32 along the x direction and/or y direction. The analyzing unit 24 is configured to determine the displacement information 34 that indicates the displacement 32 along the x direction and the y direction. The misalignment of the images 14a and 14b along the x direction and the y direction is compensated by applying the displacement information 34 which allows obtaining aligned images. Determining the displacement information 34 so as to obtain information on how to transform the images and allowing for low or a minimum of remaining errors for all of the considered images may be a first optimization problem. The analyzing unit 24 may be configured to solve the optimization problem, as will be described later.

Further, the analyzing unit is configured for receiving the images 14 from the plurality of cameras, e.g., without or only coarse prior knowledge with respect to the content thereof and/or overlaps of the images. The analyzing unit may be configured for selecting a corresponding reference point, i.e., image content in the overlap area, e.g., by comparing images. The corresponding reference point or reference region may be a single point or region/object in the captured scene. By identifying similar or identical content, the overlap area may be identified and a set of cameras (pairs, triplets, etc.) may be identified having overlaps in their images at least at a region comprising the reference point $26_1$ and/or $26_2$. The set of images may thus be configured such that the set of images is a subset of the plurality of images 14, i.e., at least one of the images is not contained in the respective set. In contrast each camera is contained in one or more, e.g., at least two sets.

Based thereon relationships between the cameras may be determined as being described in connection with FIG. 6c. The analyzing unit 24 may be configured for determining offsets or shifts or other deviations of the reference point starting from one image in one (pair of images) tow (triplet of image) or a higher number of other images. The analyzing unit 24 may be configured for determining further reference points for the same set of cameras and/or for other sets of cameras.

Further images of the plurality of images 14 may be misaligned with respect to the image 14a and/or the image 14b. The analyzing unit 24 is configured to determine the displacement, to determine the displacement information 34, respectively, between the plurality of images 14. The analyzing unit 24 may be configured to determine the misalignment or displacement globally, i.e., to select all images of the plurality of images 14 that illustrate the same reference point 26 and to determine the displacement information globally for the selected set of images. Alternatively, the analyzing unit 24 may be configured to align two images such as the images 14a and 14b with respect to each other, i.e., to operate pair-wise. The analyzing unit 24 may be configured to select a set of images that comprise the same reference point 26 and to pair-wise align the images with respect to each other. The analyzing unit 24 may be configured to select more than just one reference point in the overlap area such as, for example, at least 5, 10, or 100. For determining the displacement information along one of the first and second direction, a first image of a selected pair of images may be rotated and scaled so as to be aligned along one image direction, i.e., such as lines or columns of pixels point towards the other camera position. Then, the second image may be transformed along the respective direction so as to align the at least one selected reference point. This may be repeated for the other direction. The machine has knowledge about the position of all cameras. It is even assumed that this information is reliable.

The apparatus 10 comprises a determining unit 36 configured for determining a offset information 38 that relates to principal points 42a to 42c of the plurality of images 14. The offset information may thus be a distance information that describes a distance between principal points and may thus be a relative information relative with respect to the images associated to the principal points. Based on a physical distance between cameras (or camera positions) 18a and 18b or between cameras (or camera positions) 18a and 18c or between cameras (or camera positions) 18b and 18c, a view on the scene or object area, i.e., the object 16 is different from camera to camera. This effect is known as disparity and is used for determining 3D images. For a stereoscopic view, two cameras are needed, for example, cameras 18a and 18b. Through the use of camera 18b and 18c, 18a and 18c, respectively, a second stereoscopic view may be obtained that may allow for an increase in information. When considering now a first stereoscopic view being obtained by using cameras 18a and 18b and a second stereoscopic view being obtained by using cameras 18b and 18c, the stereoscopic information may differ from one another when distances 44a between principal points 42a and 42b and a distance 44b between the focal points 42b and 42c differ from each other. Based thereon disparity estimation and/or depth reconstruction might lead to different results, which may be prevented by the described embodiments.

The determining unit 36 is configured to determine the offset information 38 so as to comprise information related to the distances 44a and 44b. The determining unit 36 is configured to use at least three images, for example, the images of the cameras 18a to 18c, for determining the offset information 38. For determining the distances 44a and/or 4b the reference points may be used. The respective reference point may be the identical in a pair of images and may be identical or different from each other in different sets of images, i.e., in a picture that is part of different pairs of images, different reference points may be used. Determining the offset information 38 so as to obtain information on how to transform the images and allowing for low or a minimum of remaining disparity offset for all of the considered images may be a second optimization problem. The determining unit 36 may be configured to solve the optimization problem, as will be described later.

The apparatus 10 comprises an interface 46 for providing calibration data 48 that is based on the displacement information 34 and based on the offset information 38. The calibration data may allow for rectifying the images 14 including a compensation in differences between distances 44a and 44b between the focal points 42a to 42c. The apparatus 10 may comprise an optional directing unit 52 being configured to process and/or to direct the calibration data 48. For example, the apparatus 10 may comprise an optional memory 54, wherein the directing unit 52 is configured to store the calibration data 38 in the memory 54. The directing unit 52 may be implemented by a central processing unit (CPU), by a microcontroller, by a field programmable gate array (FPGA) or the like.

Based on the displacement information 34, the apparatus 10 has knowledge about the displacement of the images 14 and may compensate for the displacement either by transforming such as shifting the images with respect to each other or by considering the displacement during further operation. This allows determining the differences in the distances 44a and 44b using aligned images such that the distance may sufficiently be calculated along one direction such as x for obtaining sufficient, precise information. An alignment of the images 14 may allow for reconstructing one dimensional dependencies in the camera pattern such as lines, rows or diagonals of the cameras 18a to 18c. The alignment performed by the analyzing unit 24 may, for example, allow for each of the images 14 being in-line or in-row of the camera pattern. This may leave unconsidered a distance between two lines of the pattern, or two rows of the pattern, respectively. However, by determining the distance 44a and the distance 44b, differences in the disparity between different stereoscopic images may be compensated for. Thus, by pre-aligning the images, the compensation for deviations in distances of principal points may be performed along one direction and may, at the same time, provide sufficient information. Thus, disparity estimation and/or depth reconstruction as well as rectification of images may be performed with low computational effort.

Figure 2A:
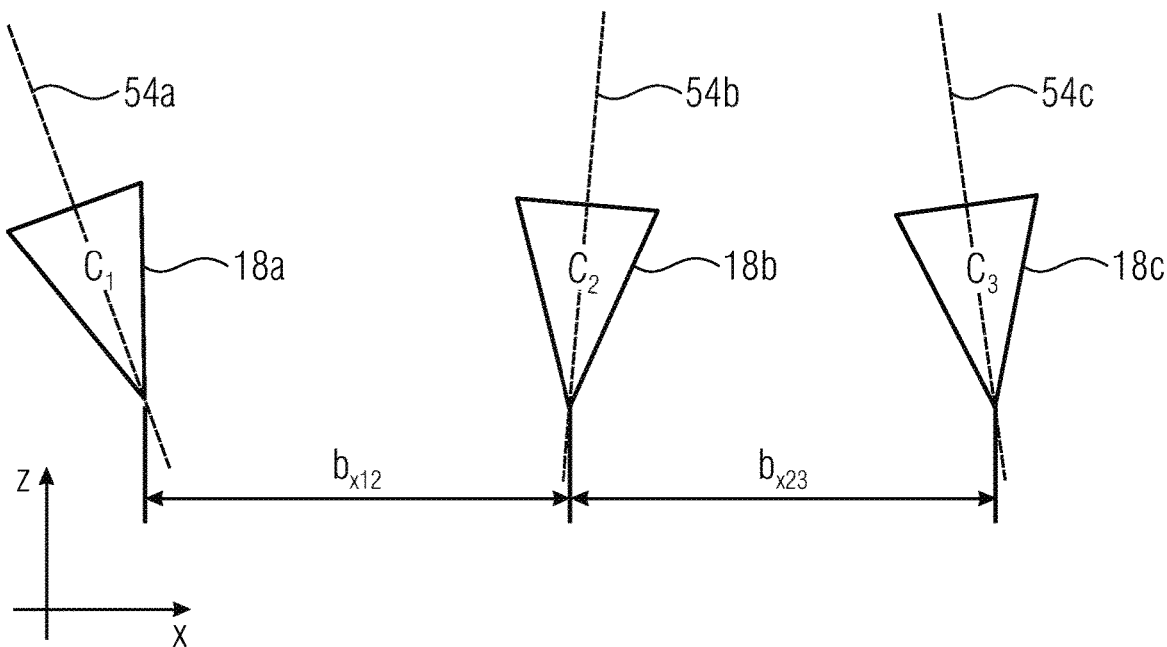
FIG. 2a is a schematic top view of a plurality of cameras before mechanical calibration.

FIG. 2a shows a schematic top view of the cameras 18a to 18c before mechanical calibration. Optical axes 54a to 54c of the cameras 18a to 18c differ from each other.

Figure 2B:
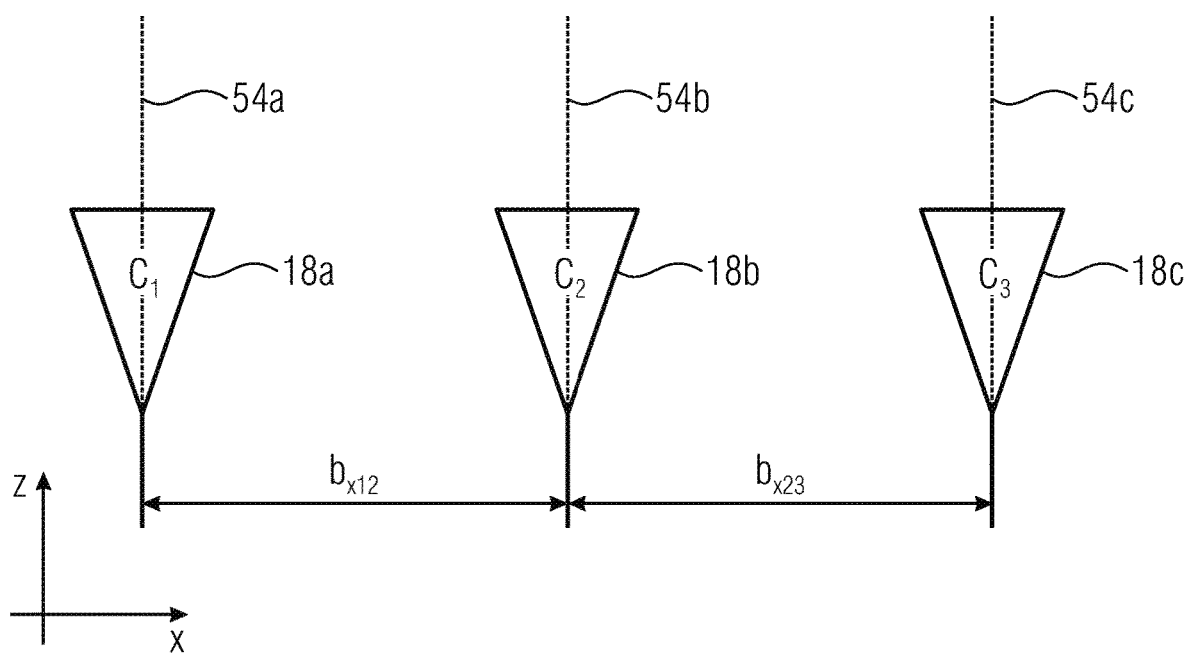
FIG. 2b is a schematic top view of the cameras of FIG. 2a after mechanical calibration.

FIG. 2b shows a schematic top view of the cameras 18a to 18c after mechanical calibration. The optical axes 54a to 54c are essentially in parallel but may differ from each other by the displacement described in connection with FIG. 1. In addition, distances $b_{x12}$ between a position $C_1$ of camera 18a and position $C_2$ of camera 18b may be different when compared to a distance $b_{x23}$ between the position $C_2$ and the position $C_3$ of camera 18c, wherein the distances $b_{x12}$ and $b_{x23}$ relate to the x direction. $C_1$, $C_2$ and $C_3$ are positions of the cameras 18a, 18b and 18c in the three-dimensional world.

In other words, FIGS. 2a and 2b show the top view of an array from the top before and after (mechanical) calibration. Before the calibration orientation of cameras $C_1$, $C_2$ and $C_3$ are not consistent and not in parallel. The calibration rotates the cameras such that their optical axes are parallel and perpendicular to the base line of the cameras. Thus, FIG. 2a shows a top view of the camera array before calibration. The optical axes of the cameras are slightly different. FIG. 2b shows a top view of the camera array after calibration. The optical axes are in parallel. Both FIGS. 2a and 2b may show only a top row of the camera array.

FIG. 2c shows a schematic diagram that illustrates parameters of embodiments described herein. The three dimensional world may be described by the x direction, the y direction and the z direction that may be arranged perpendicular to each other. A rotation by an angle α around the x direction may be referred to as "tilt". A rotation by an angle β around the y direction may be referred to as "yaw". A rotation by an angle γ around the z direction may be referred to as "roll". The illustrated parameters may be part of a vector that is optimized for obtaining rectified images.

FIG. 2d shows a schematic perspective view of a camera 18 that may be arranged in the array of cameras and may thus be camera 18a, 18b or 18c. The camera 18 comprises and image sensor 58 that comprises a center point 62. Properties of an imaging lens 64 or an array thereof may determine or at least influence a focal length f of camera 18. The focal length f may face an error at. Furthermore, the location of the lens 64 may at least influence the location of the principal point 42 on the image sensor 58 that may be different from the center 62. The principal point 42 may describe a center point of the image that is projected, wherein the point 62 may be a center point of the image sensor 58. A divergence or distance between the projected sub region of the object area and the center of the image sensor 58 may be described by a distance $p_x$ along the x direction and by a distance $p_y$ along the y direction. The parameters $p_x$ and $p_y$ may be assumed to be almost zero for calibrated cameras so as to denote that the optical center of the camera coincides with the center 62 of the imaging sensor.

When referring again to the model of the pinhole camera, the projection matrix P may be formulated according to:

$$P = K \cdot R \cdot [I | -C] \qquad \text{Formula 1}$$

K is, for example, a 3×3 matrix consisting of the intrinsic parameters. These include the focal length, the principal point τ and the skew factor s.

Figure 3A:
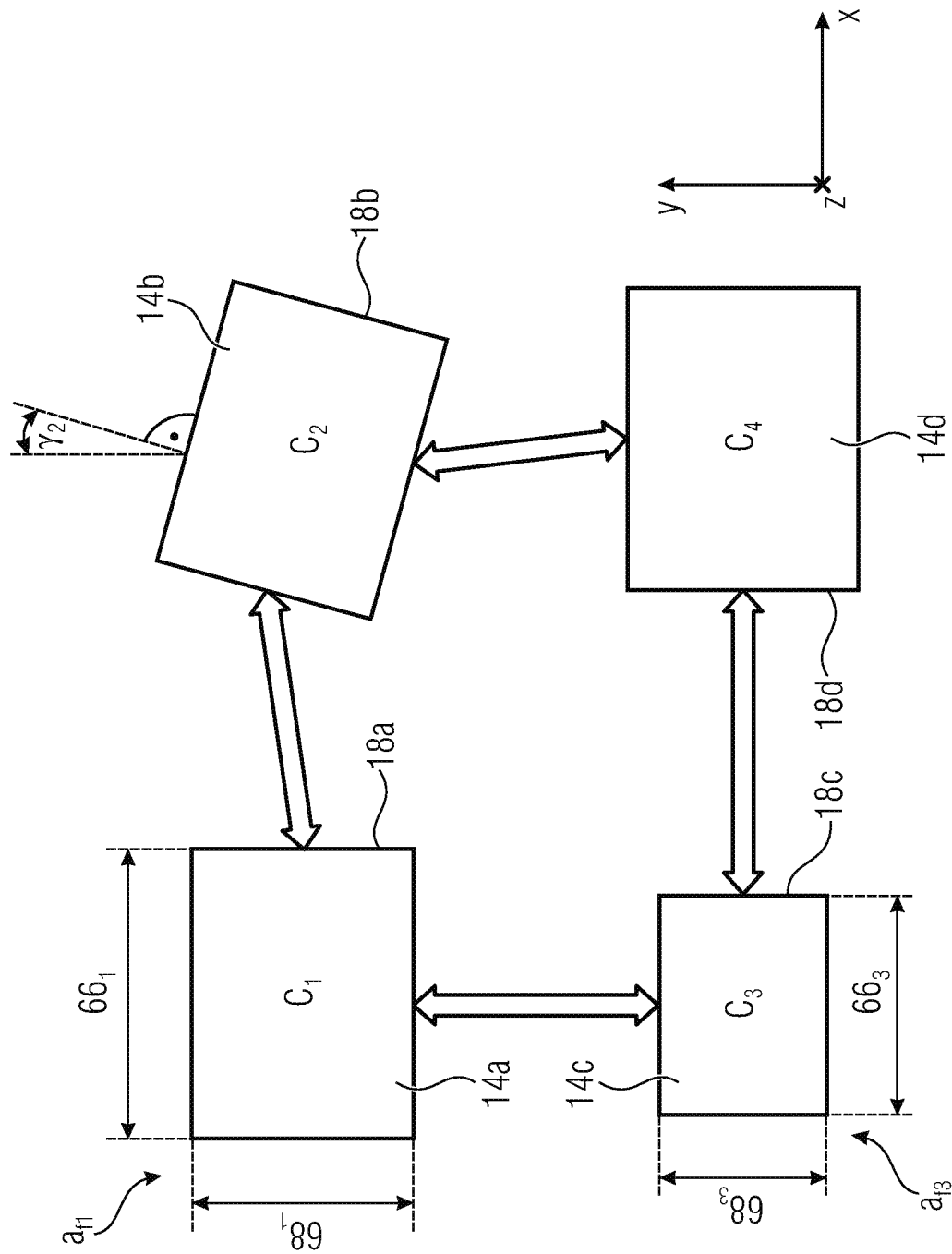
FIG. 3a is a schematic diagram of a camera pattern according to an embodiment.

FIG. 3a shows a schematic diagram of an example of a camera pattern 30 according to which cameras 18a to 18d are arranged, i.e., the pattern 30 is a 2×2 pattern in the x/y plane. The camera array may be in a state that may be obtained after a mechanical calibration that is explained in connection with FIG. 2b. Camera 18a may be arranged at position $C_1$, camera 18b may be arranged at position $C_2$, camera 18c may be arranged at position $C_3$, and camera 18d may be arranged at position $C_4$, that are, in an error-free state, arranged according to a rectangle or a square. Other numbers of cameras and/or other patterns are possible.

Parameters that may be evaluated for determining the displacement between images may be a focal length. In FIG. 3a, the focal length $a_{f1}$ of camera 18a is different from the focal length $a_{f3}$ of camera 18c which results in different sizes $66_1$ and $66_3$ along the x direction and/or different sizes $68_1$ and $68_3$ along they direction of pictures 14a and 14c. Furthermore, picture 14b may be rotated by an angle $γ_2$. Thus, the displacement information may relate to a transformation such as a shift, a rotation and/or a scaling of the images 14a to 14d along lateral directions x, y and/or z as well as to a rotation of images around at least one axis as described in connection with FIG. 2c.

Figure 3B:
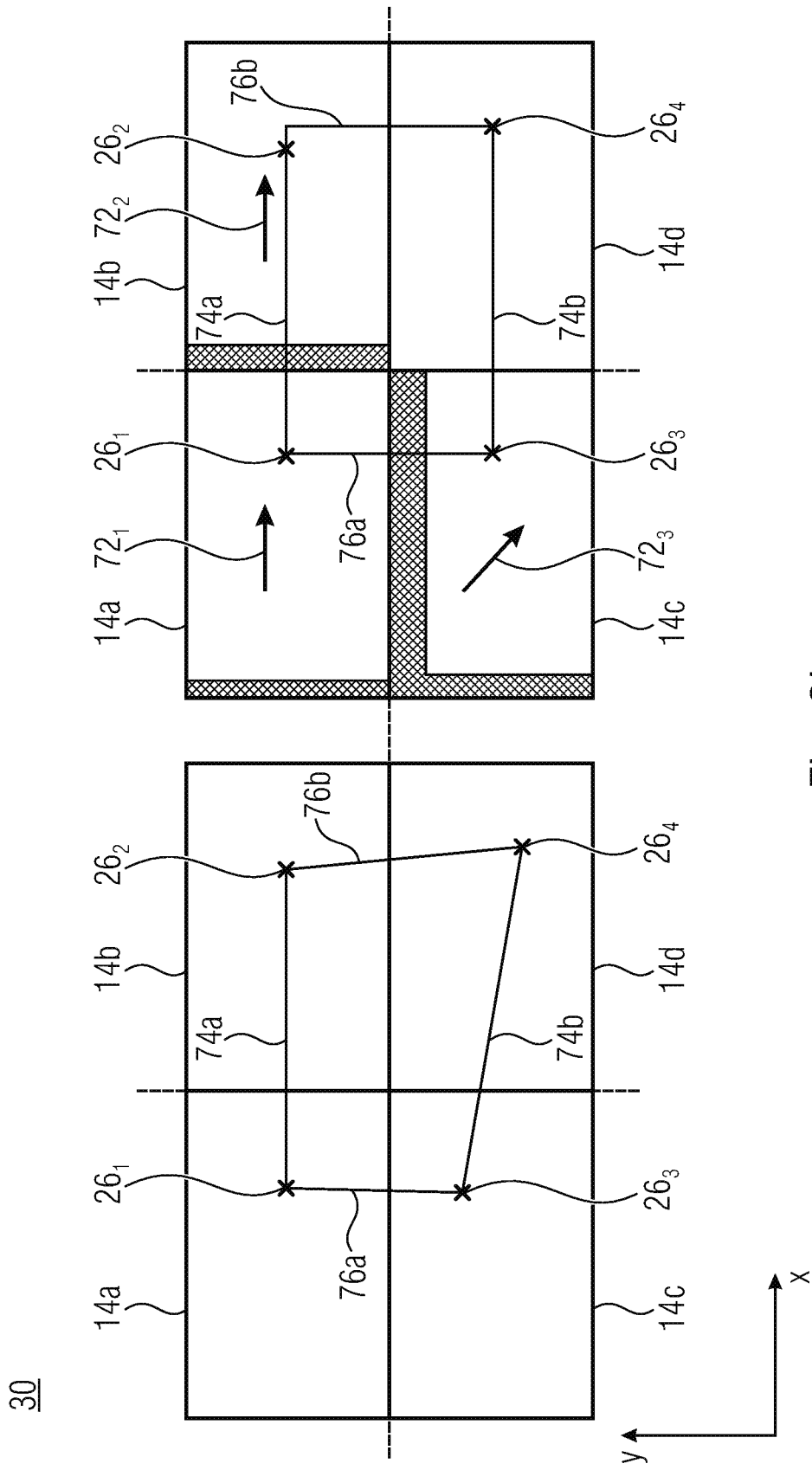

FIG. 3b shows a schematic view of pictures 14a to 14d of the 2×2 pattern that has been described in connection with FIG. 3a. On the left hand side, the images 14a to 14d are displaced; in particular, the image 14d does not match the intended pattern. On the right hand side a scenario is illustrated that may be obtained when compensating for the displacement. Arrows $72_1$ to $72_3$ indicate a direction along which the images 14a to 14c have to be transformed including one or more of a shift, a rotation and a scaling, with respect to image 14d such that the reference points $26_1$ to $26_4$ correspond to the camera pattern. The arrows $72_1$ to $72_3$ may also indicate a distance along which the respective image 14a to 14c has to be transformed along the directions x and/or y and may therefore indicate the displacement information. The black parts in the images 14*a* to 14*d* schematically illustrate regions from which the image has been transformed away.

The analyzing unit 24 may be configured to determine the displacement information along the x direction and subsequently along the y direction or vice versa. When compared to a determining of the displacement along x direction and y direction simultaneously, this may provide for a high robustness. The apparatus may have knowledge about the error-free pattern 30 and may determine that lines 74*a* and 74*b* should be in parallel to each other and that columns 76*a* and 76*b* should also be in parallel to each other. The analyzing unit 24 may be configured to determine that this is not true and that the images have to be transformed with respect to each other as illustrated on the right hand side of FIG. 3*b* where the lines 74*a* and 74*b* and the columns 76*a* and 76*b* are each in parallel with each other. The determination of the displacement information may also be executed independently from each other, i.e., lines 74*a* and 74*b* may be brought into a parallel condition independent of columns 76*a* and 76*b* or vice versa. This may refer to a first direction that may be corrected independent from the second direction. The second direction such as the columns 76*a* and 76*b* when first having transformed the lines 74*a* and 74*b* is executed dependent on the other direction so as to maintain the corrected images.

Thus, the left hand side of FIG. 3*b* shows an initial state before calibration but after mechanical calibration. The bottom right hand image is clearly not aligned with the other three images. On the right hand side of FIG. 3*b* rectified images are illustrated. Corresponding pixels are in the same row for horizontal adjacent views and the same column for vertical adjacent views.

In other words, the left hand side of FIG. 3*b* shows a 2×2 camera array in a general state. Camera 2 is slightly rotated and camera 3 has a slight deviation in focal length.

Figure 3C:
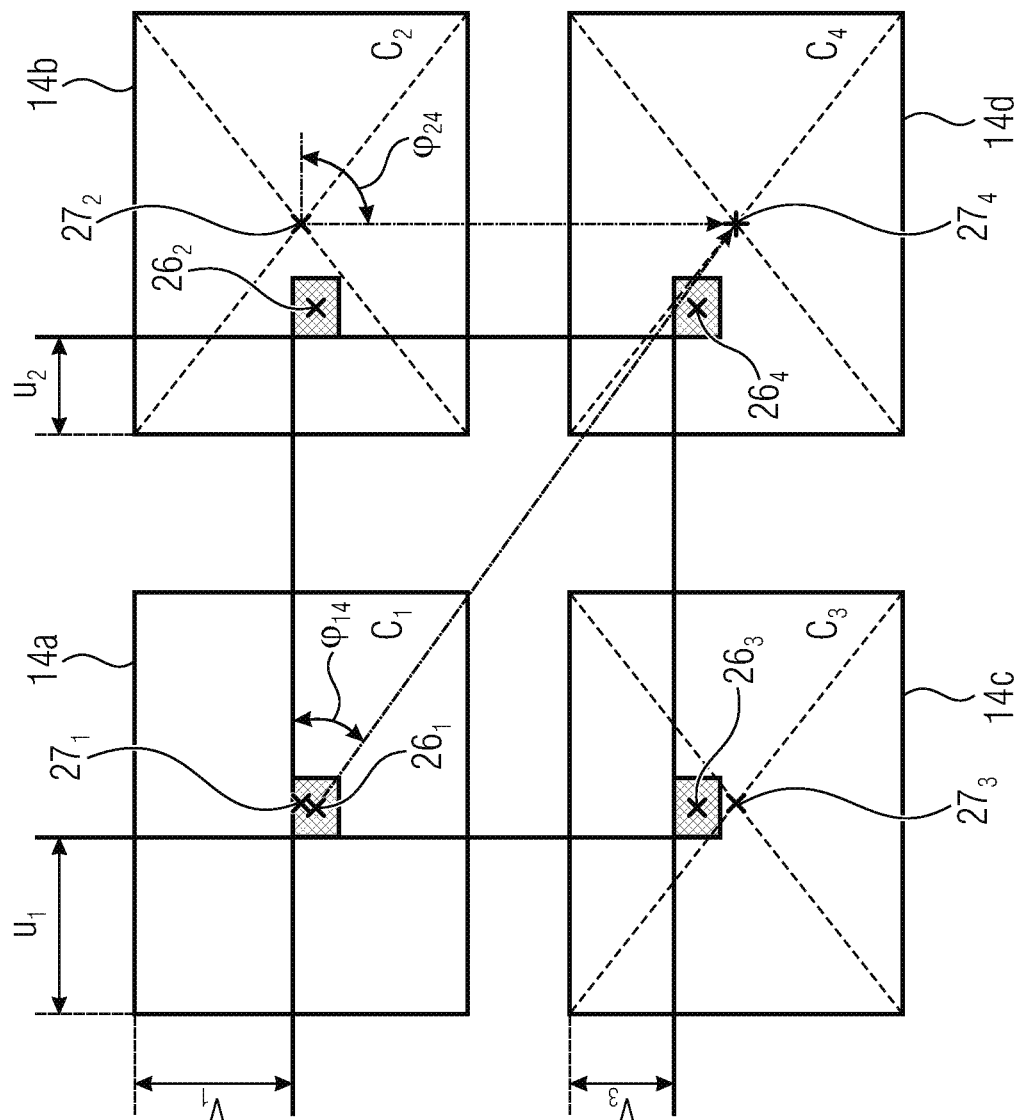
FIG. 3c is a schematic diagram of transformed images according to FIG. 3b.

FIG. 3*c* shows a schematic diagram of the transformed images 14*a* to 14*d* according to FIG. 3*b* on the right hand side. Based on different positions $C_1$ to $C_4$ of the cameras, the structure that is projected as reference points $26_1$ to $26_4$ on the images 14*a* to 14*d* is arranged on laterally different positions within the images 14*a* to 14*d*. On images 14*a* and 14*c*, the reference point or reference structure $26_1$ may comprise a distance $u_1$ to a first side of the image, wherein distances indicated with u may be, for example, in parallel with the x direction. In pictures 14*b* and 14*d*, reference points $26_2$ and $26_4$ may face a distance $u_2$ that is different from $u_1$ to a comparable side of the image. The same effect may relate to images 14*a* and 14*b* with respect to a different perpendicular side. The reference points $26_1$ and $26_2$ may face a distance $v_1$ to that side, wherein the distance may be in parallel, for example, along the y direction. The reference points $26_3$ and $26_4$ of images 14*c* and 14*d* may face a different distance $v_3$ to the comparable side.

An angle $\varphi_{14}$ indicates an angle by which image 1 (24*a*) has to be rotated around an anchor point, possibly around a center $27_1$ of the image 24*a*, such that its direction u or alternatively v at the anchor is directed towards the comparable anchor $27_4$ in image 4 (24*d*). An angle $\varphi_{24}$ indicates an angle by which image 2 (24*b*) has to be rotated around an anchor point, possibly around a center $27_2$ of the image 24*b*, such that its direction u at the anchor is directed towards the comparable anchor $27_4$ in image 4 (24*d*). Such angles may provide for information indicating the displacement information. $\varphi$ may therefore be a parameter fixed for a pair of images or views (p,q) as it only depends on the mechanical center/position of cameras p and q. Centers $24_1$ to $24_4$ may also indicate the used camera position $C_1$ to $C_4$.

Figure 4A:
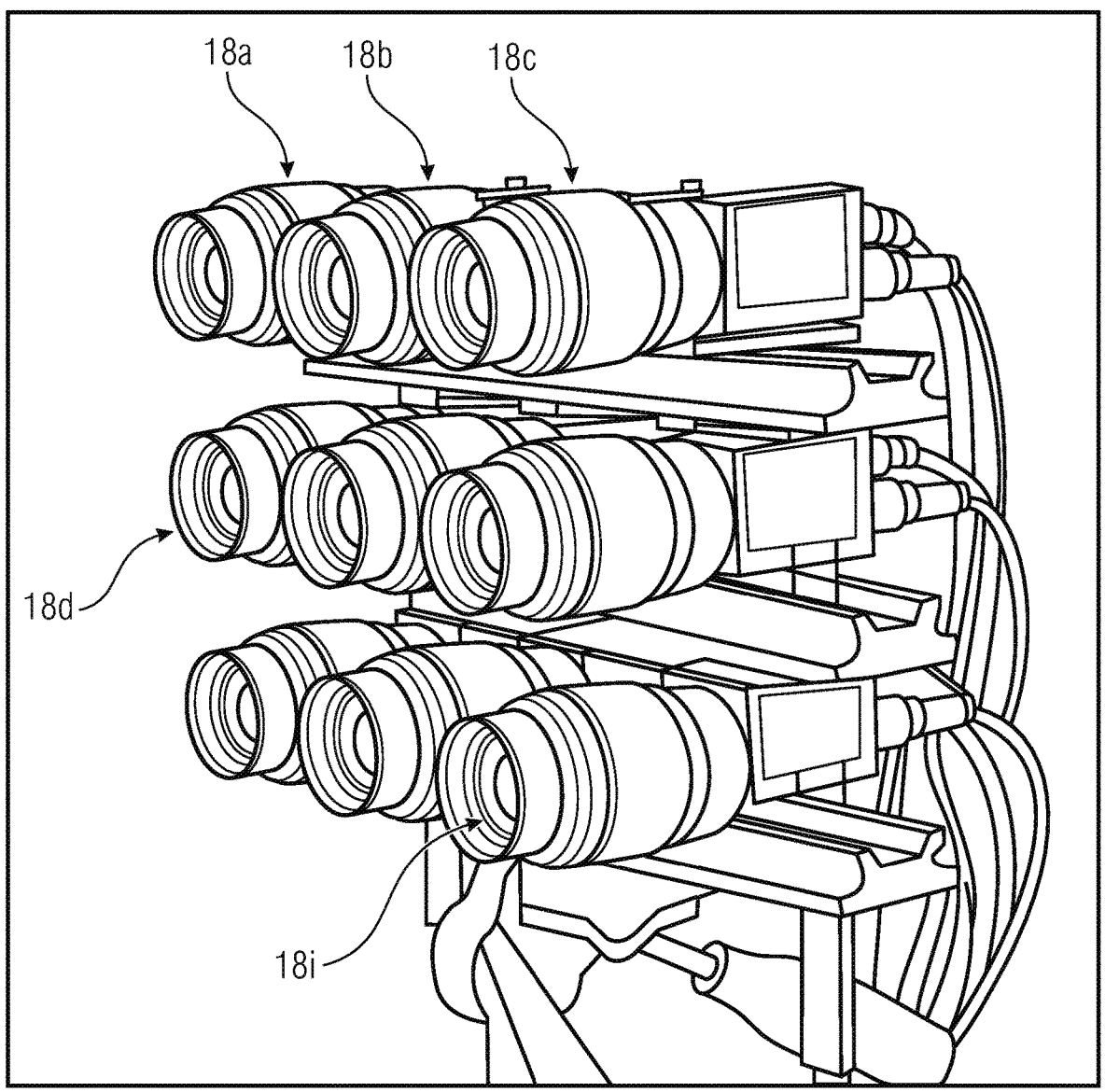
FIG. 4a is a schematic perspective view of nine cameras that are arranged according to an embodiment.

FIG. 4*a* shows a schematic perspective view of nine cameras 18*a* to 18*i* that are arranged according to a 3×3 pattern.

Figure 4B:
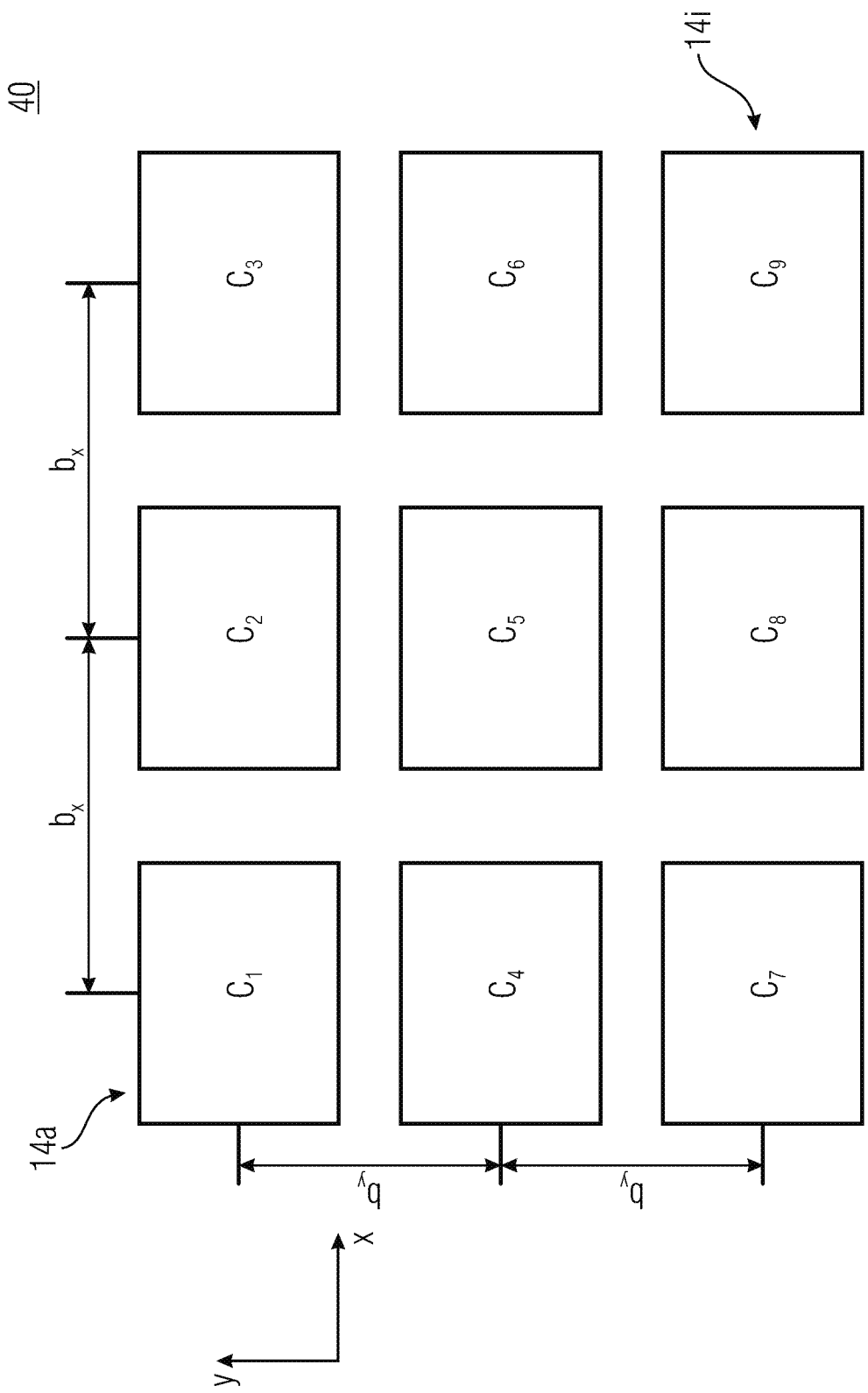

FIG. 4*b* shows a schematic view of the pattern 40, wherein the images 14*a* to 14*i* are arranged according to the pattern 40 of the cameras 18*a* to 18*i* in FIG. 4*a*. Distances $b_x$ and $b_y$ may differ from camera to camera which may be compensated for when determining the offset information.

In other words, FIG. 4*b* shows a schematic view of a 3×3 camera array from the back side. Cameras in the array are consecutively numbered starting at the top left corner with camera $C_1$ going on to the right, to the end of the row, and then continuing on to the next row in the left-most column and so on. The last camera in the bottom right corner is consequently denoted $C_{M \times N}$, M indicating the row an N indicating the column of the pattern.

Figure 4C:
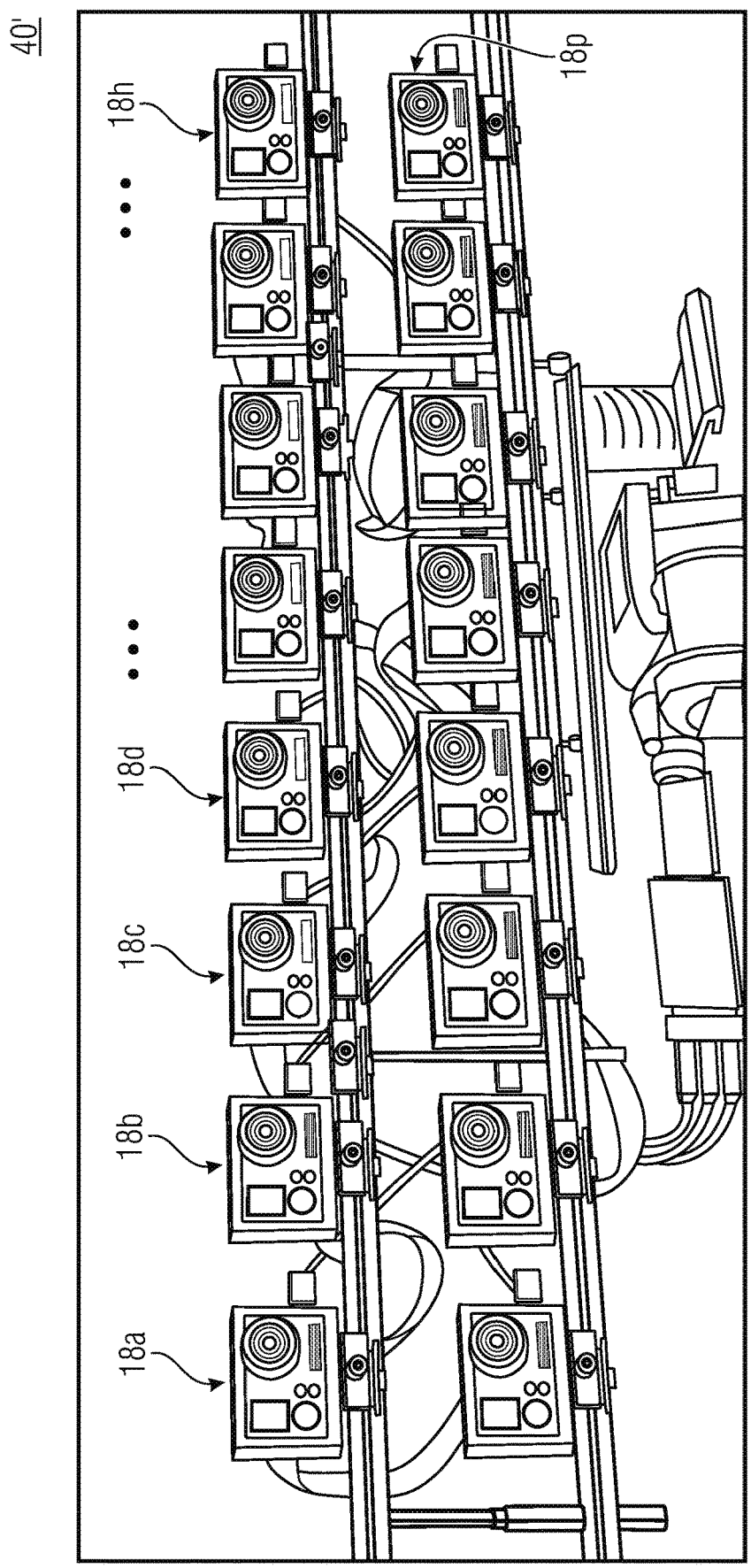
FIG. 4c is a schematic perspective view of an example camera array that is arranged according to a 2×8 pattern.

FIG. 4*c* shows a schematic perspective view of a camera array 40' that is arranged according to an 2×8 pattern. Any other patterns comprising an arbitrary number of cameras may be implemented. The concept may be implemented for a number of three or more images. The at least three images may be acquired at different locations with at least one camera. As the rectification is done on an image-basis, also a single camera may be used that is moved between taking the pictures. The distance between the centers of the cameras or the principal points may then relate to the distance when having moved from position one to position two. Accordingly, to be able to take at least three pictures, also two cameras may be used, wherein at least one camera is moveable. Three images may also be acquired by three cameras such that for any number of images a corresponding number of cameras or a lower number may be used.

Although having described patterns that comprise a square or rectangular shape, any other shape may be realized. Any number of cameras such as at least three, five, nine or sixteen may be used. Thus, known approaches are extended towards two dimensional arrays of cameras, for example, such as shown in FIGS. 4*a* and 4*c*. Such two dimensional systems may comprise a set of cameras but may also be mounted on a gantry that is able to move the camera to a specific position and take a picture.

Apparatus 10 implements a concept that transforms the images such that the remaining deviation compared to a given model is minimized. This may be achieved by approximating a highly non-linear problem by a series of sub-problems that may be of a linear nature. The overall problem may be approximated and solved using iterative minimization methods minimizing the residual error. Alternatively, the apparatus 10 may also be configured to solve a non-linear optimization.

Figure 4D:
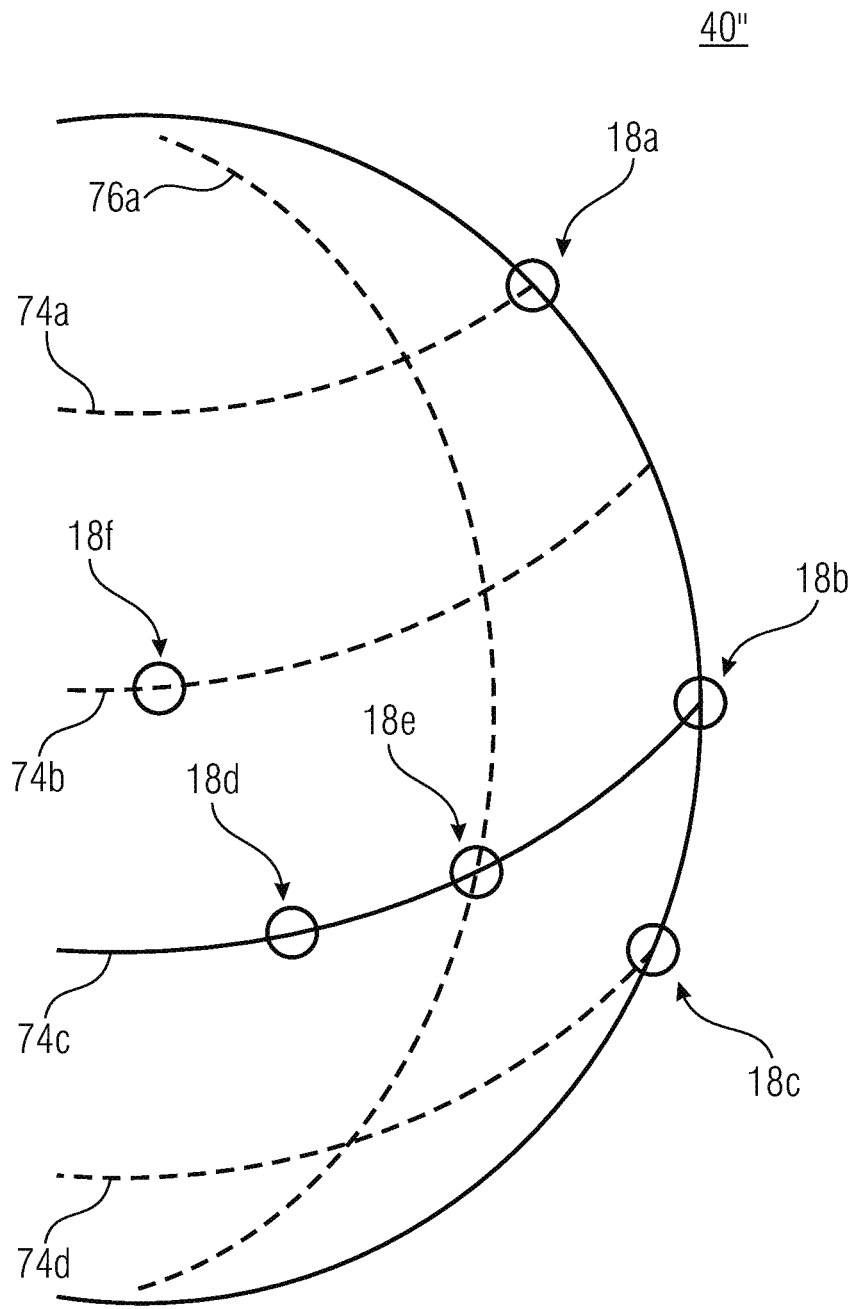
FIG. 4d is a schematic representation of an example 3D camera pattern.

FIG. 4*d* shows a schematic representation of a 3D camera pattern 40" that is arranged, by non-limiting example, on a curved surface such as on a sphere. The pattern may also be considered to have lines 74*a-d* and/or columns 76*a*, wherein the lines and/or columns may be occupied different from each other. Alternatively or in addition, the lines and columns may be arranged in a non-perpendicular manner with respect to each other, along curved lines and/or columns or according to other rules.

Figure 4E:
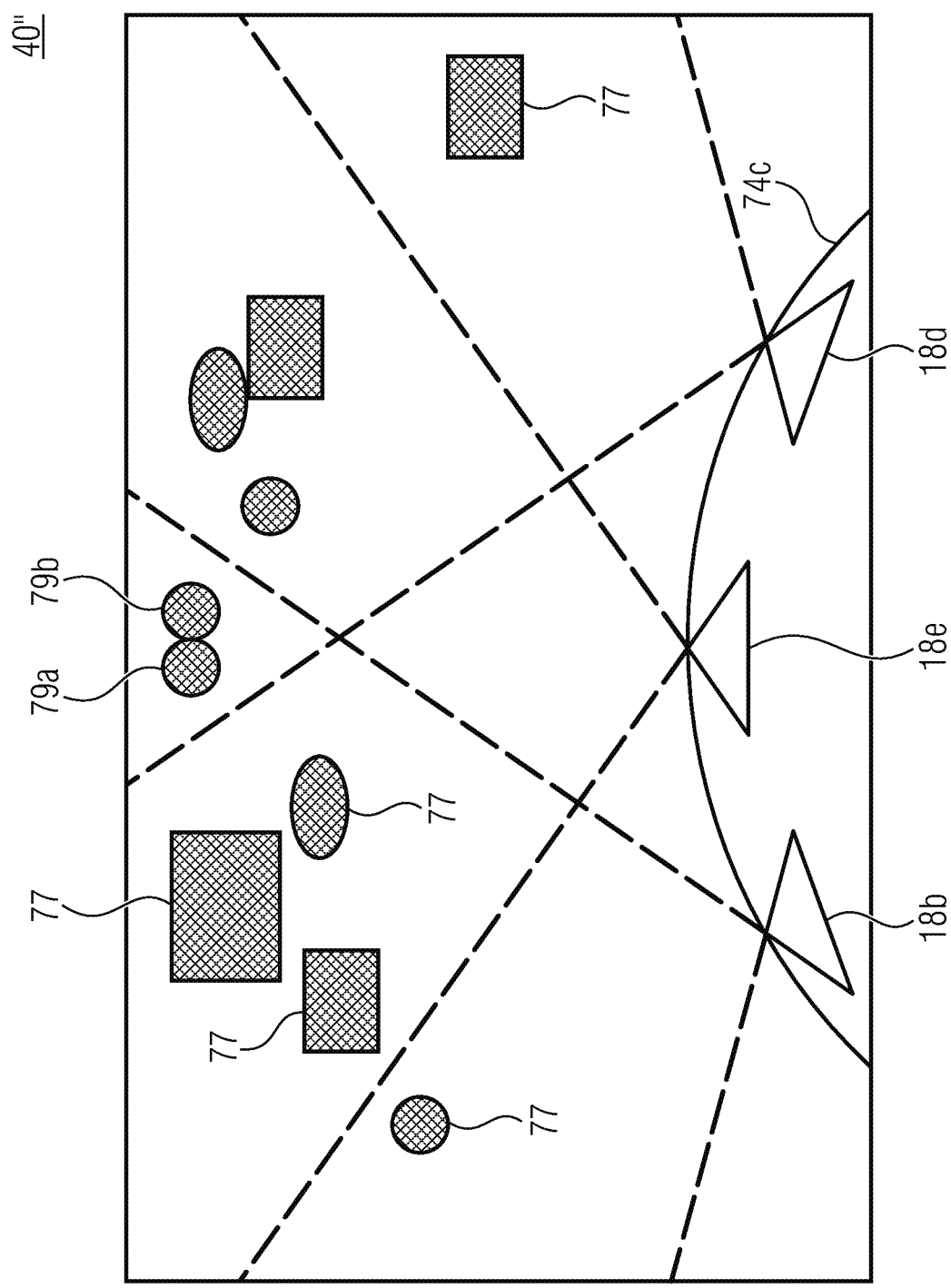
FIG. 4e is a schematic top view of a part of the pattern of FIG. 4d.

FIG. 4*e* is a schematic top view of a part of the pattern 40" of FIG. 4*d*. Objects 77 and 79 may be part of a scene to be captured. The pairs of cameras 18*b*/18*e* and 18*d*/18*e* of line 74*c* may each have different direction of view and different distances to the objects 79a and 79b that are seen by both pairs which may lead to additional information needed when compared to a 2D-pattern.

In other words, typically, the precision of mechanical setups is limited. Therefore, the exact properties of one or several cameras need to be reconstructed. Such a reconstruction of camera parameters is also known as calibration. In this procedure, different measurements are made and based on a physical or mathematical model, unknown parameters are found using the analyzing unit and/or the determining unit. Once those unknown parameters are found, one can use these parameters, for example, to define a function that transforms a set of non-rectified images into a set of rectified images. Thus, the obtained calibration data may be applied to non-rectified images which allows for storing or transmitting the non-rectified images even if the displacement information has already been obtained.

The focal length f of a camera may differ from its intended/ideal value in horizontal and/or vertical direction via the error at. The skew factor s may be used to describe the skew of a pixel. In the case of modern imaging sensors, this factor is typically 0, meaning that pixel cells are rectangular. The principal point describes the point of intersection between the camera's optical axis and the sensor. If the sensor is positioned exactly beyond the central point of the optical axis, $\tau_x$, deviation along the x direction and $\tau_y$, deviation along the y direction, both are zero. Therefore, the properties of a camera may be formulated as a matrix as:

$$K = \begin{pmatrix} f_x & s & \tau_x \\ 0 & f_y & \tau_y \\ 0 & 0 & 1 \end{pmatrix} \qquad \text{Formula 2}$$

By convention it may be formulated that, in a default state, an ideal camera is oriented such that it is strictly pointing down the z axis of a coordinate system such as the one illustrated in FIG. 2d. Image lines may be parallel with the x axis while image columns may be parallel with the y axis, respectively and by non-limiting example only. It should be understood that different coordinate systems may be used that may be transferred from one into another without limitation. In such a case, the rotation matrix may be the identity matrix I. This is not constantly the case and therefore the rotation matrix R is a general rotation matrix that is constructed from three angular components α, β and γ, denoting rotations about the primary axes of the coordinate system as described in connection with FIG. 2c. The camera position C may be given as a three dimensional coordinate. The projected points or image points $m_i$ from a set of 3D world points $M_1 \ldots M_N$ may then be computed according to the determination rule:

$$[m_1^T \ \ldots \ m_N^T] = P! \cdot \begin{bmatrix} M_1^T & \ldots & M_N^T \\ 1 & \ldots & 1 \end{bmatrix} \qquad \text{Formula 3}$$

In this case $[M_i^T, 1]^T$, denotes a homogenous 4D coordinate. The resulting image coordinate $m_i$ may then be a three-element vector. This point represents an image coordinate such that the vector may be normalized to its third component. After this normalization, u and v denote the horizontal/vertical position of a point in an image plane which may also be understood as distance (in pixels) from a side of the image.

For each vector m, the following rule may be applied:

$$m_i = \begin{pmatrix} u_i \\ v_i \\ 1 \end{pmatrix} \qquad \text{Formula 4}$$

In the context of multi-camera self-calibration, bundle adjust (BA), as described in [2], chapter 18, and which is also known as bundle-adjustment, is a known and proven algorithm. This algorithm uses iterative optimization methods like the Levenberg-Marquardt algorithm to minimize the following problem:

$$\min_{\hat{P}^i, \hat{M}_j} \sum_{ij} d(\hat{P}^i \cdot \hat{M}_j, x_j^i) \qquad \text{Formula 5}$$

wherein d(•) denotes the geometric distance between an image point $x_j^i$ and a re-projected point $\hat{P}^i \cdot \hat{M}_j \cdot \hat{P}^i \cdot \hat{P}^i$ denotes the estimated camera matrix for camera i and $\hat{M}_j$ denotes an estimated world point. Variants of this algorithm are known that are designed to improve efficiency for specific applications and working points. In [3] a method is presented to calibrate a similar camera system consisting of 25 cameras in total. A well-known chart-based calibration method presented in [4] is used and the result is refined using global optimization. Other works as presented in [5], [6] and [7] use additional means like projected patterns or laser pointers to calibrate a set of cameras or entail actively controlling the camera orientation or zoom. A calibration procedure as described in [8] whilst making references to [9] involves the user to provide a calibration object (such as a checkerboard) in front of the multi-camera system. Furthermore the system is limited to two-dimensional (2D) camera setups and the calibration object needs at least to be partially visible in all cameras at once. The properties of the calibration object need to be known to the algorithm. Thus, the calibration object cannot be selected arbitrary. Thus, in known systems, properties of the calibration object are known to the algorithm. I.e., the number of patches on the checkerboard or the fact that all patches are squares. This is directly exploited in the algorithm. The algorithm will fail if the calibration object cannot be detected properly.

Camera systems such as the ones illustrated in FIGS. 4a and 4c and schematically illustrated in FIG. 4b are arranged so as to share one common plane and their optical axis may be roughly, i.e., at most ±15%, ±10% or ±5% deviation is possible, perpendicular to that plane. Additionally, all cameras form a rectangular grid. A grid may be understood as comprising lines 74 and columns 76 that may be, but do not need to be, perpendicular to each other. The apparatus 10 has knowledge about the physical layout of the camera setup, i.e., the analyzing unit 24 and the determining unit 36 have such knowledge. The model or knowledge includes knowledge about a camera position C and each camera's ideal orientation. The ideal orientation is thus a specified condition.

The starting point of the calibration procedure that may be performed with apparatus 10 may be seen on the left hand side of FIG. 3b. It illustrates a subsystem of four cameras that is arranged on a 2×2 grid and captures a scene from slightly different positions. Corresponding image points, i.e., the reference points $26_1$ to $26_4$, are connected with lines. A set of corresponding points denotes image points, regions or objects that refer to the same 3D scene point. Thus, even if defining reference points, embodiments are not limited to single points but refer to image regions or objects. In other words those individual image points correspond to a single scene point. This point/object is observed in two or more individual cameras. Corresponding points can be detected by means of feature detection and matching algorithms. Those algorithms assume that the projection of an object into different cameras results in similar image patches. Due to different distortions such as non-exact mechanical alignment, corresponding points typically form a non-regular quadrilateral. This is not very descriptive and establishing a simple relationship between those corresponding points 26 is intuitively difficult or impossible. Therefore, the images are transformed such that the connecting shape is rectangular for all corresponding points in the images. By aligning the reference points $26_1$ to $26_4$, other selected reference points may also be aligned. An aligned version is illustrated in FIG. 3b on the right hand side. Once this requirement is met, further processing steps like stereo-matching may be executed efficiently.

Based on the pinhole camera model and the projection matrix P, the situation on the right hand side of FIG. 3b may be met if the cameras' focal length is identical and the optical axis of the cameras are parallel and perpendicular to the plane formed by the cameras' centers.

In the remaining part of the document subscripts as in $x_p$ are used to indicate that a vector x denotes properties or information belonging to a specific element such as a camera p. If a variable encodes information belonging to a pair or tuple of cameras we denote this using a two-element subscript such as $\varphi_{pg}$ In this example $\varphi_{pg}$ encodes an angular relationship between to cameras p and q. Similarly, relationship or information comprising three cameras is encoded using a three element subscript such as in $A_{pqr}$.

The calibration task can be formulated as measuring the deviation from its ideal state and finding a set of functions $H(x_p, C_p, C_q)$ and $H(x_q, C_p, C_q)$ that, given a pair of images, transforms each image point such that corresponding image points are located in the same image row. For example, matrix H is a 3×3 homography matrix. Mathematically, this may be expressed as:

$$v(H(x_p, C_p, C_q) \cdot P_p \cdot M) - v(H(x_q, C_p, C_q) \cdot P_q \cdot M) = 0 \qquad \text{Formula 6}$$

$$\underbrace{v(H|(x_p, C_p, C_q) \cdot m_p)}_{\text{left view}} - \underbrace{v(H(x_q, C_p, C_q) \cdot m_q)}_{\text{right view}} = 0 \qquad \text{Formula 7}$$

M denotes a 3D world coordinate, $P_p$ denotes the projection matrix for camera p. Typically, M as well as P are unknown. Assuming that the world point M can be seen in both cameras p and q, this point forms one pair of corresponding image points $m_p$ and $m_q$. $H(x_p,C_p,C_q)$ is a function of each camera's position $C_p$ and $C_g$ and several intrinsic parameters $x_p$. The row vector x may be formulated according to the rule:

$$x := [\alpha \beta \gamma_f p_x p_y \kappa] \qquad \text{Formula 8}$$

$H(x_p,C_p,C_q)$ may be modeled using the pinhole camera model. The outer function $v(\bullet)$ is used to extract the vertical component of an image point. The equation given above may be implemented for all possible pairs of cameras for a given subset which is relevant for the further processing.

Although Formulas 6 and 7 and other descriptions made herein differentiate between left view and right view, this may be changed with respect to each other or manipulated, without any limitation. When referring, for example, to FIG. 3b, x direction and y direction are illustrated as travelling from left to right or from bottom to top and therefore define positive and negative values of Formulas 6 and 7. By redefining the coordinate system such as when letting x travel from right to left, the left view and the right view are interchangeable. It is therefore important to differentiate between the views of a stereo setup in view of the coordinate system. For example, p may be related to the left view and q may be related to the right view or camera. In other words, camera q is to the right of camera p. For this reason, the ordering of the camera positions C is p, q in the left part of Formula 7 as well as in its right part.

The problem discussed above is typically valid for the case of a pinhole camera that does not suffer from side effects like lens-distortion. If lens-distortion is relevant for a specific camera and lens in an implementation Formula 7 may be extended:

$$v(H(x_p,C_p,C_q)\cdot \text{undist}(m_p,x_p)) - v(H(x_q,C_p,C_q)\cdot \text{undist}(m_p,x_q)) \qquad \text{Formula 9}$$

Undist( ) denotes a function that reverts lens-distortion according to some model and parameters contained in x as $\kappa$ (Formula 8). Undist( ) may be defined as:

$$\text{undist}(m, x) := \begin{pmatrix} \tau_x + L(\sqrt{u^2 + v^2}, \kappa) \cdot (u - \tau_x) \\ \tau_y + L(\sqrt{u^2 + v^2}, \kappa) \cdot (v - \tau_y) \\ 1 \end{pmatrix} \qquad \text{Formula 10}$$

$$L(r, \kappa) := 1 + k_1 \cdot r + k_2 \cdot r^2 + \cdots \qquad \text{Formula 11}$$

Function $L(r, \kappa)$ actually models the distortion and is controlled by $\kappa$. Different models may be selected as well as a different length of parameter vector $\kappa$. Here, the discussion is limited to two elements in $\kappa$. In the ongoing part of this text, explicit elements in $\kappa$ will be referred to as k such that $\kappa$ may be expressed as: $\kappa=[k_1, k_2, \ldots ]$.

In principle, this problem may be solved using stereo calibration methods on each pair of cameras. In general, such a method will estimate a parameter set $x_p$, $x_q$ for images p and q, but a different parameter set $\tilde{x}_p, \tilde{x}_r$ for images p and r, wherein image r is located, for example, below picture p such as image 14c with respect to image 14a. In contrast, it is an object to obtain only one set of parameters x per camera. The desired calibrated situation may also be expressed using the camera matrices P. In the calibrated case, all cameras have identical camera matrices K. All cameras are orientated identical with their optical axis perpendicular to the camera baseline. In this situation, the camera matrix P only depends on the camera position C as described by:

$$P_p = K \cdot [I | -C_p] \qquad \text{Formula 12}$$

In the case of independent stereo calibration, the obtained solution is slightly different and doesn't match all criteria: Self-calibration methods can only estimate a relative difference between two cameras. This is, of course, also true for the principal point. In case of a horizontal calibrated stereo rig with corresponding image points on identical image lines, both horizontal principal points $\tau_{x,1}$ and $\tau_{x,2}$ may be selected and manipulated arbitrarily. Both images still form a stereo system. This fact is, in example, also exploited in stereoscopic productions to manipulate the convergence plane.

In case of complex image processing such as multi-camera disparity estimation, one likes to ensure that corresponding image points across more than two views can be correlated by a simple relationship. Based on the simplified projection matrices given in Formula 9, one can deduce the following formula:

$$\frac{disp_{1,2}}{|C_2 - C_1|} - \frac{disp_{1,3}}{|C_3 - C_1|} = 0 \qquad \text{Formula 13}$$

Given a triplet of matching feature points, one can see that stereo disparity directly corresponds to the distance between the cameras' centers. The denominator of Formula 10 may be the distance 44 or $b_x$, $b_y$, respectively.

In a real setup, true camera positions will slightly differ from the given values C and known calibration methods are in general not applicable. However, the concept according to embodiments described herein assumes that the positional error is very small and can be ignored which allows for a reduced space of parameters and therefore for a lower complexity of the problem. The concept according to the embodiments described herein may be applied but may slightly increase back-propagation error.

It is therefore one aspect of the embodiments described herein to first align the images and afterwards determine the distance between the principal points by using a different number of images. For determining the displacement information, images may be used pair-wise, wherein the offset information may be determined using three cameras.

The displacement information as well as the offset information may be determined without user-interaction. For each pair of images/triplet of images robust corresponding points, i.e., reference points, regions or objects are determined in an automatic manner, especially without a user providing special calibration patterns such as checkerboards or similar objects. In contrast to existing systems (such as [8]) it is in addition not needed that a single (possibly known) object or point can be observed in all cameras at one time.

Thus, the number of cameras is adapted to the problem to be solved. Furthermore, the underlying non-linear optimization problem may be reformulated. The analyzing unit and/or the determining unit may be configured to solve the non-linear optimization problems. According to an embodiment, the analyzing unit and/or the determining unit may be configured to linearize the non-linear problem for some distinct points and to solve the linearized versions using standard iterative minimization algorithms. Instead of solving one large non-linear problem, such embodiments set up a list of local, piece-wise linear problems that are used to formulate the global problem. This global problem may then be solved iteratively using linear methods. When assuming that the mechanical design of the system is known, including camera position and ideal orientation, the calibration procedure may enforce camera views to obey this model. Additionally, the determination of the displacement information may be split into two parts. By this, highly correlated parameters leading to unstable results can be separated and optimized sequentially. Known approaches such as BA involve estimating 3D world points from image correspondences. This is, in itself, a complex, erroneous procedure. In embodiments, 3D world points are not needed, increasing the stability and efficiency of the approach. By example, BA optimizes camera parameters as well as position of 3D world points. The total number of degrees-of-freedom can be computed as 7×N+3×P. In this case, N denotes the number of cameras while P denotes the number of 3D world points. According to embodiments, a focus is set on the intrinsic parameters and the camera rotation. This, initially, yields, in an example, number of degrees-of-freedom of 8×N. When referring again to Formula 8, the vector x comprises a number of 6 parameters. When formulating a problem based on the 6 parameters that rely on a single camera, the number of cameras N×8 values per camera yield in the value above. Thus, embodiments described herein focus on obtaining a result, i.e., the displacement information and the offset information, that makes subsequent image processing steps efficient. In the first step, correspondences between image pairs are sufficient. The second step involves correspondences in three, possibly adjacent, views. This solution may spread an error in the camera array among all cameras, which is a specific property of embodiments described herein. Thus, an apparatus such as apparatus 10 may be configured to impinge on an error-free image with an error so as to compensate for inter-image errors. The concept is designed to fit a set of images to a given model, i.e., the camera pattern. The physical model, as well as the mapping between an image and its position in the array, is specified, by a user.

FIG. 5 is a schematic flow chart of method 500 according to an embodiment that may be used to obtain calibration data. The method 500 comprises a set 510 in which a plurality of partially overlapping images of an object is received from a corresponding plurality of cameras being arranged along a first and a second direction according to a camera pattern. In step 520, a reference point is selected in an overlap area of one of the images, and displacement information along the first and the second direction of the reference point is determined in each of the images such that a misalignment of the plurality of images along the first and the second direction is compensated for by the displacement information so as to obtain aligned images. In step 530, offset information between principal points of the plurality of cameras is determined, using at least three aligned images. In step 540, calibration data is provided based on the displacement information and based on the offset information. The calibration data allows for calibrating the plurality of images so as to comply with the camera pattern when being applied to the images.

Figure 6A:
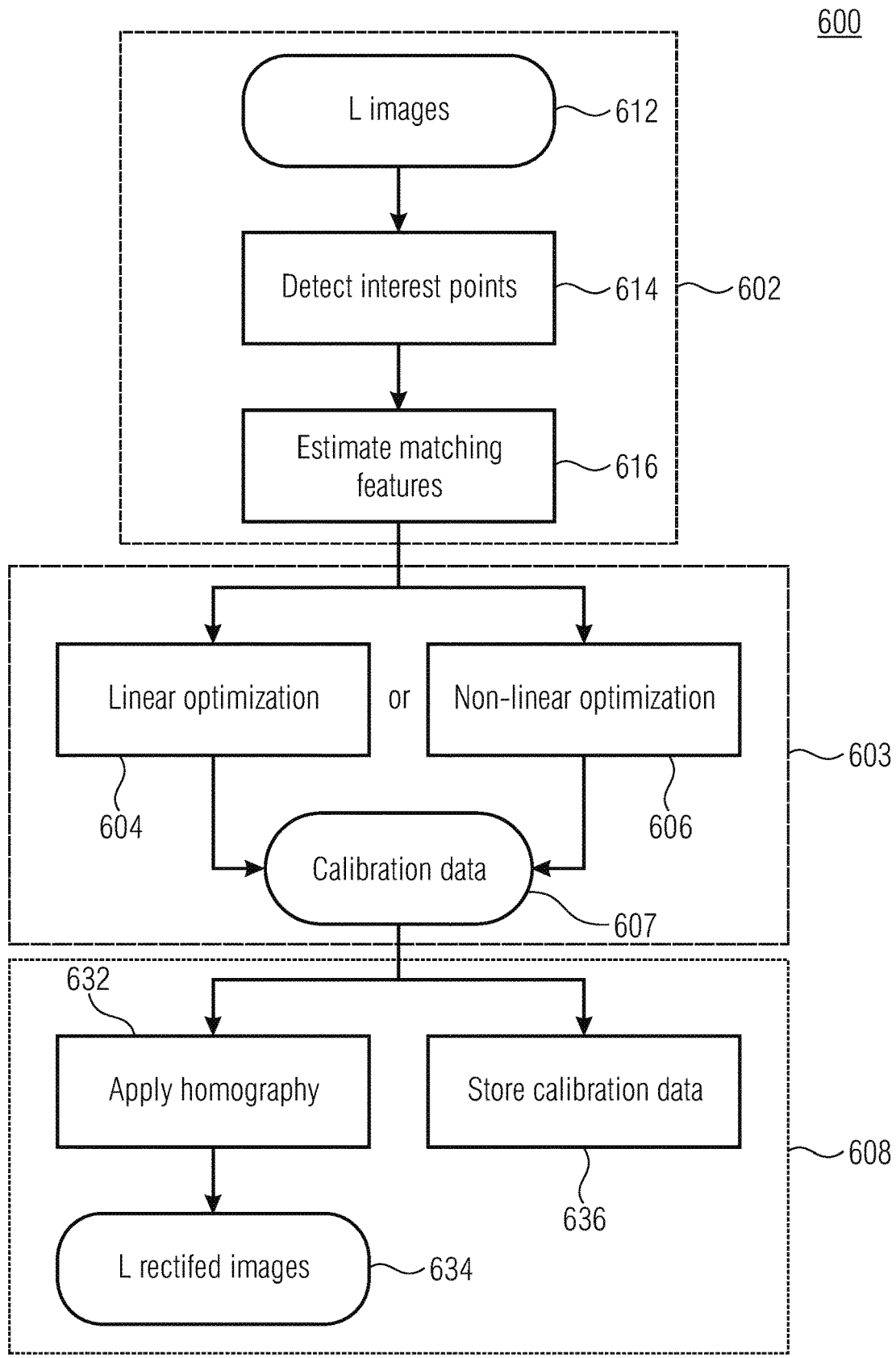
FIG. 6a is a schematic flow chart of another method for obtaining calibration data according to a further embodiment.

FIG. 6a is a schematic flow chart of another method for obtaining calibration data according to a further embodiment. The method may be organized in three sub-methods 602, 603 and 608. Block 602 may be considered to be an initialization. The initialization 602 may comprise steps 612, 614 and 616, wherein in step 612 L images are obtained, for example, from a L=M×N camera array with L=M×N cameras. In another example the L images are obtained from a sphere or cylinder like structure with L cameras. Two or more of the L cameras may be substituted by a single camera that is moved between different positions and configured to provide more than one picture. For simplicity, the method 600 is first described for the special case of an L=M×N camera array with cameras mounted on a rectangular grid.

Sub-method 603 comprises block 604 that is a linear optimization procedure and block block 606 that is performed alternatively or in addition to block 604 and is a non-liner optimization procedure. Only one of the blocks 604 and 606 needs to be executed in order to obtain a set of calibration data 607. Block 608 generates, in a block 612, a set of calibrated images from the calibration data obtained in 607 so as to obtain L rectified images in a block 614 or stores the calibration data in a block 616 for future use. Method 600 allows for use of linear strategies as well as of non-linear strategies and is consistent for planar camera array and non-planar camera array.

In the following reference will be made to a use of a linear optimization, for example, in block 604 using steps 612,614 and 616 of method 600. In the M×N camera array (M−1)× N+(M−1)×N, individual stereo pairs can be formed using directly adjacent camera positions. When referring, for example, to FIG. 4b, such pairs may be $C_1/C_2$, $C_1/C_4$, $C_2/C_3$, $C_2/C_5$, $C_3/C_6$, $C_4/C_5$, $C_4/C_7$, $C_5/C_6$, $C_5/C_8$, $C_6/C_9$, $C_7/C_8$, and $C_8/C_9$. I.e., the analyzing unit may be configured to determine the displacement information pair-wise for a pair of the plurality of images, e.g., direct neighbors. Alternatively, any other pairs of images may be used such as $C_1/C_5$, $C_1/C_9$, $C_2/C_6$, or the like. The apparatus is configured to select a sufficient number of pairs that allows determining a needed number of parameters. Such a number of parameters may be, by non-limiting example only 6 as described above. Such a number is needed for each camera such as 9 such that in total 54 parameters are needed. Each camera is advantageously part of a number of different pairs of images that corresponds to the number of dimensions along which the camera pattern is arranged. A single line is considered as one-dimensional, camera positions (centers) differing in two directions are considered as two-dimensional and camera positions (centers) differing in three directions are considered as three-dimensional. For the present example, this is true for each camera being part of at least two pairs which is fulfilled for the list given above, wherein a number of 8 pairs (each of the 9 cameras may for a pair with 8 other cameras and has to be a part of two pairs equals in 2×8/2), wherein additional information may be obtained by additional pairs.

Although description was made in connection with a number of six parameters that are to be determined in order to calibrate images, also a different number of parameters or different parameters may be used, e.g., in case one or more of the above mentioned is considered to be within a tolerance range, calibration of that parameter may be skipped. Alternatively or in addition other parameters may be considered such as a distortion of lenses used in the cameras which may lead to low picture quality. The apparatus 10 may be configured to calibrate for the distortion, e.g., during determination of the displacement information. Different reference points in the image may allow for compensating the distortion of the lens.

In this way, each view is at least involved in two individual stereo pairs. The set of stereo pairs is further referenced as the set Ω. The set Ω may in example comprise pairs (p,q), (p,r), (q,r) and others. In general, the method is not limited to directly adjacent cameras. Each possible pair of views with overlapping image areas that allow for a common reference point may be formed. In step 614 interest points or reference are detected on each of the images and these interest points are matched on the mentioned stereo pairs in step 616. This may be done using any arbitrary feature detection and matching algorithm like SIFT, SURF or BRIEF. As a result, sets of corresponding, matched image coordinates $$m_{p,q} = \{\underbrace{u_p, v_p}_{m_{p,q}^{(p)}}, \underbrace{u_q, v_q}_{m_{p,q}^{(q)}}\}$$

between two images p and q is obtained.

$u_p$ and $v_p$ denote vectors containing l horizontal/vertical positions of feature matches between view p and view q respectively. In the example of FIG. 3b, l would have dimension 1. If only one set of feature points belonging to a set of cameras is needed, this is denoted by an additional superscript in round braces. I.e., $m_{p,q}^{(p)}$ denotes all feature points in image p obtained from the pair (p,q). The third (homogenous) component is neglected here but is considered in further steps. In such a case, the third homogenous component may be set to a value of 1.

In block 604 disparities along a direction, e.g., vertical disparities, for all stereo pairs contained in Ω are reduced or minimized. For example, this may be done along the vertical direction such as the y direction. Formally, for one pair (p,q) this can be written as:

$$0 = v(H(x_p, C_p, C_q) \cdot m_{p,q}^{(p)}) - v(H(x|_q, C_p, C_q) \cdot m_{p,q}^{(q)}) \quad \text{Formula 14}$$

As before, $H(x_p, C_p, C_q)$ denotes a function returning a 3×3 homography matrix for view p. The argument $x_p$ of this function is a vector of length k. Function v(x) extracts the vertical component of a feature point coordinate:

$$v(x) = \frac{x(2, i)}{x(3, i)} \forall i \in l$$

where x is a 3×1 matrix. Consequentially, v(x) returns a vector of length l. In the present consideration x is a variable unrelated to other variables named x herein and shall simply denote an argument of function v. The overall minimization task can now be formulated as:

Formulas 15 & 16

$$\operatorname*{argmin}_{x_1, x_2, x_3, \ldots, x_{N}} \sum_{(p,q) \in \Omega} \|v(H(x_p, C_p, C_q) \cdot m_{p,q}^{(p)}) - v(H(x_q, C_p, C_q) \cdot m_{p,q}^{(q)})\|$$

$$\text{with } \|x\| = \sum_l x_l^2$$

The result thereof may allow the analyzing unit for obtaining a solution for all images p, q, r and s forming pairs, the pairs being comprised of the set Ω, i.e., a common solution for all x may be obtained.

In Formula 15 the square norm is selected in order to model the error between two views. Other choices are possible. The notation $\Sigma_{(p,hd\ q) \in \Omega}\|arg\|$ indicates that the tuple (p,q) is one tuple exemplarily selected from the set Ω but also that the summation is performed for all tuples contained in Ω. $H(x_p, C_p, C_q)$ is defined as a product of three functions $R_0$, K and $R_i$:

$$H(x_p, C_p, C_q) = R_0 \cdot K \cdot R_i = R_0 \cdot \tilde{H}(x_p)$$

$$\text{with } \tilde{H}(x_p) = K \cdot R_i \quad \text{Formula 17}$$

This formulation can be interpreted as follows: The rightmost rotation matrix $R_i$ corrects a camera's orientation such that it corresponds to its ideal orientation as given by the ideal camera setup. The center matrix K corrects parameters like focal length and principal point. The left-most rotation $R_0$ rotates a camera p such that it forms a stereo system with a camera q. Only this matrix is individual for each pair of views.

K may model the standard camera matrix as given above. $R_0$ and $R_i$ denote the outer and inner rotation matrix. More precisely, $R_0$ is computed from the relative position and orientation of two cameras p and q. Because each camera position is known, $R_0$ is known. In some arrangements, all these cameras share one common plane, such that the outer rotation $R_0$ can be modeled using a single rotation around the optical axis. This may be referred to as angle φ that is explained in connection with FIG. 3c. As illustrated in FIG. 3a, a 2×2 camera array in a general state may comprise camera 18b that is slightly rotated by angle $γ_2$, wherein camera 18c has a slight deviation in focal length. For the pair $C_1$, $C_3$, $R_{0,13}$ needs to rotate $C_1$ and $C_3$ by −π/2 to form a rectified system assuming that no further distortion occurs. The angle φ may be computed with respect to left/right viewpoint. In the example of FIG. 3a, $C_1$ is exactly above $C_3$. In order to be rectified to camera 18c and being the left view in this setup, $C_1$ may be rotated by −90°. In contrast, $C_3$ forms the right view and is consequently also rotated by −90°. This is also expressed in the argument ordering of H. The second argument denotes the left view while the third argument denotes the right view.

Alternatively, Formula 17 may also be defined as:

$$H(x_p, C_p, C_q) = R_0 \cdot R_i \cdot K = R_0 \cdot \tilde{H}(x_p)$$

with $\tilde{H}(x_p) = R_i \cdot K$ \hfill Formula 17b

In the more general case when the cameras do not share a common plane, the apparatus, in particular the analyzing unit is configured to determine $R_0$ from the position $C_p$ and $C_q$ of two cameras p and q. $R_0$ is a 3×3 matrix with elements as listed below:

Formula 18

| | |
|---|---|
| $R_0(1,1)$ | $c_{p_1} - c_{q_1}$ |
| $R_0(1,2)$ | $(c_{p_2} - c_{q_2}) \sqrt{-(c_{p_1} - c_{q_1} + 1)(-1 + c_{p_1} - c_{q_1})}$ |
| $R_0(1,3)$ | $(c_{p_3} - c_{q_3}) \sqrt{-(c_{p_1} - c_{q_1} + 1)(-1 + c_{p_1} - c_{q_1})}$ |
| $R_0(2,1)$ | $-(c_{p_2} - c_{q_2}) \sqrt{-(c_{p_1} - c_{q_1} + 1)(-1 + c_{p_1} - c_{q_1})}$ |
| $R_0(2,2)$ | $(1 - c_{p_1} + c_{q_1}) c_{p_3}^2 + 2 c_{q_3}(-1 + c_{p_1} - c_{q_1}) c_{p_3} + (1 - c_{p_1} + c_{q_1}) c_{q_3}^2 + c_{p_1} - c_{q_1}$ |
| $R_0(2,3)$ | $(c_{p_3} - c_{q_3})(c_{p_2} - c_{q_2})(-1 + c_{p_1} - c_{q_1})$ |
| $R_0(3,1)$ | $-(c_{p_3} - c_{q_3}) \sqrt{-(c_{p_1} - c_{q_1} + 1)(-1 + c_{p_1} - c_{q_1})}$ |
| $R_0(3,2)$ | $(c_{p_3} - c_{q_3})(c_{p_2} - c_{q_2})(-1 + c_{p_1} - c_{q_1})$ |
| $R_0(3,3)$ | $(1 - c_{p_1} + c_{q_1}) c_{p_2}^2 + 2 c_{q_2}(-1 + c_{p_1} - c_{q_1}) c_{p_2} + (1 - c_{p_1} + c_{q_1}) c_{q_2}^2 + c_{p_1} - c_{q_1}$ |

The parameter vector $x_p$ contains all unknown parameters for a camera p and is defined according to Formula 8. Based on this definition $H(x_p, C_p, C_q)$ may now be completely defined as:

Formulas 19 & 20

$$H(x_p, C_p, C_q) = R_o(0, 0, φ_{p,q}) \cdot K(a_f, τ_x, τ_y) \cdot R_i(α, β, γ)$$

$$\text{with } φ_{p,q} = a\tan\frac{C_{p,2} - C_{q,2}}{C_{p,1} - C_{q,1}}$$

The integer number subscript such as in $C_{p,2}$ denotes the second element in the vector $C_p$. Please note that in Formula 19 subscripts in the elements of $x_p$ such as α have been neglected. It should however be clear that in any formula comprising elements of x, those elements need to be interpreted with respect to specific camera p. In Formula 19 the ideal orientation of all cameras is identical and perpendicular to the baseline. If this is not the case, H can be extended by an additional rotation matrix R(ρ,α, λ) describing the specific orientation with respect to the coordinate frame:

$$H(x_p, C_p, C_q, ρ, σ, λ) \stackrel{\text{def}}{=} R_o(0, 0, φ_{p,q}) \cdot R(ρ, σ, λ)^{-1} \cdot$$
$$K(αp_x, p_y) \cdot R_i(α, β, γ) \hfill \text{Formula 21}$$

In the ongoing description the case expressed in Formula 14 is considered. If needed, calculations can be redone including R(ρ,σ, λ).

With respect to the alternative definition of Formula 17 as given in Formula 17b, Formulae 19, 20 and 21 can be adapted by switching the order of the two rightmost matrices $R_i$ and K.

According to embodiments, the apparatus is configured to consider the lens-distortion. The functionality of the apparatus may be expressed by including Formula 10 in Formula 11 and Formula 12 as to obtain an undistorted version of reference points m.

The term of Formula 14 forms a non-linear system. This formula can be solved using iterative least-square minimization techniques like Levenberg-Marquardt algorithm or comparable methods. However, this solution is inefficient. This non-linear minimization is depicted in block 606 of FIG. 6a.

The problem in Formula 12 may be reformulated in order to find the values in H efficiently: Therefore, it may be assumed that all variables in x are small. This corresponds to the block 604 in FIG. 6a. This block is depicted in more detail in FIG. 6b that illustrates a linearization strategy that may be implemented by the analyzing unit.

With the complete definition of H, Formula 12 may be evaluated for one pair of cameras p, q and for one pair of point correspondences.

In the next step such a formulation may be expanded, for example, using first order Taylor expansion of several variables. This expansion may be defined as:

$$f(x,a) := Tf(x,a) = T F_{x,a}(1,0) = F_{x,a}(0) + F_{x,a}'(0)$$

$$F_{x,a} : \mathbb{R} \to \mathbb{R} := t \to f(a + t \cdot (x-a)) \hfill \text{Formula 22 \& 23}$$

In Formulae 21 and 22 $F_{x,a}$ is a function of t that evaluates the function f(x) at the point a+t·(x−a). f(x) is the function to approximate at some point a. Parameters to the function f(x) are contained in the parameter vector x. t is a scalar value. a is a vector with identical size as x. First order Taylor approximation T of a function f(x) at some point a may be expressed as Taylor expansion of a scalar function $F_{x,a}(t)$. $F_{x,a}$ is expanded at point $t_0$=0 by computing the function value of $F_{x,a}$ with $t_0$=0 and the value of the first order derivative $$F_{x,a}' = F_{x,a} \frac{d}{dt}$$

also at $t_0$=0. Evaluating the resulting term at t=1 yields the first order Taylor approximation of function f(x) at point a. The expansion may exemplary be computed for a single pair of images p and q and a single pair of reference points. Then, Formula 16 (here also including lens-distortion as given in Formula 9) may be simplified as written in Formula 24.

$$v(H(x_p,C_p,C_q) \cdot \text{undist}([u_p,v_p,1]^T x_p)) -$$
$$v(H(x_q,C_p,C_q) \cdot \text{undist}([u_q,v_q,1]^T,x_q)) \quad \text{Formula 24}$$

The apparatus may be configured to determine the Taylor expansion using Formula 22 for Formula 24 for all variables contained in $x_p$ and $x_q$ forming a parameter vector $\chi$ like $\chi=[x_p, x_q]$. $\chi$ is argument to Formula 22 as well as an expansion point a=0. Without limitation, other expansion points may be selected.

This yields an approximation for the point $x_p=0$ and $x_q=0$. The resulting equation can be differentiated with respect to every unknown variable in $x_p$ and $x_q$. As a result, one obtains the Jacobian matrix of this system. Each column in the Jacobian matrix contains an approximation for each parameter in the system. These approximations may also be expressed as:

Formula 25

$$\left\{\begin{array}{ll} \alpha_p & -v_p u_p \sin(\varphi_{pq}) - \cos(\varphi_{pq}) v_p^2 - \cos(\varphi_{pq}) \\ \beta_p & \sin(\varphi_{pq}) u_p^2 + v_p u_p \cos(\varphi_{pq}) + \sin(\varphi_{pq}) \\ \gamma_p & u_p \cos(\varphi_{pq}) - v_p \sin(\varphi_{pq}) \\ a_{fp} & \sin(\varphi_{pq}) u_p + \cos(\varphi_{pq}) v_p \\ \tau_{xp} & \sin(\varphi_{pq}) \\ \tau_{yp} & \cos(\varphi_{pq}) \\ k_{p,1} & (\sin(\varphi_{pq}) u_p + \cos(\varphi_{pq}) v_p) \sqrt{u_p^2 + v_p^2} \\ k_{p,2} & (u_p^2 + v_p^2)(\sin(\varphi_{pq}) u_p + \cos(\varphi_{pq}) v_p) \end{array}\right\}$$
$$\left\{\begin{array}{ll} \alpha_q & v_q u_q \sin(\varphi_{pq}) + \cos(\varphi_{pq}) v_q^2 + \cos(\varphi_{pq}) \\ \beta_q & -\sin(\varphi_{pq}) u_q^2 - v_q u_q \cos(\varphi_{pq}) - \sin(\varphi_{pq}) \\ \gamma_q & -u_q \cos(\varphi_{pq}) + v_q \sin(\varphi_{pq}) \\ a_{fq} & -\sin(\varphi_{pq}) u_q - \cos(\varphi_{pq}) v_q \\ \tau_{xq} & -\sin(\varphi_{pq}) \\ \tau_{yq} & -\cos(\varphi_{pq}) \\ k_{q,1} & -(\sin(\varphi_{pq}) u_q + \cos(\varphi_{pq}) v_q) \sqrt{u_q^2 + v_q^2} \\ k_{q,2} & -(u_q^2 + v_q^2)(\sin(\varphi_{pq}) u_q + \cos(\varphi_{pq}) v_q) \end{array}\right\}$$

In this case, $k_{g,h}$ denotes the parameters to model lens-distortion of view g being either q or p according to Formula 10 and 11 and the definition of vector $\kappa$.

The remaining constant part may be formulated as:

$$b_{p,q}=(v_p-v_q)\cos(\varphi_{pq})+\sin(\varphi_{pq})(u_p-u_q) \quad \text{Formulas 26}$$

All elements in J and also the constant part $b_{p,q}$ can now be evaluated for point correspondences. The resulting system can be re-written as linear system according to:

$$J_{p,q} \cdot \begin{bmatrix} \tilde{x}_p^T \\ \tilde{x}_q^T \end{bmatrix} = -b_{p,q} \quad \text{Formulas 27 \& 28}$$

$$[J_{p,q}^{(p)} | J_{p,q}^{(q)}] \cdot \begin{bmatrix} \tilde{x}_p^T \\ \tilde{x}_q^T \end{bmatrix} = -b_{p,q}$$

In Formulas 27 & 28, $J_{p,q}$ is a lx(2*m) matrix where l denotes the number of point correspondences and m denoting the number of variables in x. b is a column vector with length l.

As the Taylor expansion only approximates the function value at one point, the true parameter vector $x_p$ needs to be replaced by an approximated value $\tilde{x}_p$. In Formula 27, $J_{p,q}$ and $b_{p,q}$ denote the Jacobian matrix and constant part of two views (p, q) evaluated for all point correspondences. As before, $J_{p,q}^{(p)}$ in Formula 28 denotes the columns of $J_{p,q}$ belonging to unknowns of camera p.

For the set of all stereo-pairs $\Omega$, the overall minimization task may be formulated by the analyzing unit 24 as follows: Each pair (p, q) in $\Omega$ forms one line in the global constraint matrix A that is generated in a step 621 of method 600. For a 2×2 camera array with four individual stereo pairs, the problem can be written as:

$$\underbrace{\begin{bmatrix} J_{12}^{(1)} & J_{12}^{(2)} & 0 & 0 \\ J_{13}^{(1)} & 0 & J_{13}^{(3)} & 0 \\ 0 & J_{24}^{(2)} & 0 & J_{24}^{(4)} \\ 0 & 0 & J_{34}^{(3)} & J_{34}^{(4)} \end{bmatrix}}_{A} \cdot \underbrace{\begin{bmatrix} \tilde{x}_1^T \\ \tilde{x}_2^T \\ \tilde{x}_3^T \\ \tilde{x}_4^T \end{bmatrix}}_{\Delta} = -\underbrace{\begin{bmatrix} b_{12} \\ b_{13} \\ b_{24} \\ b_{34} \end{bmatrix}}_{b} \quad \text{Formulas 29 \& 30}$$

$$A \cdot \Delta = b$$

The number of feature matches in each stereo pair may be greater than the number of unknown variables in x, such that the overall system is overdetermined. To solve the linearized system and thus finding a set of parameters approximating the real condition of the plurality of cameras as given by Formula 15, the system can be solved for $\Delta$ by computing the Pseudo-inverse of A. In total, the solution for $\Delta$ can be obtained as:

$$\Delta=-(A^T \cdot A)^{-1} \cdot A^T \cdot b \quad \text{Formula 31}$$

Thus, the analyzing unit may be configured to minimize the error based on the determination rule that corresponds to Formula 31. The analyzing unit may be configured for determining the displacement information using a set of parameters, that indicates a real condition of the plurality of cameras. The parameters may comprise a non-linear relationship with respect to each other. The analyzing unit may be configured to determine a linearized version of the parameters in the vector $\Delta$ and may be configured to determine the displacement information by minimizing an error of the linearized version $\Delta$ with respect to a desired condition of the plurality of cameras. This is indicated as step 622, i.e., the system is solved for $\Delta$. Alternatively, the analyzing unit may solve the non-linear problem. The at least two elements in x show the approximation for $\tau_x$ and $\tau_y$. As both do not depend on image coordinates and only depend on $\varphi$ which is constant, the linearization does not provide valuable information of these parameters. For this reason, both parameters $\tau_x$ and $\tau_y$ are excluded in this step. This works by dropping the value in $\tilde{x}_p$ and $\tilde{x}_q$ as well as the appropriate columns in $J_{p,q}$. As a consequence, deviations in a camera's principal point will be approximated by a small additional rotation around the y axis and x axis respectively. I.e., the calibration data may be based on angles that describe a rotation of the cameras, to a focal length of the camera and to a principle point of the cameras, wherein the calibration data may be in absence to a position of the cameras of the plurality of cameras, i.e., does possibly not contain information indicating the camera positions. This may be possible as the camera position is considered as known variable in the system.

The elements in $\Delta$ now contain an approximated solution for the overall non-linear problem. At this point, the overall problem can now be solved using an iterative optimization algorithm like gradient descent. In every iteration a small portion of ε·Δ is added to the previous $x_p^{(t-1)}$ forming a new $x_p^{(t)}$, i.e., the solution vector is updated in a step 623. The current $x_p^{(t)}$ is then used to generate an intermediate mapping homography $\tilde{H}$ for each camera. This intermediate homography is used to update all feature sets $(p, q) \in \Omega$. Those updated feature sets $\tilde{m}_{p,q}$ form new initial feature sets in the next iteration, i.e., the feature points are transformed in a step 624. Ideally, $x_p^{(t)}$ iteratively approaches the desired solution. As soon as Δ is smaller than threshold $\varepsilon_0$ or the remaining error cannot be reduced anymore, the algorithm stops. I.e., the analyzing unit may be configured to iteratively minimize the error of the linearized version. This is indicated in step 625 checking, if congruence is reached. This may also be expressed as:

$$x_p^{(t)} = \varepsilon \cdot \Delta + x_p^{(t-1)}$$

$$\tilde{m}_{p,q}^{(p)} = \tilde{H}_p \cdot m_{p,q}^{(p)} = K(a_{f,p}, p_{x,p}, p_{y,p}) \cdot R_i(\alpha_p, \beta_p, \gamma_p) \cdot m_{p,q}^{(p)}$$

and $\tilde{m}_{p,q}^{(q)} = \tilde{H}_p \cdot m_{p,q}^{(q)} = K(a_{f,q}, q_{x,q}, q_{y,q}) \cdot R_i(\alpha_q, \beta_q, \gamma_q) \cdot m_{p,q}^{(q)}$  Formulas 32 & 33(a)

Once this iterative minimization algorithm has converged, the second part of this linearized calibration procedure can be started, i.e., block 627 may be started, e.g., by the determining unit. At the end of block 625 a result according to FIG. 3c may be obtained, i.e., after the first rectification step, images may be pair-wise rectified. Corresponding pixels are shifted horizontally only for views in the same row and shifted vertically in the same column respectively. Both, the transformation of the images in step 622 by the analyzing unit and the estimation of the principal points in step 627 by the determining unit may be executed by determining a solution for a minimization problem that may be linear or non-linear. I.E., four problems may be formulated, two for solving the minimization criteria with respect to the transformation that may be referred to a first (vertical) disparity and two for solving the second (horizontal) disparity. The problems may be re-formulated for a 2D and a 3D-pattern of cameras.

The final state after the converge criteria is this illustrated FIG. 3c for a 2×2 array. The position of the marked objects in $C_1$ is denoted by $u_1$ and $v_1$. In $C_2$, the object has slightly moved to the left but the vertical coordinate is still $v_1$. A similar condition holds for the vertical pair $C_1$, $C_3$: the object is shifted vertically but not horizontally.

As formally expressed in Formula 13, corresponding disparity values in three cameras may depend on the array geometry only. Up to this point, this has not been taken into account in the method 604. Consequentially, it is possible that Formula 13 is not met. Simplified, a distance between columns in pairs may differ or vary. This condition can be re-written in order to formulate a condition similar to Formula 15. For a triplet of three cameras this may be formulated as:

Formula 34 & 35

$$(u(R_o(0,0,\varphi_{,p,q}) \cdot \tilde{m}_q) - u(R_o(0,0,\varphi_{,p,q}) \cdot \tilde{m}_q)) \frac{1}{d(C_p - C_q)} -$$

$$(u(R_o(0,0,\varphi_{,p,q}) \cdot \tilde{m}_p) - u(R_o(0,0,\varphi_{,p,r}) \cdot \tilde{m}_r)) \frac{1}{d(C_p - C_r)} = 0$$

with $$\tilde{m} = [\tilde{u} \quad \tilde{v} \quad 1]^T = \tilde{H}(x) \cdot m$$

H denotes the mapping homography that has been obtained in the last iteration of the previous steps, i.e., block 625. H(•) may be defined as given in Formula 17 or 17b with respect to a parameter vector x. The function u(•) extracts the horizontal component of image point. $d(C_p - C_q)$ denotes the Euclidian distance between two camera $C_p$ and $C_q$. Using $\tilde{m}$ instead of m, it may be assumed that optical axes are parallel and that all cameras have identical focal lengths. The remaining error can be modeled by a shift in the cameras' principal point. Formula 34 can now be used to define a second minimization problem which is subject to be minimized and formulated as follows:

Formula 36

$$\operatorname*{argmin}_{x_1, x_2, x_3 \ldots x_N} \sum_{(p,q,r) \in \Psi}$$

$$\left\| (u(H(x_p, C_p, C_q) \cdot m_{p,q,r}^{(p)}) - u(H(x_q, C_p, C_q) \cdot m_{p,q,r}^{(q)})) \frac{1}{d(C_p - C_q)} - \right.$$

$$\left. (u(H(x_p, C_p, C_r) \cdot m_{p,q,r}^{(p)}) - u(H(x_r, C_p, C_r) \cdot m_{p,q,r}^{(r)})) \frac{1}{d(C_p - C_r)} \right\|$$

Formula 36 refers to the general case when the cameras are not in a calibrated state. The analyzing unit may be configured to solve this problem so as to determine the displacement information. Alternatively or in addition, the analyzing unit may be configured to solve a linearized version thereof that may be expressed by Formula 37

$$\operatorname*{argmin}_{x_1, x_2, x_3 \ldots x_N} \sum_{(p,q,r) \in \Psi}$$

$$\left\| (u(\hat{H}(\hat{x}_p, C_p, C_q) \cdot \tilde{m}_{p,q,r}^{(p)}) - u(\hat{H}(\hat{x}_q, C_p, C_q) \cdot \tilde{m}_{p,q,r}^{(q)})) \frac{1}{d(C_p - C_q)} - \right.$$

$$\left. (u(\hat{H}(\hat{x}_p, C_p, C_r) \cdot \tilde{m}_{p,q,r}^{(p)}) - u(\hat{H}(\hat{x}_r, C_p, C_r) \cdot \tilde{m}_{p,q,r}^{(r)})) \frac{1}{d(C_p - C_r)} \right\|$$

Function $\hat{H}(x_p, C_p, C_q)$ may be defined as:

$$\hat{H}(\hat{x}_p, C_p, C_q) \mathbb{R} R_o(0, 0, \varphi_{p,q}) \cdot K_i(0, \hat{\tau}_{x,p}, \hat{\tau}_{y,p})$$

$$\hat{x} \mathbb{R} [\hat{\tau}_x, \hat{\tau}_y] \qquad \text{Formula 38}$$

Function $\hat{H}$ as given in Formula 38 models a transformation that performs a shift in a cameras' principal point τ and as before rotates two images such that they may form a stereo pair. Thus, by comparing two individual stereo pairs minimizing the remaining error as given in Formulas 36 and 37 by finding optimum values for $\hat{\tau}$ may be performed.

As an additional condition, Formulas 36 and 37 may be minimized with respect to the minimization criteria given in Formula 15. Being consistent to the definition of sets of feature point pairs $m_{p,q}$ given before, $m_{p,q,r}$ defines a set of triple matching feature points. All triplets (p, q, r) of cameras sharing overlapping image areas are contained in the set ψ.

Formulas 36 and 37 may be evaluated for various camera configurations with the requirements as given above. Depending on the camera configuration and the resulting image overlap the set of equations that is obtained will have a different shape. It is possible that the resulting system can be solved exactly with linear methods, and is over or under determined.

In matrix notation, problem 37 may be written as follows: For one triplet of cameras (p,q,r) this may be formulated as:

$$[A_{pqr}^{(p)} \quad A_{pqr}^{(q)} \quad A_{pqr}^{(r)}] \cdot [\hat{x}_p \quad \hat{x}_q \quad \hat{x}_r]^T + b_{pqr} = 0$$

Formula 39

$$A \cdot [\hat{x}_p \quad \hat{x}_q \quad \hat{x}_r]^T + b_{pqr} = 0$$

Formula 40 wherein $$A_{pqr}^{(p)} = \begin{bmatrix} \frac{-\cos(\varphi_{pr}) \cdot d_{pq} + \cos(\varphi_{pq}) \cdot d_{pr}}{d_{pq} \cdot d_{pr}} & \frac{\sin(\varphi_{pr}) \cdot d_{pq} - \sin(\varphi_{pq}) \cdot d_{pr}}{d_{pq} \cdot d_{pr}} \\ \sin(\varphi_{pq}) & \cos(\varphi_{pq}) \\ \sin(\varphi_{pr}) & \sin(\varphi_{pr}) \\ 0 & 0 \end{bmatrix}$$

Formula 41

$$A_{pqr}^{(q)} = \begin{bmatrix} \frac{\cos(\varphi_{pq})}{d_{pq}} & \frac{\sin(\varphi_{pq})}{d_{pq}} \\ -\sin(\varphi_{pq}) & -\cos(\varphi_{pq}) \\ 0 & 0 \\ \sin(\varphi_{qr}) & \cos(\varphi_{qr}) \end{bmatrix} \quad A_{pqr}^{(r)} = \begin{bmatrix} \frac{\cos(\varphi_{pr})}{d_{pr}} & -\frac{\sin(\varphi_{pq})}{d_{pr}} \\ 0 & 0 \\ -\sin(\varphi_{pr}) & -\cos(\varphi_{pr}) \\ -\sin(\varphi_{qr}) & -\cos(\varphi_{qr}) \end{bmatrix}$$

$$b_{pqr} = \begin{bmatrix} \frac{-\tilde{u}_p + \tilde{u}_q}{d_{pq}} + \frac{\tilde{v}_p - \tilde{v}_r}{d_{pr}} \\ 0 \\ 0 \\ 0 \end{bmatrix}$$

In matrix A the first line arises from Formula 36 evaluated for a triplet (p,q,r). Lines 2 to 4 may arise from the additional requirement as given by Formula 15. As transformed points $\tilde{m}$ are used here, Formula 15 simplifies and only $R_o$ (or the elements comprised in $R_o$) remain.

For a camera pattern comprising more than 3 cameras, and so more than one camera-triplet in the set ψ, each triplet forms one line in a global matrix $A_G$.

$$A_G = \begin{bmatrix} A_{pqr}^{(p)} & A_{pqr}^{(q)} & A_{pqr}^{(r)} & 0 & 0 & \ldots & 0 \\ A_{prs}^{(p)} & 0 & A_{prs}^{(r)} & A_{prs}^{(s)} & 0 & \ldots & 0 \\ 0 & A_{qrs}^{(p)} & A_{qrs}^{(r)} & A_{qrs}^{(s)} & 0 & \ldots & 0 \\ A_{prt}^{(p)} & 0 & A_{prt}^{(r)} & 0 & A_{prt}^{(t)} & \ldots & 0 \\ \ldots & \ldots & \ldots & \ldots & \ldots & \ldots & \ldots \end{bmatrix}; \quad b_G = \begin{bmatrix} b_{pqr} \\ b_{prs} \\ b_{qrs} \\ b_{prt} \\ \ldots \end{bmatrix}$$

Formula 42

In Formula 42, the set ψ comprises four triplets denoted as pqr, prs, qrs and prt. A solution for the equation system may then be found as:

$$[\hat{x}_p \hat{x}_q \hat{x}_r \ldots]^T = -(A_G^T \cdot A_G)^{-1} \cdot A_G^T \cdot b_G$$

Formula 43

A critical setup needs to be discussed in the case when only three cameras or images are available. The presented strategy can easily be extended to such a scenario. Evaluating the sum of Formula 36 for the camera triplet $(C_1, C_2, C_3)$ as given in FIG. 3a yields:

$$\frac{u_1 + \hat{\tau}_{x,1} - u_2 - \hat{\tau}_{x,2}}{d(C_1, C_2)} - \frac{-v_1 - \hat{\tau}_{y,1} - v_3 - \hat{\tau}_{y,3}}{d(C_1, C_3)} = 0$$

Formula 44

Evaluating Formula 15 for the pairs $(C_1, C_2)$, $(C_1, C_3)$ and $(C_2, C_3)$ yields three additional conditions:

$$v_1 + \hat{\tau}_{y,1} - v_2 - \hat{\tau}_{y,2} = 0$$

$$-u_1 - \hat{\tau}_{x,1} + u_3 + \hat{\tau}_{x,3} = 0$$

$$-(u_2 + v_2 + \hat{\tau}_{x,2} + \hat{\tau}_{y,2} - u_3 - v_3 - \hat{\tau}_{x,3} - \hat{\tau}_{y,3}) = 0$$

Formula 45

Rewritten in matric notation, Formula 39 becomes:

$$\underbrace{\begin{bmatrix} \frac{1}{d(C_1,C_2)} & \frac{1}{d(C_1,C_3)} & \frac{1}{d(C_1,C_2)} & 0 & 0 & \frac{1}{d(C_1,C_3)} \\ 0 & 1 & 0 & -1 & 0 & 0 \\ -1 & 0 & 0 & 0 & 1 & 0 \\ 0 & 0 & -1 & -1 & 1 & 1 \end{bmatrix}}_{A}$$

Formula 46

$$\begin{bmatrix} \hat{\tau}_{x,1} \\ \hat{\tau}_{y,1} \\ \hat{\tau}_{x,2} \\ \hat{\tau}_{y,2} \\ \hat{\tau}_{x,3} \\ \hat{\tau}_{y,3} \end{bmatrix} = \begin{bmatrix} \frac{u_2 - u_1}{d(C_1, C_2)} + \frac{v_1 - v_3}{d(C_1, C_3)} \\ v_2 - v_1 \\ u_1 - u_3 \\ u_2 + v_2 - u_3 - v_3 \end{bmatrix}$$

Formulas 44, 45 and 46 may be evaluated for one triplet-point correspondence $m_{1,2,3} = \{u_1, v_1, u_2, v_2, u_3, v_3\}$. The resulting system has six unknown variables but only four formulas. It is therefore under-determined. Additionally, the matrix A does not depend on the values of u and v. This means that by adding additional triplet-point correspondences the matrix A cannot obtain full row rank. Any line added to A will only be a duplicate of an already existing line. Therefore, this system cannot be solved without further assumptions or without reducing the number of unknown variables. One possibility to reduce the number of unknowns is to define $C_1$ as reference camera with $\hat{\tau}_{x,1} = \hat{\tau}_{y,1} = 0$. This allows removal of the first and second column of matrix A. The remaining linear system can then easily be solved using linear methods. This is shown by:

$$\underbrace{\begin{bmatrix} \frac{1}{d(C_1,C_2)} & 0 & 0 & \frac{1}{d(C_1,C_3)} \\ 0 & -1 & 0 & 0 \\ 0 & 0 & 1 & 0 \\ -1 & -1 & 1 & 1 \end{bmatrix}}_{A} \cdot \begin{bmatrix} \hat{\tau}_{x,2} \\ \hat{\tau}_{y,2} \\ \hat{\tau}_{x,3} \\ \hat{\tau}_{y,3} \end{bmatrix} = \begin{bmatrix} \frac{u_2 - u_1}{d(C_1, C_2)} + \frac{v_1 - v_3}{d(C_1, C_3)} \\ v_2 - v_1 \\ u_1 - u_3 \\ u_2 + v_2 - u_3 - v_3 \end{bmatrix}$$

Formula 47

This strategy can be extended towards a general planar camera array. Depending on the field of view of each camera, their position and orientation, there may exist cameras that are unable to be formed into triplet matches over all possible camera combinations. It is, in general, therefore not possible to predict how many triplets and pairs can be formed. The amount of linear independent equations one obtains to solve for each principal point is unknown. This needs to be taken into account when setting up an array.

Alternatively, the linearization of Formula 36 may also be expressed as:

$$\underset{x_1,x_2,x_3\ldots x_N}{\operatorname{argmin}} \sum_{(p,q,r)\in\Psi} [J_{p,q,r}^{(p)} \quad J_{p,q,r}^{(q)} \quad J_{p,q,r}^{(r)}] \cdot \begin{bmatrix} x_p \\ x_q \\ x_r \end{bmatrix} + b_{p,q,r}$$

Wherein the argument of Formula 36 is approximated as $$\left( (u(H(x_p, C_p, C_q) \cdot m_{p,q,r}^{(p)}) - u(H(x_q, C_p, C_q) \cdot m_{p,q,r}^{(q)})) \frac{1}{d(C_p - C_q)} - \right.$$

$$\left. (u(H(x_p, C_p, C_r) \cdot m_{p,q,r}^{(p)}) - u(H(x_r, C_p, C_r) \cdot m_{p,q,r}^{(r)})) \frac{1}{d(C_p - C_r)} \right)^2 \approx$$

$$[J_{p,q,r}^{(p)} \quad J_{p,q,r}^{(q)} \quad J_{p,q,r}^{(r)}] \cdot \begin{bmatrix} x_p \\ x_q \\ x_r \end{bmatrix} + b_{p,q,r}$$

Alternatively, the analyzing unit may be configured to determine the displacement information, to minimize the error respectively based on a non-linear concept. This may lead to a slightly increase in computational effort but may in return allow for usage of common available implementations as in software libraries or the like. In case of non-linear optimization both problems as given in Formula 15 and Formula 36 are subject to be minimized with respect to vectors x.

Based on $\hat{x}_p, x_p, C_p$ and $C_q$ and as part of as 612 and/or 616 the total calibrating function H being referred to as a homography matrix can be computed as:

Formula 48

$$H(x_p, \hat{x}_p, C_p, C_q) \overset{def}{=} \underbrace{R_o(0, 0, \varphi_{p,q})}_{\text{view dependend}} \cdot \underbrace{K_i(a_f, \hat{\tau}_x, \hat{\tau}_y) \cdot R_i(\alpha, \beta, \gamma)}_{\text{constant}}$$

H(•) may thus be a function providing a homography matrix undistorting points according to a parameter vector $x_p$ and camera positions $C_p$ and $C_q$.

Formula 48 relates to the definition of H as given in Formula 17. Alternatively, the definition as given in Formula 17b may be used.

One can see that the right part is constant for a camera p while the left part depends on the relative position of both cameras. An application of the calibration data, i.e., the homography in step 612, allows for obtaining rectified, i.e., calibrated images in a step 614. In the special scenario of rectangular arrays as used as an example herein, this can be exploited to increase performance. In a rectangular system matrix, $R_0$ is either the identity matrix or a rotation around 90°. It is therefore beneficial to apply the constant part once for an image and execute the second part on demand. Within a computer system, a rotation around 90° can easily be executed by swapping rows and columns of an image without further computations. In other words, FIG. 6 shows a schematic working principle of a calibration method. The left column covers initialization, the central column corrects focal length and orientation whereas the right column corrects deviations in the principal points.

For the following calibration procedure, there may be assumptions that all cameras in the array are mechanical mounted on a strict, static grid. Therefore, it may be assumed that it has a good pre-calibration. This mechanical setup may be, in general, not aligned at pixel level and comprise slight deviations that remain in the images. As illustrated in FIGS. 2*a* and 3*b*, the orientation of the cameras may differ as well as their focal length. Due to this mechanical pre-calibration, the camera position may be considered as known and pairs of cameras may be close to the rectified state. Therefore, the camera matrix K for a camera may be modelled as:

$$K = \begin{pmatrix} f \cdot (1 + a_f) & s & \tau_x \\ 0 & f \cdot (1 + a_f) & \tau_y \\ 0 & 0 & 1 \end{pmatrix} \quad \text{Formula 49}$$

wherein f denotes a normalized focal length and may be set to 1. $a_f$ denotes a small deviation of focal length. Furthermore, the focal length may be considered as constant in horizontal and vertical direction, i.e., $s_i=0$ which means that square pixels are present and $a_f \ll f=1$. As the camera's principal point, one can further assume that $\tau_x \approx 0$ and $\tau_y \approx 0$. The orientation is modeled using a standard rotation matrix $R(\alpha, \delta, \gamma)$ with $\alpha$, $\beta$ and $\gamma$ denoting tilt, yaw and roll respectively. In this case, it may be assumed that $|\alpha|$, $|\beta|$, $|\gamma| \ll 1$, wherein all angles may be given in radians). At the end of the calibration, deviations from the ideal model are known.

Details of above embodiments may relate to a 2D camera pattern. When determining calibration data for a 3D camera pattern, the same or at least related considerations may be taken into account.

In a general case when cameras do not reside on a common plane, i.e., form a 2D-pattern, Formula 13 cannot be applied and needs to be replaced by a more general formulation that fits to a 3D-pattern. This formulation is known as the Trifocal-Tensor and is presented in [2]. The basic equation is also expressed in Formula 45. The Formula states that given three corresponding image points $m_p$, $m_q$ and $m_r$ visible in three cameras the function results in a 3×3 zero matrix. This also entails that camera properties like position, orientation and intrinsics are known precisely.

$$[m_q]_x \left( \sum_1^3 m_p^i \cdot T_{(p,q,r),i} \right) \cdot [m_r]_x = 0_{3\times 3} \quad \text{Formula 50}$$

Formula 50 may be expanded as:

$$[m_q]_x \cdot (u_p \cdot T_{(p,q,r),1} + v_p \cdot T_{(p,q,r),2} + T_{(p,q,r),3}) \cdot [m_r]_x = 0_{3\times 3} \quad \text{Formula 51}$$

In Formula 45 and Formula 46 $[a]_x$ denotes a skew symmetric matrix corresponding to some vector a as:

$$[a]_x := \begin{pmatrix} 0 & -a_3 & a_2 \\ a_3 & 0 & -a_1 \\ -a_2 & a_1 & 0 \end{pmatrix} \quad \text{Formula 52}$$

The three elements $T_{(p,q,r),1}$, $T_{(p,q,r),2}$ and $T_{(p,q,r),3}$ denote a representation of the Trifocal Tensor. Each element $T_{(p,q,r),i}$ may be represented as a 3×3 matrix and its entries may be computed (according to [2]) from three projection matrices $P_q$, $P_q$ and $P_r$. Based on the ideal layout and ideal extrinsic and intrinsic camera parameters it may be assumed that all projection matrices and consequentially all Tensor elements may be computed.

Due to mechanical misalignment, measured points in images p, q and r will not obey this ideal setup and consequentially computing Formula 51 for some triplet of corresponding points and idealized Tensor elements may result in values different from a zero matrix.

As in the planar system Formula 46 may be modified as follows:

$$[m_q^{\#}]_x \cdot (u_p^{\#} \cdot T_{(p,q,r),1} + v_p^{\#} \cdot T_{(p,q,r),2} + T_{(p,q,r),3}) \cdot [m_r^{\#}]_x = 0_{3 \times 3} \quad \text{Formula 53}$$

$$g(x_p, x_q, x_r) := [\tilde{H}(x_q) \cdot m_q]_x \cdot (u_p^{\#} \cdot T_{(p,q,r),1} + v_p^{\#} \cdot T_{(p,q,r),2} + T_{(p,q,r),3}) \cdot [\tilde{H}(x_r) \cdot m_r]_x \quad \text{Formula 54}$$

wherein $$m^{\#} = [u^{\#} v^{\#} 1]^T = \tilde{H}(x_p) \cdot m \quad \text{Formula 55}$$

A calibrated image point $m_p^{\#}$ may be obtained by transforming an uncalibrated image point $m_p$ by a mapping homography as $m_p^{\#} = \tilde{H}(x_p) \cdot m_p \cdot \tilde{H}(x_p)$ may be again be constructed from a camera matrix K and a rotation matrix R as in Formula 17 or 17b with parameters contained in a parameter vector x.

As before, an additional element to compensate for lens-distortion may be integrated in order to obtain calibrated image points $m_p^{\#}$.

$$m_p^{\#}(x_p) := \tilde{H}(x_p) \cdot \text{undist}(m_p, x_q) \quad \text{Formula 56}$$

Formula 54 may therefore also be represented as function of $x_p$, $x_q$ and $x_r$:

$$g(x_p, x_q, x_r) := [m_q^{\#}]_x \cdot (u_p^{\#} \cdot T_{(p,q,r),1} + v_p^{\#} \cdot T_{(p,q,r),2} + T_{(p,q,r),3}) \cdot [m_r^{\#}]_x \quad \text{Formula 57}$$

For a general set of cameras, the apparatus may be configured to solve two optimization problems simultaneously, wherein one of the optimization problems may be subject to be minimized according to:

$$\operatorname*{argmin}_{x_1, x_2, x_3, \ldots, x_N} \sum_{(p,q,r) \in \Psi} \|g(x_p, x_q, x_r)\| \quad \text{Fromula 58}$$

In Formula 53, $\Psi$ may denote a set containing all sets of camera triplets relevant for analyzation. As before, it is an example target to find vectors x that simultaneously optimize Formula 15 and Formula 53, e.g., in a linearized case. The problem of formula 53 may be transferred to a linearized version and solved as such a linearized version, such as defined in formula 56.

Figure 6B:
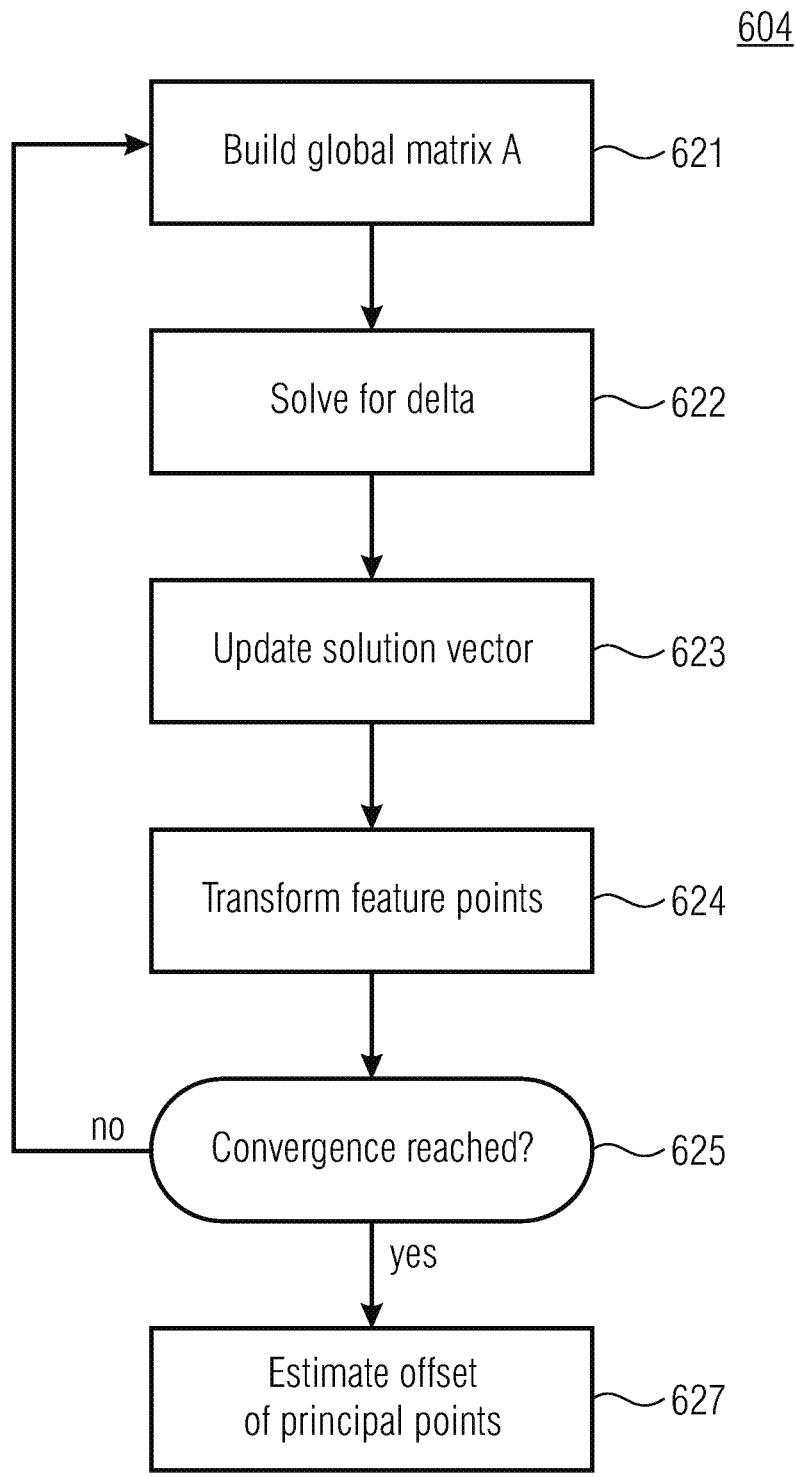
FIG. 6b is a schematic diagram of a block of FIG. 6a, that illustrates a linearization strategy that may be implemented by a analyzing unit according to an embodiment.

Again, the apparatus may be configured to execute a non-linear optimization method or a linearized optimization method. This is identical as presented for the planar case as depicted in FIG. 6*a-b*. The apparatus may be configured to use a non-linear optimization method so as to minimize the error. In case of a non-linear optimization method, the analyzing unit may be configured to optimize the results indicated in Formulae 15 and 58 simultaneously yielding optimum vectors x.

For the linearization, a local sub-problem consisting of three cameras p,q and r is evaluated for each element of Formula 57. This yields 9 functions of $x_p$, $x_q$ and $x_r$. Each of these functions can be approximated using Taylor expansion as defined in Formulae 22 and 23. Formally, this can be expressed as:

$$g_{i,j}(x_p, x_q, x_r) \approx Tg_{i,j}(\chi, a)$$

$$\chi = [x_p, x_q, x_r] \quad \text{Formula 59 \& 60}$$

The approximated elements $g_{i,j}$ may be composed to a vector and subsequently re-written in matrix notation yielding a Jacobian matrix and a column vector b. As a result a linearized system is obtained with unknowns in $\chi$. As before, a is a zero-vector with the same length as $\chi$.

$$0 = [Tg_{1,1}(\chi, a), Tg_{1,2}(\chi, a), \ldots, Tg_{3,3}(\chi, a)]^T$$

$$0 = J \cdot \chi + b \quad \text{Formula 61 \& 62}$$

$Tg_{i,j}(\chi, a)$ denotes the Taylor approximation of a function g and should not be mixed up with the Tensor elements in Formula 57. The indices in g denote an entry in the matrix returned by function g. (Compare also for Formula 53 and 54). However it should be clear the Tensors are elements of Formulae 58 to 62 and further on.

Alternatively, the analyzing unit may be configured to linearly minimize the error. In case of a linearized optimization method as shown in FIG. 6*b* Formula 57 may be linearized using first-order Taylor expansion resulting in a linearized approximation of the overall non-linear problem for some distinct, approximated point. As before, the obtained linearized equations may be represented as an Jacobian matrix J and a constant part b. This Jacobian matrix is composed from three submatrices as:

$$J_{p,q,r} = [J_{p,q,r}^{(p)} J_{p,q,r}^{(q)} J_{p,q,r}^{(r)}] \quad \text{Formula 63}$$

In the same fashion as presented in Formula 29, the linearized global problem can be constructed from a series of local, linearized problems. Therefore, each camera triplet contained in $\Psi$ may be represented so as to form one line in a matrix $A_T$ and a vector $b_T$ containing the constant part. The apparatus may be configured to form the Jacobian matrix accordingly, but according to other embodiments, it may form a matrix differently. In particular, the apparatus may be configured for determining an approximation for solving the first and second basis problems using the coordinates C of the cameras and of the reference points m on the basis of Jacobian matrices. The matrix $A_T$ may then be concatenated with matrix A (further referenced to as $A_B$) as obtained from Formula 29 for all stereo pairs (p,q) contained in the set $\Omega$. In the same fashion, vectors b (also referenced to as $b_B$) and $b_T$ may be concatenated.

$$A_G = \begin{bmatrix} A \\ A_T \end{bmatrix} = \begin{bmatrix} A_B \\ A_T \end{bmatrix} \quad \text{Formula 64}$$

$$b_G = \begin{bmatrix} b \\ b_T \end{bmatrix} = \begin{bmatrix} b \\ b_T \end{bmatrix} \quad \text{Formula 65}$$

$$A_G \cdot [x_p, x_q, x_r, \ldots]^T = -b_G \quad \text{Formula 66}$$

In a gradient-descend like manner the overall problem may be solved by solving $A_G$ for a set of approximated vectors x and using a portion $\epsilon$ of these values to update the true solution vector x as stated in Formula 32. This true solution vectors x may subsequently be used to update initial points m. With those updated points $\tilde{m}$ matrix $A_G$ may be recomputed. The process continues until congruence is reached.

In other words, the analyzing unit may be configured to solve a first and a second optimization criteria for determining the displacement information. In other words, the analyzing unit may be configured to solve a first and a second optimization criteria for the case of having a 2D camera pattern and for having a 3D camera pattern, wherein the criteria may differ between the 2D pattern and the 3D pattern.

For the 2D pattern, a possibly non-linear first minimization criteria, may be based on the determination rule $$\operatorname*{argmin}_{x_1,x_2,x_3,\ldots,x_N} \sum_{(p,q)\in\Omega} \|v(H(x_p, C_p, C_q)\cdot m_{p,q}^{(p)}) - v(H(x_q, C_p, C_q)\cdot m_{p,q}^{(q)})\| \quad \text{(Formula 15)}$$

$$\text{with } \|x\| = \sum_i x_i^2$$

as described above. The possibly non-linear second minimization criteria may be based on the determination rule $$\operatorname*{argmin}_{x_1,x_2,x_3,\ldots,x_N} \sum_{(p,q,r)\in\Psi} \quad \text{(Formula 36)}$$

$$\left\| (u(H(x_p, C_p, C_q)\cdot m_{p,q,r}^{(p)}) - u(H(x_q, C_p, C_q)\cdot m_{p,q,r}^{(q)}))\frac{1}{d(C_p - C_q)} - \right.$$

$$\left. (u(H(x_p, C_p, C_r)\cdot m_{p,q,r}^{(p)}) - u(H(x_r, C_p, C_r)\cdot m_{p,q,r}^{(r)}))\frac{1}{d(C_p - C_r)} \right\|$$

as described above. For the 3D pattern, the possibly non-linear first minimization criteria may be based on the determination rule $$\operatorname*{argmin}_{x_1,x_2,x_3,\ldots,x_N} \sum_{(p,q)\in\Omega} \|v(H(x_p, C_p, C_q)\cdot m_{p,q}^{(p)}) - v(H(x_q, C_p, C_q)\cdot m_{p,q}^{(q)})\| \quad \text{(Formula 15)}$$

$$\text{with } \|x\| = \sum_i x_i^2$$

and the possibly non-linear second minimization criteria may be based on the determination rule $$\operatorname*{argmin}_{x_1,x_2,x_3,\ldots,x_N} \sum_{(p,q,r)\in\Psi} \|g(x_p, x_q, x_r)\| \quad \text{(Formula 58)}$$

wherein (Formula 54)

$$g(x_p, x_q, x_r) := \left[\tilde{H}(x_q)\cdot m_q\right]_x \cdot$$

$$(u_p^\# \cdot T_{(p,q,r),1} + v_p^\# \cdot T_{(p,q,r),2} + T_{(p,q,r),3}) \cdot \left[\tilde{H}(x_r)\cdot m_r\right]_x$$

wherein (Formula 55)

$$m^\# = [\,u^\# \ v^\# \ 1\,]^T = \tilde{H}(x_p)\cdot m$$

wherein argmin denotes the minimization criteria, and wherein $C_p$, $C_g$ denote camera positions of cameras p and q, $d(C_p - C_g)$ is a distance between the camera positions, H is a homography matrix, $x_p$, $x_q$ and $x_r$ are vectors with parameters to be determined so as to minimizing the error for camera p, q and r, $m_q$, $m_r$ and $m_{p,q}$ refer to a respective minimization result of a previous minimization iteration, $\Omega$ and $\psi$ denote a set of images used for minimization, N is a number of parameters, v is an image direction, $u^\#$ and $v^\#$ denote a calibrated position of an image point along direction u and v obtained as $m_p^\# = H_p\, m_p$ and $T_i$ represents element i of a Trifocal Tensor. The explanation of the global optimization problem is represented in formula 58, wherein formula 58 may be built from (local) sub-problems given by formula 54.

Alternatively or in addition, the analyzing unit may be configured to solve linearized minimization criteria, i.e., to use a linearized version of the above mentioned criteria. The analyzing unit may thus be configured to determine the displacement information minimizing an error of a linearized first minimization criteria. Accordingly, the determining unit may be configured to determine the offset information minimizing an error of a linearized second minimization criteria. For the 2D camera pattern the first linearized minimization criteria may be based on the determination rule Formula 67

$$(v(H(x_p, C_p, C_q)\cdot m_{p,q}^{(p)}) - v(H(x_q, C_p, C_q)\cdot m_{p,q}^{(q)}))^2 \approx$$

$$J_{p,q}\cdot\begin{bmatrix}x_p^T\\x_q^T\end{bmatrix} + b_{p,q} = [J_{p,q}^{(p)}|J_{p,q}^{(q)}]\cdot\begin{bmatrix}x_p^T\\x_q^T\end{bmatrix} + b_{p,q}.$$

wherein this approximation rule relates to the non-linear minimization problem as:

Formula 68

$$\operatorname*{argmin}_{x_1,x_2,x_3,\ldots,x_N} \sum_{(p,q)\in\Omega} \|v(H(x_p, C_p, C_q)\cdot m_{p,q}^{(p)}) -$$

$$v(H(x_q, C_p, C_q)\cdot m_{p,q}^{(q)})\| \approx$$

$$\operatorname*{argmin}_{x_1,x_2,x_3,\ldots,x_N} \sum_{(p,q)\in\Omega} [J_{p,q}^{(p)}|J_{p,q}^{(q)}]\cdot\begin{bmatrix}x_p^T\\x_q^T\end{bmatrix} + b_{p,q} =$$

$$J_B \cdot [x_1, x_2, x_3, \ldots, x_n]^T + b_B$$

wherein Formula 69

$$J_B = \begin{bmatrix} J_{pq}^{(p)} & J_{pq}^{(q)} & 0 & 0 & 0 & \ldots & 0 \\ J_{pr}^{(p)} & 0 & J_{pr}^{(r)} & 0 & 0 & \ldots & 0 \\ 0 & J_{qs}^{(q)} & 0 & J_{qs}^{(s)} & 0 & \ldots & 0 \\ 0 & 0 & J_{rs}^{(r)} & J_{rs}^{(s)} & 0 & \ldots & 0 \\ \ldots & \ldots & \ldots & \ldots & \ldots & \ldots & \ldots \end{bmatrix}$$

and Formula 70

$$b_B = [\,b_{p,q} \ \ b_{p,r} \ \ b_{q,s} \ \ b_{r,s} \ \ \ldots\,]^T$$

and for the 2D camera pattern the linearized second minimization criteria may be based on the determination rule Formula 71

$$\left( (u(H(x_p, C_p, C_q)\cdot m_{p,q,r}^{(p)}) - u(H(x_q, C_p, C_q)\cdot m_{p,q,r}^{(q)}))\frac{1}{d(C_p - C_q)} - \right.$$

$$\left. (u(H(x_p, C_p, C_r)\cdot m_{p,q,r}^{(p)}) - u(H(x_r, C_p, C_r)\cdot m_{p,q,r}^{(r)}))\frac{1}{d(C_p - C_r)} \right)^2 \approx$$

$$[J_{p,q,r}^{(p)}|J_{p,q,r}^{(q)}|J_{p,q,r}^{(r)}]\cdot\begin{bmatrix}x_p^T\\x_q^T\\x_r^T\end{bmatrix} + b_{p,q,r} = J_{p,q,r}\cdot\begin{bmatrix}x_p^T\\x_q^T\\x_r^T\end{bmatrix} + b_{p,q,r}$$

wherein this approximation rule relates to the non-linear minimization problem as:

$$\underset{x_1,x_2,x_3,\ldots,x_N}{\operatorname{argmin}} \sum_{(p,q,r)\in\Psi} \|(u(H(x_p, C_p, C_q) \cdot m_{p,q,r}^{(p)}) - $$

$$u(H(x_q, C_p, C_q) \cdot m_{p,q,r}^{(q)}))\frac{1}{d(C_p - C_q)} - $$

$$(u(H(x_p, C_p, C_r) \cdot m_{p,q,r}^{(p)}) - $$

$$u(H(x_r, C_p, C_r) \cdot m_{p,q,r}^{(r)}))\frac{1}{d(C_p - C_r)}\| \approx $$

$$\underset{x_1,x_2,x_3,\ldots,x_N}{\operatorname{argmin}} \sum_{(p,q,r)\in\Psi} [J_{p,q,r}^{(p)} \ J_{p,q,r}^{(q)} \ J_{p,q,r}^{(r)}] \cdot \begin{bmatrix} x_p^T \\ x_q^T \\ x_r^T \end{bmatrix} + $$

$$b_{p,q,r} = J_T \cdot [x_1, x_2, x_3, \ldots, x_n]^T + b_T$$

Formula 72 wherein  Formula 73

$$J_B = \begin{bmatrix} J_{pqr}^{(p)} & J_{pqr}^{(q)} & J_{pqr}^{(r)} & 0 & 0 & \ldots & 0 \\ J_{prs}^{(p)} & 0 & J_{prs}^{(r)} & J_{prs}^{(s)} & 0 & \ldots & 0 \\ 0 & J_{qst}^{(q)} & 0 & J_{qst}^{(s)} & J_{qst}^{(t)} & \ldots & 0 \\ J_{pst}^{(p)} & 0 & 0 & J_{pst}^{(s)} & J_{pst}^{(t)} & \ldots & 0 \\ \ldots & \ldots & \ldots & \ldots & \ldots & \ldots & \ldots \end{bmatrix}$$

and  Formula 74

$$b_B = [b_{p,q,r} \ b_{p,r,s} \ b_{q,s,t} \ b_{p,s,t} \ \ldots]^T$$

A solution may be determined, for example as:

$$[x_1, x_2, x_3, \ldots, x_n]^T = -(A_G^T \cdot A_G)^{-1} \cdot A_G^T \cdot b_G$$  Formula 75 wherein $$A_G = \begin{bmatrix} J_B \\ J_T \end{bmatrix} \text{ and } b_G = \begin{bmatrix} b_B \\ b_T \end{bmatrix}$$

For the 3D camera pattern the linearized first minimization criteria may be based on the approximation rule $$(v(H(x_p, C_p, C_q) \cdot m_{p,q}^{(p)}) - v(H(x_q, C_p, C_q) \cdot m_{p,q}^{(q)}))^2 \approx $$  Formula 76

$$J_{p,q} \cdot \begin{bmatrix} x_p^T \\ x_q^T \end{bmatrix} + b_{p,q} = [J_{p,q}^{(p)} | J_{p,q}^{(q)}] \cdot \begin{bmatrix} x_p^T \\ x_q^T \end{bmatrix} + b_{p,q}$$

wherein this approximation rule relates to the non-linear minimization problem as:

$$\underset{x_1,x_2,x_3,\ldots,x_N}{\operatorname{argmin}} \sum_{(p,q)\in\Omega} \|v(H(x_p, C_p, C_q) \cdot m_{p,q}^{(p)}) - $$  Formula 77

$$v(H(x_q, C_p, C_q) \cdot m_{p,q}^{(q)})\| \approx $$

$$\underset{x_1,x_2,x_3,\ldots,x_N}{\operatorname{argmin}} \sum_{(p,q)\in\Omega} [J_{p,q}^{(p)} | J_{p,q}^{(q)}] \cdot \begin{bmatrix} x_p^T \\ x_q^T \end{bmatrix} + b_{p,q} = $$

$$J_B \cdot [x_1, x_2, x_3, \ldots, x_n]^T + b_B$$

-continued wherein  Formula 78

$$J_B = \begin{bmatrix} J_{pq}^{(p)} & J_{pq}^{(q)} & 0 & 0 & 0 & \ldots & 0 \\ J_{pr}^{(p)} & 0 & J_{pr}^{(r)} & 0 & 0 & \ldots & 0 \\ 0 & J_{qs}^{(q)} & 0 & J_{qs}^{(s)} & 0 & \ldots & 0 \\ 0 & 0 & J_{rs}^{(r)} & J_{rs}^{(s)} & 0 & \ldots & 0 \\ \ldots & \ldots & \ldots & \ldots & \ldots & \ldots & \ldots \end{bmatrix}$$

and  Formula 79

$$b_B = [b_{p,q} \ b_{p,r} \ b_{q,s} \ b_{r,s} \ \ldots]^T$$

wherein for the 3D camera pattern the linearized second minimization criteria is based on the approximation rule Formula 80

$$g(x_p, x_q, x_r)^2 = $$

$$\left([\tilde{H}(x_q) \cdot m_q]_x \cdot (u_p^\# \cdot T_{(p,q,r),1} + v_p^\# \cdot T_{(p,q,r),2} + T_{(p,q,r),3}) \cdot [\tilde{H}(x_r) \cdot m_r]_x\right)^2 \approx $$

$$J_{p,q,r} \cdot \begin{bmatrix} x_p^T \\ x_q^T \\ x_r^T \end{bmatrix} + b_{p,q,r}$$

wherein this approximation rule relates to the non-linear minimization problem as:

$$\underset{x_1,x_2,x_3,\ldots,x_N}{\operatorname{argmin}} \sum_{(p,q,r)\in\Psi} \|g(x_p, x_q, x_r)\| \approx $$  Formula 81

$$\underset{x_1,x_2,x_3,\ldots,x_N}{\operatorname{argmin}} \sum_{(p,q,r)\in\Psi} [J_{p,q,r}^{(p)} \ J_{p,q,r}^{(q)} \ J_{p,q,r}^{(r)}] \cdot \begin{bmatrix} x_p^T \\ x_q^T \\ x_r^T \end{bmatrix} + b_{p,q,r} = $$

$$J_T \cdot [x_1, x_2, x_3, \ldots, x_N]^T + b_T$$

wherein  Formula 82

$$J_T = \begin{bmatrix} J_{pqr}^{(p)} & J_{pqr}^{(q)} & J_{pqr}^{(r)} & 0 & 0 & \ldots & 0 \\ J_{prs}^{(p)} & 0 & J_{prs}^{(r)} & J_{prs}^{(s)} & 0 & \ldots & 0 \\ 0 & J_{qst}^{(q)} & 0 & J_{qst}^{(s)} & J_{qst}^{(t)} & \ldots & 0 \\ J_{pst}^{(p)} & 0 & 0 & J_{pst}^{(s)} & J_{pst}^{(t)} & \ldots & 0 \\ \ldots & \ldots & \ldots & \ldots & \ldots & \ldots & \ldots \end{bmatrix}$$

and  Formula 83

$$b_T = [b_{p,q,r}^T \ b_{p,r,s}^T \ b_{q,s,t}^T \ b_{p,s,t}^T \ \ldots]^T$$

A solution may be determined, for example as:

$$[x_1, x_2, x_3, \ldots, x_N]^T = -(A_G^T \cdot A_G)^{-1} \cdot A_G^T \cdot b_G$$  Formula 84 wherein  Formula 85

$$A_G = \begin{bmatrix} A_B \\ A_T \end{bmatrix} \text{ and } b_G = \begin{bmatrix} b_B \\ b_T \end{bmatrix}$$

Elements in $J_{p,q,r}$ and $b_{p,q,r}$ are formed from Taylor approximation of $g(x_p, x_q, x_r)^2$ according to Formula 58 to Formula 62, and wherein argmin denotes the minimization criteria, and wherein $C_p$, $C_p$ denote camera positions of cameras p and q, $d(C_p-C_q)$ is a distance between the camera positions, $\hat{H}$ is a homography matrix, $\tilde{x}_p$, and $\tilde{x}_q$ are vectors with linearized parameters to be determined so as to minimizing the error for camera p and q with respect to a constant $b_{q,p}$, J denotes a Jacobian matrix T represents a Trifocal Tensor. Subscripts p, q, r, s and t denote indices referring to a specific camera.

Thus, the apparatus may be configured to linearly and/or non-linearly performing optimization, wherein the selection is up to an implementation. Non-linear methods may allow for using a standard library, wherein the non-linear method may result in a higher computational effort.

The first optimization problem or criteria may be solved by the analyzing unit so as to pre-align the images. The second optimization problem or criteria may be solved by the determining unit so as to reduce or compensate for remaining differences in disparities.

According to an embodiment, only a coarse setup of the camera system is known to the algorithm and the exact amount of overlapping image regions will be approximated or estimated. The analyzing unit is therefore configured to automatically detect corresponding points in all possible pairs and triplets of images.

Figure 6C:
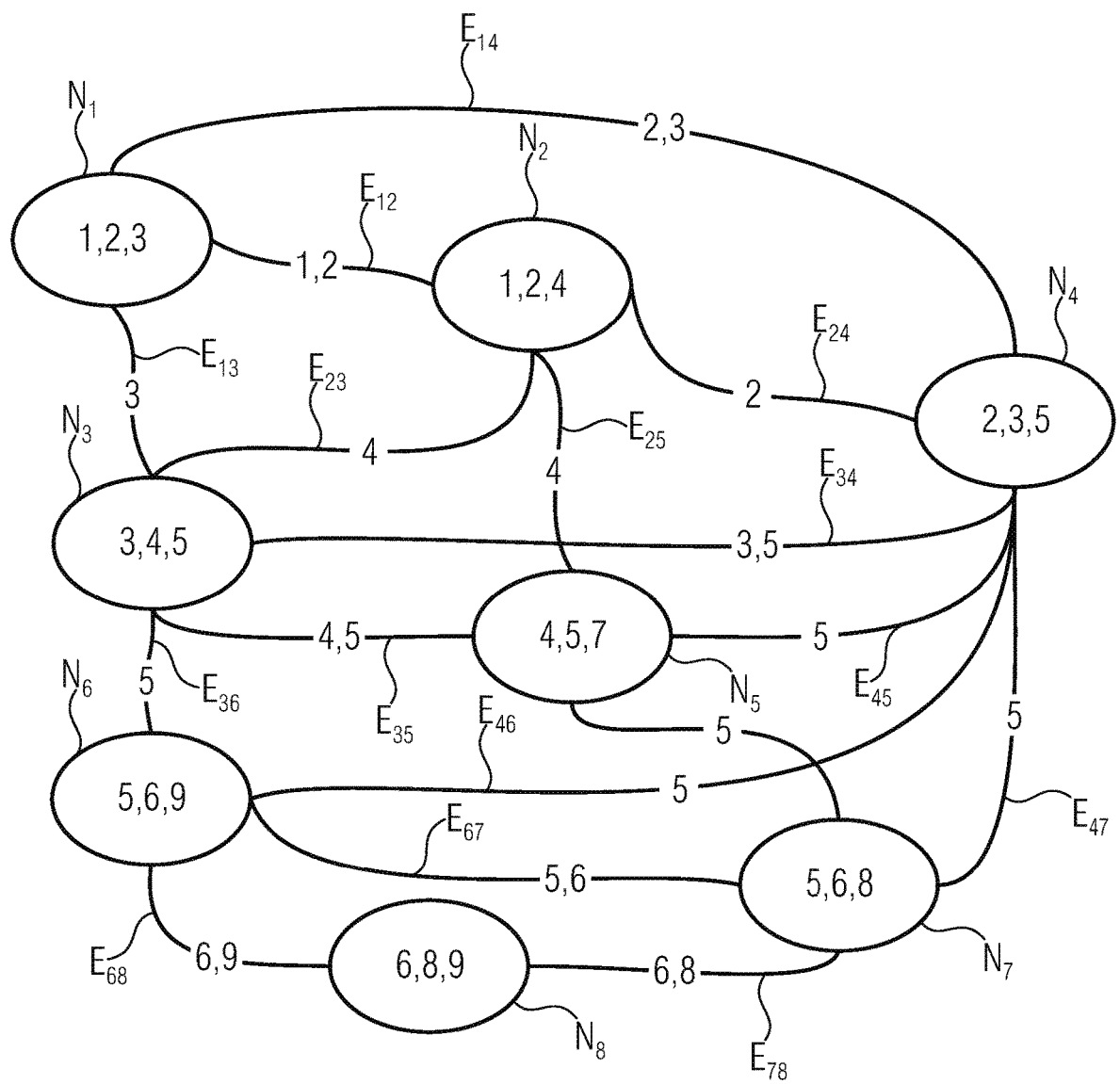
FIG. 6c is a schematic representation of a graph that represents triple-matching correspondence points according to an embodiment.

A minimum requirement for proper execution according to an example is shown in FIG. 6c. The example refers to an 3×3 example setup of FIG. 4b. Accordingly, the given explanation does not limit the embodiments of the present invention.

FIG. 6c shows a schematic representation of a graph that represents triple-matching correspondence points and, by way of example, comprises nodes $N_i$. Each node index i relates to a triplet of cameras $C_1$, wherein the numbers displayed identify a respective camera $C_i$ of the camera array 40. For example, node $N_1$ represents a corresponding point 1 which is captured by cameras $C_1$, $C_2$ and $C_3$. Each triplet $N_1$ to $N_8$ is characterized in having a with respect to other triplets possibly individual corresponding part of the respective image, i.e., an overlap in the images.

Edges $E_{ij}$ between Nodes $N_i$ and $N_j$ of the graph and the corresponding labeling indicate cameras that are incorporated in both sets of triplet matches. For the sake of simplicity, $E_{ij}=E_{ji}$. For example, cameras 1 & 2 are both incorporated in the triplet set {1, 2, 3} corresponding to node $N_1$ and the set {1, 2, 4} corresponding to node $N_2$. Thus, cameras $C_1$ and $C_2$ have a (first) overlap containing a (first) correspondence point/object with camera $C_3$ and have a second overlap containing a (second) correspondence point/object with camera $C_4$. Thereby, a correlation between camera $C_3$ and camera $C_4$ may be determined with the analyzing unit even if cameras $C_3$ and $C_4$ would not have a common overlap.

It is possible but not needed and even unlikely that a common corresponding point is found in each pair of images. However, the embodiments described herein are not limited to a corresponding point being common in each of the cameras or pictures thereof. It is sufficient that each camera that is considered in the minimization problem is comprised in at least one pair of cameras contained in the set Ω and/or in at least one triplet of cameras contained in ψ. I.e., it may be sufficient, that for each pair and/or triplet a possibly individual corresponding point may be identified.

The analyzing unit may be configured for determining the triplets N, from the pictures taken with the Cameras $C_i$ by identifying correspondence points in the respective pictures. The analyzing unit may be configured for the determining the triplets and/or the graph 60 or a representation thereof such that the graph 60 is fully connected.

As shown in FIG. 6c, all cameras ($C_1$, . . . , $C_9$) incorporated in the system are represented in at least one node and the graph is fully connected. In other words there is a path from any node/triplet to any other node/triplet directly or indirectly by possibly crossing other nodes.

Figure 6D:
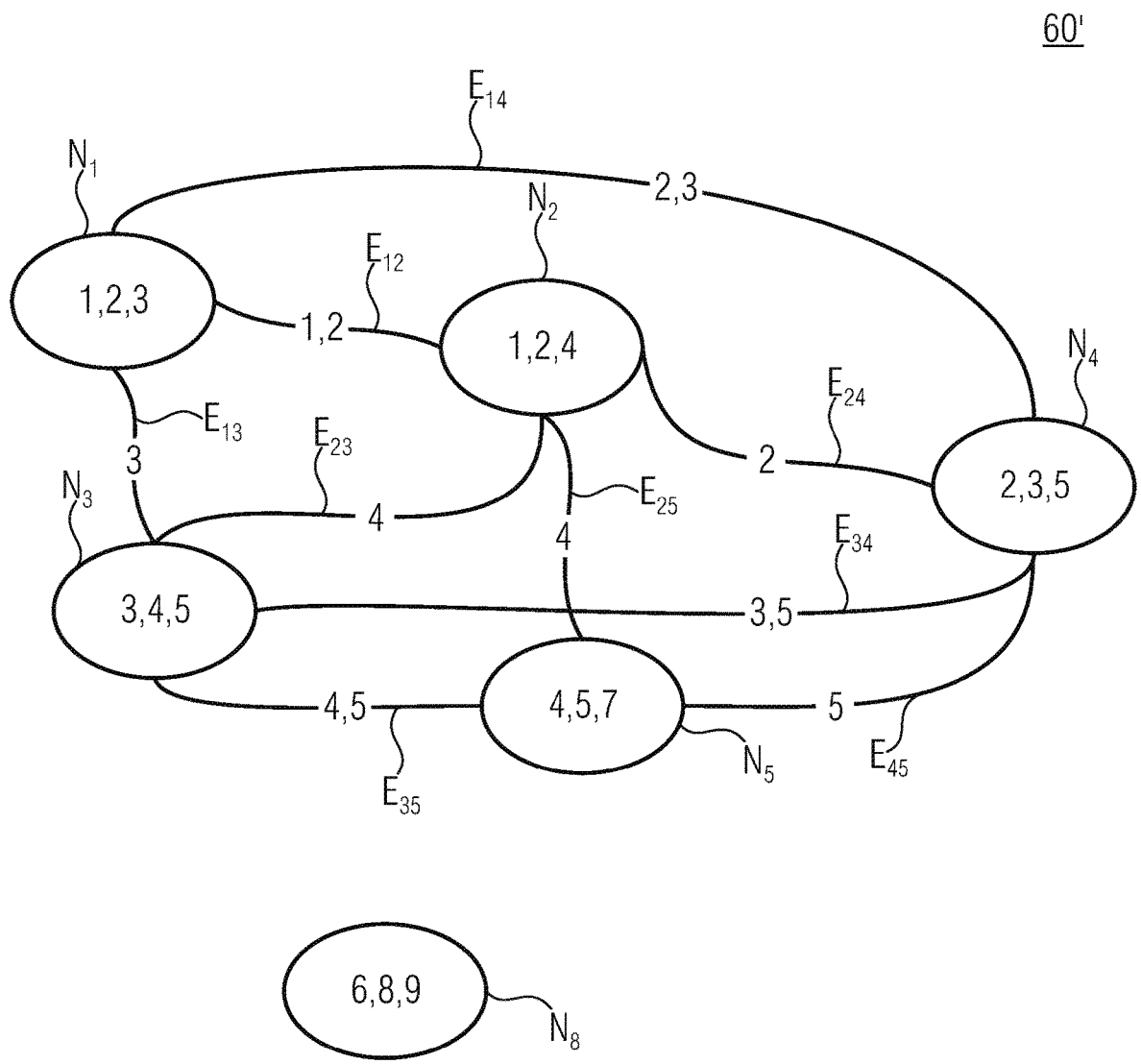
FIG. 6d is a graph similar to FIG. 6c in an incomplete state.

In contrast FIG. 6d shows a similar graph 60' but with the nodes $N_8$ {5,6,8} and $N_9$ {5,6,9} being removed such that node $N_8$ is unconnected to the rest of the graph. For example, the determination of the analyzing unit is incomplete at the illustrated state.

As can be seen, the node $N_8$ {6,8,9} is not connected to any other node though all cameras ($C_1$ . . . $C_9$) are represented in the graph. In this case the graph is not fully connected. Hence it is not guaranteed that the condition as specified in Formula 36 or Formula 58 is met.

The feature-detection & matching step in the analyzing unit is implemented to build-up a fully-connected graph or a data representation thereof as shown in FIG. 6c. I.e., it is not needed that the analyzing unit or the determining unit generates a graph or image thereof. It may be sufficient to generate a data representation thereof, e.g., a matrix or tabular containing the respective information.

A similar condition may also to be met for pairs of cameras. However any set comprising 3 cameras can be seen as 3 individual pairs of cameras. Therefore any camera that is incorporated in a triplet set is also incorporated in at least 2 pairs of correspondence points. Thus, the explanation given directly relates to 2D and to 3D camera patterns.

The example given in FIG. 6c and FIG. 6d may be referred to as a minimum case. The apparatus may increase its precision by determining additional pairs or triplets as long as every camera is represented in the graph and the graph is fully connected. For improving the results, the apparatus may be configured for searching for a higher number of reference points.

The analyzing unit may determine the reference points so as to be contained in pairs and/or triplets of images.

According to embodiments, the analyzing unit selects or determines reference/correspondence points in overlapping image regions of the pairs and/or triplets. It is possible that not every possible pair of images overlaps. Further, the analyzing unit may be configure for searching or identifying at least one or up to a specific number of reference points, e.g., 2, 3, 5, 10 or more. When the specific number is reached, the analyzing unit may be configured for stopping the search and to thereby determining less than a possible number of reference points in the overlap area. This allows saving time and computational effort. Further, it may be sufficient to determine a specific reference point in the images of cameras of a pair or triplet only, even if the same reference point is also seen in further images.

When compared to known concepts, it is therefore neither needed to have a known reference object, nor to have a specific object to be contained in every image. It is of advantage to search for corresponding content/points in pairs and/or triplets of images as, e.g., at spherical or cylindrical arrays it becomes increasingly unlikely to have an object being imaged with more than three cameras when increasing the number of cameras of the array.

Figure 7:
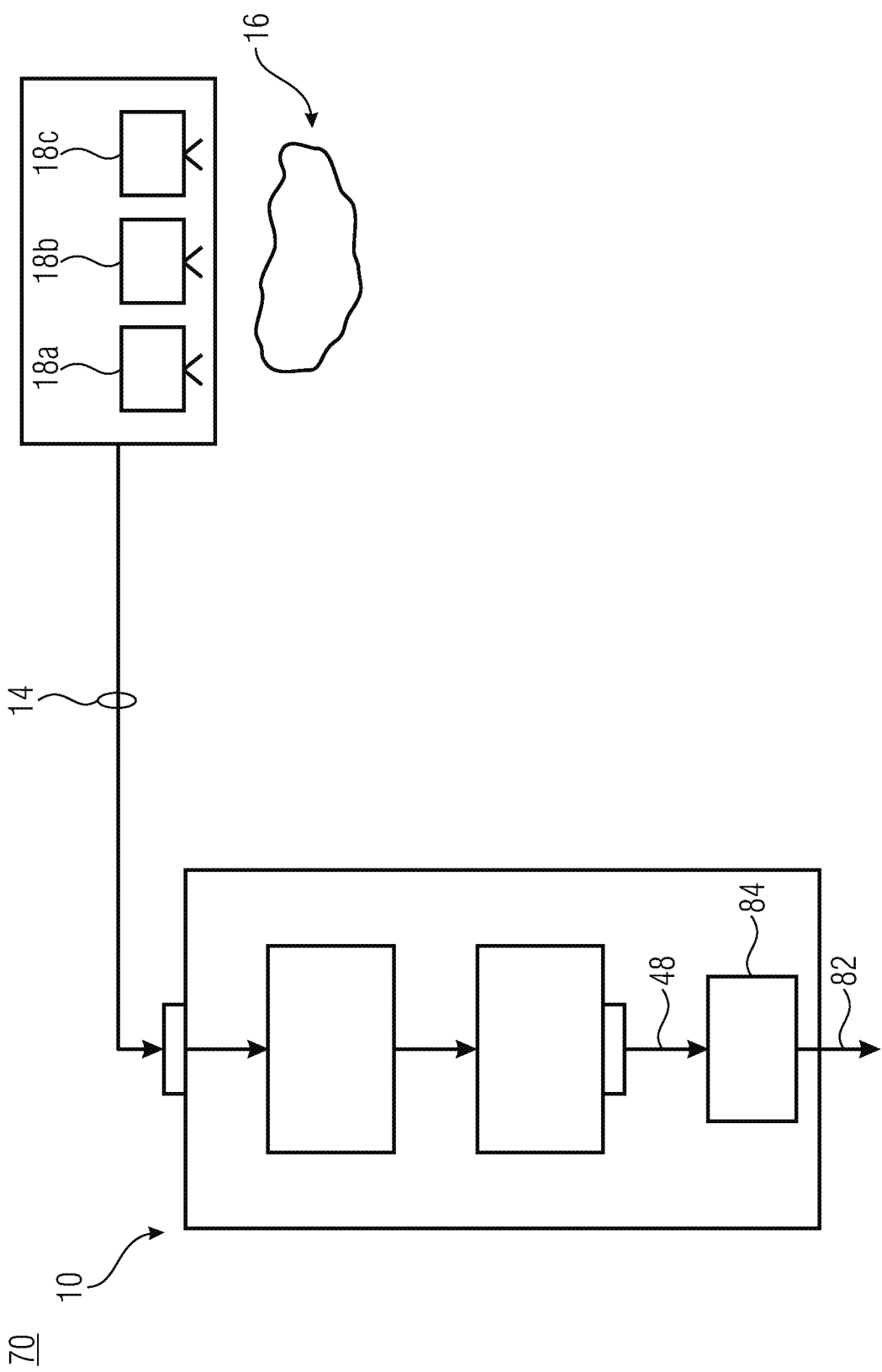
FIG. 7 is a schematic block diagram of an apparatus according to an embodiment that comprises a plurality of cameras.

FIG. 7 shows a schematic block diagram of an apparatus 70 according to an embodiment that comprises, for example, apparatus 10 and comprises the plurality of cameras. The apparatus 70 is configured to apply the calibration data to the plurality of images 14 so as to obtain a plurality of rectified, i.e., calibrated images 82. For example, the apparatus 70 may comprise a processor 84 for applying the calibration data 48. The processor 84 may be configured to combine the calibration data 48 with the images 14. The processor 84 may be, for example, the element 52 of FIG. 1. Thus, not only calibration data may be provided but also rectified images may be provided. Alternatively or in addition, the apparatus 70 may be configured to determine a depth map of an object region such as the object 16. As described in connection with FIG. 1, the object region may comprise a plurality of sub regions, wherein each camera 18a to 18c of the plurality of cameras may be configured to provide the corresponding image by projecting one of the plurality of sub regions and to provide an image based thereon.

FIG. 8 shows a schematic block diagram of a camera system 80 that comprises a plurality of cameras 18a to 18c and comprises a memory 86 having stored thereon the calibration information 48', being derived from the calibration data 48. For example, the calibration information 48' may be the calibration data 48 or may incorporate at least part thereof. The apparatus 80 may be configured to obtain a plurality of rectified images 82 and to provide the plurality of rectified images 82, e.g., at an output port of apparatus 80 or to store them in the memory 86.

The camera system 80 may further comprise an apparatus 10 that is configured to provide for the calibration information 48'.

Some explanations given herein relate to mathematical expressions of actions implemented by an apparatus and/or a method. It is to be pointed out that such expressions are used for explanatory reasons only so as to clearly define what an apparatus according to the respective embodiment does. Therefore, the embodiments do not relate to the mathematical expressions but to the actions implemented by the embodiments.

Some embodiments are described in connection with a 2D camera pattern, wherein other embodiments are described in connection with 3D camera patterns. Further, some embodiments are described in connection with solving a possibly non-linear optimization, wherein other embodiments are described in connection with solving a linearized versions thereof. Although being described as separate solutions, further embodiments may also provide for combinations. E.g., an analyzing unit may receive information whether the camera pattern is of 2D type or 3D type and may perform different actions responsive to said information. Further, the analyzing unit may be blind for said pattern-information and may perform both, 2D determination and 3D determination and may determine a result of higher quality and may take that result. Further, the analyzing unit may perform a 3D optimization and may take this result even if the pattern is a 2D pattern because the result is also valid.

Accordingly, the analyzing unit may implement one or both of the non-linear and linear approach, e.g., by first solving the linearized formulation and in case of having insufficient results solving the non-linear formulation.

In the following, additional embodiments and aspects of the invention will be described which can be used individually or in combination with any of the features and functionalities and details described herein.

1. Apparatus (10; 70) comprising:
    a first interface (12) for receiving a plurality of partially overlapping images (14; 14a-i) of an object (16) from a corresponding plurality of camera positions (18a-i) being arranged along a first and a second direction according to a camera pattern (30; 40; 40'); an analyzing unit (24) configured for selecting at least one corresponding reference point ($26_1$-$26_4$) in an overlap area (28) of a set of overlapping images (14; 14a-i), and for determining a displacement information (34) along the first and the second direction (x, y) of the reference point ($26_1$-$26_4$) in each of the other images of the set of images, wherein a misalignment of the plurality of images (14; 14a-i) along the first and the second direction (x, y) is compensated by the displacement information (34) so as to obtain aligned images;
    a determining unit configured for determining an offset information (38) between principal points (42a-c) at the plurality of camera positions (18a-i) using at least three aligned images; and
    a second interface (46) for providing calibration data (46) based on the displacement information (34) and based on the offset information (38), the calibration data allowing for calibrating the plurality of images so as to comply to the camera pattern.

2. The apparatus according to aspect 1, wherein the analyzing unit (24) is configured for determining the displacement information (34) using a set of parameters indicating a real condition of the camera pattern (30; 40; 40'), the parameters comprising a non-linear relationship with respect to each other, wherein the analyzing unit (24) is configured to use a linearized version of the set of parameters and to determine the displacement information (34) by minimizing an error of the linearized version with respect to a desired condition of the camera pattern (30; 40; 40').

3. The apparatus according to aspect 1 or 2, wherein the analyzing unit is configured to determine the displacement information minimizing an error of a first minimization criteria, wherein for a 2D camera pattern the first minimization criteria is based on the determination rule;

$$\underset{x_1, x_2, x_3, \ldots, x_N}{\mathrm{argmin}} \sum_{(p,q) \in \Omega} \|v(H(x_p, C_p, C_q) \cdot m_{p,q}^{(p)}) - v(H(x_q, C_p, C_q) \cdot m_{p,q}^{(q)})\|$$

$$\text{with } \|x\| = \sum_i x_i^2$$

wherein the determining unit is configured to determine the offset information minimizing an error of a second minimization criteria, wherein for the 2D camera pattern the second minimization criteria is based on the determination rule $$\underset{x_1, x_2, x_3, \ldots, x_N}{\mathrm{argmin}} \sum_{(p,q) \in \Psi}$$

$$\left\| (u(H(x_p, C_p, C_q) \cdot m_{p,q,r}^{(p)}) - u(H(x_q, C_p, C_q) \cdot m_{p,q,r}^{(q)})) \frac{1}{d(C_p - C_q)} - (u(H(x_p, C_p, C_r) \cdot m_{p,q,r}^{(p)}) - u(H(x_r, C_p, C_r) \cdot m_{p,q,r}^{(q)})) \frac{1}{d(C_p - C_r)} \right\|$$

$$\text{with } \|x\| = \sum_i x_i^2$$

wherein argmin denotes the minimization criteria and p, q and r denote indices of individual cameras (1, 2, 3, ... N). $C_p$, $C_q$, $C_r$ denote camera positions of cameras p, q and r, $d(C_p-C_q)$ is a distance between the camera positions, $x_p$, $x_q$ and $x_r$ are vectors with parameters to be determined so as to minimizing the error for camera p, q and r, H(•) is a function providing a homography matrix undistorting points according to a parameter vector $x_p$ and camera positions $C_p$ and $C_q$, $m_{p,q}=[m^{(p)}_{p,q} \ m^{(q)}_{p,q}]$ denotes a set of reference points wherein $m^{(p)}_{p,q}$ corresponds to the respective reference points in camera p, $m_{p,q,r}=[m^{(p)}_{p,q,r} \ m^{(q)}_{p,q,r} \ m^{(r)}_{p,q,r}]$ denotes a set of reference points wherein $m^{(p)}_{p,q,r}$ corresponds to the respective reference points in camera p, Functions $u(\bullet)$ and $v(\bullet)$ extract the horizontal/vertical component of an image point respectively, the set $\Omega$ comprises all pairs of partially overlapping images; the set $\psi$ comprises triplets of partially overlapping images;

such that each of the N cameras considered in the minimization problem is comprised in at least one pair of cameras contained in $\Omega$ and at least in one triplet of cameras contained in $\psi$.

4. The apparatus according to one of previous aspects, wherein the analyzing unit is configured to determine the displacement information minimizing an error of a linearized first minimization criteria, wherein for a 2D camera pattern the linearized first minimization criteria is based on the determination rule;

$$\operatorname*{argmin}_{x_1, x_2, x_3, \ldots, x_N} \sum_{(p,q) \in \Omega} [J^{(p)}_{p,q} | J^{(q)}_{p,q}] \cdot \begin{bmatrix} x_p^T \\ x_q^T \end{bmatrix} + b_{p,q}$$

wherein $$(v(H(x_p, C_p, C_q) \cdot m^{(p)}_{p,q}) - v(H(x_q, C_p, C_q) \cdot m^{(q)}_{p,q}))^2 \approx$$

$$[J^{(p)}_{p,q} | J^{(q)}_{p,q}] \cdot \begin{bmatrix} x_p^T \\ x_q^T \end{bmatrix} + b_{p,q}$$

wherein the determining unit is configured to determine the offset information minimizing an error of a linearized second minimization criteria, wherein for the 2D camera pattern the linearized second minimization criteria is based on the determination rule $$\operatorname*{argmin}_{x_1, x_2, x_3, \ldots, x_N} \sum_{(p,q,r) \in \Psi} [J^{(p)}_{p,q,r} \ J^{(q)}_{p,q,r} \ J^{(r)}_{p,q,r}] \cdot \begin{bmatrix} x_p^T \\ x_q^T \\ x_r^T \end{bmatrix} + b_{p,q,r}$$

Wherein $$\left( (u(H(x_p, C_p, C_q) \cdot m^{(p)}_{p,q,r}) - u(H(x_q, C_p, C_q) \cdot m^{(q)}_{p,q,r})) \frac{1}{d(C_p - C_q)} - \right.$$

$$\left. (u(H(x_p, C_p, C_r) \cdot m^{(p)}_{p,q,r}) - u(H(x_r, C_p, C_r) \cdot m^{(q)}_{p,q,r})) \frac{1}{d(C_p - C_r)} \right)^2 \approx$$

$$[J^{(p)}_{p,q,r} \ J^{(q)}_{p,q,r} \ J^{(r)}_{p,q,r}] \cdot \begin{bmatrix} x_p^T \\ x_q^T \\ x_r^T \end{bmatrix} + b_{p,q,r}$$

Wherein argmin denotes the minimization criteria p, q and r denote indices of individual cameras, $C_p$, $C_p$, $C_r$ denote camera positions of cameras p, q and r, $d(C_p-C_q)$ is a distance between the camera positions, $H(\bullet)$ is a function providing a homography matrix undistorting points according to a parameter vector $x_p$ and camera positions $C_p$ and $C_q$, corresponding to camera p with parameter vector $x_p$, $x_q$ and $x_r$ are vectors with parameters to be determined so as to minimizing the error for camera p, q and r, $m_{p,q}=[m^{(p)}_{p,q} \ m^{(q)}_{p,q}]$ denotes a set of reference points wherein $m^{(p)}_{p,q}$ corresponds to the respective reference points in camera p, $m_{p,q,r}=[m^{(p)}p,q,r \ m^{(q)}_{p,q,r} \ m^{(r)}_{p,q,r}]$ denotes a set of reference points wherein $m^{(p)}_{p,q,r}$ corresponds to the respective reference points in camera p, the set $\Omega$ comprises all pairs of partially overlapping images; the set $\psi$ comprises triplets of partially overlapping images; such that each of the N cameras considered in the minimization problem is comprised in at least one pair of cameras contained in $\Omega$ and in at least one triplet of cameras contained in $\psi$. Functions $u(\bullet)$ and $v(\bullet)$ extract the horizontal/vertical component of an image point respectively. $J_{p,q}=[J^{(p)}_{p,q} \ J^{(q)}_{p,q}]$ and $J_{p,q,r}=[J^{(p)}_{p,q,r} \ J^{(q)}_{p,q,r} \ J^{(r)}_{p,q,r}]$ denote the Jacobi matrices for camera pairs and camera triplets, respectively. $J^{(p)}_{p,q}$ and $J^{(p)}_{p,q,r}$ denote sub-matrices corresponding to a camera p. $b_{p,q}$ and $b_{p,q,r}$ denote residual elements.

5. The apparatus according to one of previous aspects, wherein the analyzing unit is configured to determine the displacement information minimizing an error of a first minimization criteria, wherein for a 3D camera pattern the first minimization criteria is based on the determination rule;

$$\operatorname*{argmin}_{x_1, x_2, x_3, \ldots, x_N} \sum_{(p,q) \in \Omega} \|v(H(x_p, C_p, C_q) \cdot m^{(p)}_{p,q}) - v(H(x_q, C_p, C_q) \cdot m^{(q)}_{p,q})\|$$

with $\|x\| = \sum_l x_l^2$ wherein the determining unit is configured to determine the offset information minimizing an error of a second minimization criteria, wherein for the 3D camera pattern the second minimization criteria is based on the determination rule $$\operatorname*{argmin}_{x_1, x_2, x_3, \ldots, x_N} \sum_{(p,q,r) \in \Psi} \|g(x_p, x_q, x_r)\|$$

with $\|x\| = \sum_l x_l^2$ wherein $g(x_p, x_q, x_r) :=$ $$[\tilde{H}(x_q) \cdot m_q]_x \cdot (u_p^\# \cdot T_{(p,q,r),1} + v_p^\# \cdot T_{(p,q,r),2} + T_{(p,q,r),3}) \cdot [\tilde{H}(x_r) \cdot m_r]_x$$

wherein $m^\# = [u_p^\# \ v_p^\# \ 1]^T = \tilde{H}(x_p) \cdot m$ wherein argmin denotes the minimization criteria, and p, q and r denote indices of individual cameras (1, 2, 3, ... N), $C_p$, $C_p$ denote camera positions of cameras p and q, $d(C_p-C_q)$ is a distance between the camera positions, $H(\bullet)$ is a function providing a homography matrix undistorting points according to a parameter vector $x_p$ and camera positions $C_p$ and $C_q$, corresponding to camera p with parameter vector $x_p$, $x_q$, $x_r$ and $x_r$ are vectors with parameters to be determined so as to minimizing the error for camera p, q and r, $m_{p,q}=[m^{(p)}_{p,q} \ m^{(q)}_{p,q}]$ denotes a set of reference points wherein $m^{(p)}_{p,q}$ corresponds to the respective reference points in camera p, $m_{p,q,r}=[m^{(p)}p,q,r \ m^{(q)}p,q,r \ m^{(r)}p,q,r]$ denotes a set of reference points wherein $M^{(p)}_{p,q,r}$ corresponds to the respective reference points in camera p, Function v(•) extracts the vertical component of an image point, the set Ω comprises all pairs of partially overlapping images; the set ψ comprises triplets of partially overlapping images; such that each of the N cameras considered in the minimization problem is comprised at least in one pair of cameras contained in Ω and in at least one triplet of cameras contained in ψ. $T_{(p,q,r),i}$ represents a matrix representing the Trifocal Tensor corresponding to camera indices p, q, and r, $m_p^{\#}$ denotes a transformed point according to a homography matrix H wherein $u_p^{\#}$ and $v_p^{\#}$ denote the horizontal and vertical component of a point respectively, and g models the Trifocal Tensor as defined.

6. The apparatus according to one of previous aspects, wherein the analyzing unit is configured to determine the displacement information minimizing an error of a linearized first minimization criteria, wherein for a 3D camera pattern the linearized first minimization criteria is based on the determination rule;

$$\underset{x_1,x_2,x_3,\ldots,x_N}{\operatorname{argmin}} \sum_{(p,q)\in\Omega} [J_{p,q}^{(p)} | J_{p,q}^{(q)}] \cdot \begin{bmatrix} x_p^T \\ x_q^T \end{bmatrix} + b_{p,q}$$

wherein $$(v(H(x_p, C_p, C_q) \cdot m_{p,q}^{(p)}) - v(H(x_q, C_p, C_q) \cdot m_{p,q}^{(q)}))^2 \approx$$

$$[J_{p,q}^{(p)} | J_{p,q}^{(q)}] \cdot \begin{bmatrix} x_p^T \\ x_q^T \end{bmatrix} + b_{p,q}$$

wherein the determining unit is configured to determine the offset information minimizing an error of a linearized second minimization criteria, wherein for the 3D camera pattern the linearized second minimization criteria is based on the determination rule $$\underset{x_1,x_2,x_3,\ldots,x_N}{\operatorname{argmin}} \sum_{(p,q,r)\in\Psi} [J_{p,q,r}^{(p)} \quad J_{p,q,r}^{(q)} \quad J_{p,q,r}^{(r)}] \cdot \begin{bmatrix} x_p^T \\ x_q^T \\ x_r^T \end{bmatrix} + b_{p,q,r}$$

wherein $$(g(x_p, x_q, x_r))^2 =$$

$$\left([\tilde{H}(x_q) \cdot m_q]_x \cdot (u_p^{\#} \cdot T_{(p,q,r),1} + v_p^{\#} \cdot T_{(p,q,r),2} + T_{(p,q,r),3}) \cdot [\tilde{H}(x_r) \cdot m_r]_x\right)^2 \approx$$

$$[J_{p,q,r}^{(p)} \quad J_{p,q,r}^{(q)} \quad J_{p,q,r}^{(r)}] \cdot \begin{bmatrix} x_p^T \\ x_q^T \\ x_r^T \end{bmatrix} + b_{p,q,r}$$

wherein $$m_p^{\#} = [u_p^{\#} \quad v_p^{\#} \quad 1]^T = \tilde{H}(x_p) \cdot m$$

Wherein argmin denotes the minimization criteria p, q and r denote indices of individual cameras, $C_p$, $C_p$, $C_r$ denote camera positions of cameras p, q and r, H is a function providing a homography matrix (compare for Formula 17), corresponding to camera p with parameter vector $x_p$, $x_q$, and $x_r$, are vectors with parameters to be determined so as to minimizing the error for camera p, q and r, $m_{p,q}=[m^{(p)}_{p,q} \; m^{(q)}_{p,q}]$ denotes a set of reference points wherein $m^{(p)}_{p,q}$ corresponds to the respective reference points in camera p, $m_{p,q,r}=$ $[m^{(p)}_{p,q,r} \; M^{(q)}_{p,q,r} \; M^{(r)}_{p,q,r}]$ denotes a set of reference points wherein $M^{(p)}_{p,q,r}$ corresponds to the respective reference points in camera p, the set Ω comprises all pairs of partially overlapping images; the set ψ comprises triplets of partially overlapping images; such that each of the N cameras considered in the minimization problem is comprised in at least one pair of cameras contained in Ω and in at least one triplet of cameras contained in ψ, Functions u(•) and v(•) extract the horizontal/vertical component of an image point respectively, $J_{p,q}=[J^{(p)}_{p,q} \; J^{(q)}_{p,q}]$ and $J_{p,q,r}=[J^{(p)}p,q,r \; J^{(q)}p,q,r \; J^{(r)}p,q,r]$ denote the Jacobi matrices according to Formulas 22 & 23 and 61 & 62 for camera pairs and camera triplets, respectively, $J^{(p)}_{p,q}$ and $J^{(p)}_{p,q,r}$ denote sub-matrices corresponding to a camera p, $b_{p,q}$ and $b_{p,q,r}$ denote residual elements, $T_{(p,q,r),i}$ represents a matrix representing the Trifocal Tensor corresponding to camera indices p, q, and r, $m_p^{\#}$ denotes a transformed point according to a homography H wherein $u_p^{\#}$ and $v_p^{\#}$ denote the horizontal and vertical component of a point respectively.

7. The apparatus of one of preceding aspects, wherein the analyzing unit (24) is configured to determine the displacement information (34) pairwise for a pair of images of the plurality of images (14; 14a-i).

8. The apparatus of one of preceding aspects, wherein the analyzing unit (24) is configured to first determine the displacement information (34) along one of the first and the second direction (x, y) and to subsequently determine the displacement information (34) for the other direction.

9. The apparatus of one of preceding aspects, wherein the analyzing unit (24) is configured to determine the displacement information (34) along a first image direction independent from the displacement information (34) along a second image direction.

10. The apparatus of one of preceding aspects, wherein the calibration data (48) is based on angles (a, 8, y) that describe a rotation of the cameras (18a-i), to a focal length (f) of the cameras (18a-i) and to a principal point (42a-c) of the cameras (18a-i), wherein the calibration data (48) does not contain information indicating a position ($C_1$-$C_9$) of cameras of the plurality of camera positions (18a-i).

11. The apparatus of one of preceding aspects, further comprising at least one camera being configured to provide the plurality of images (14; 14a-i) from the plurality of camera positions (18a-i), wherein the apparatus is configured to determine a depth map of an object region comprising a plurality of subregions (22a-c), wherein the at least one camera (18a-i) is configured to provide the corresponding image (14a-i) by projecting one of the plurality of subregions (22a-c).

12. The apparatus of one of preceding aspects, further comprising at least one camera being configured to provide the plurality of images (14; 14a-i) from the plurality of camera positions (18a-i), wherein the apparatus is configured to apply the calibration data (48) to the plurality of images (14a-i) so as to obtain a plurality of calibrated images and to provide the calibrated of rectified images.

13. The apparatus of one of preceding aspects, wherein displacement information (34) referring to an image of the plurality of images (14a-i) comprises at least one of a shift of the image (14a-i) along a lateral direction (x, y) and a rotation of the image (14a-).

14. The apparatus of one of preceding aspects, wherein the set of images is a subset of the plurality of images (14a-i).

15. Camera system (80) comprising at least one camera being configured to provide a plurality of images (14; 14a-i) from a corresponding plurality of camera positions (18a-i) and comprising a memory (86) having stored thereon calibration information (48') derived from calibration data (48) generated from an apparatus according to one of previous aspects.
16. The camera system of aspect 15, further comprising an apparatus of one of aspects 1 to 11.
17. Method (500; 600) for obtaining calibration data, the method comprising:
   receiving (510; 612) a plurality of partially overlapping images of an object from a corresponding plurality of camera positions being arranged along a first and a second direction according to a camera pattern;
   selecting (520; 616) at least one corresponding reference point in an overlap area of a set of overlapping images, and determining a displacement information along the first and the second direction of the reference point in each of the other images of the set of images, such that a misalignment of the plurality of images along the first and the second direction is compensated by the displacement information so as to obtain aligned images;
   determining (530; 606) an offset information between principal points at the plurality of camera positions using at least three aligned images; and
   providing (540; 635) calibration data based on the displacement information and based on the offset information, the calibration data allowing for calibrating the plurality of images so as to comply to the camera pattern.
18. Non transitory storage medium having stored thereon a computer program having a program code for performing, when running on a computer, a method for obtaining calibration data according to aspect 17.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

LITERATURE

[1] Zilly F., Riechert C., Müller M., Waizenegger W., Kauff P., Determination of rectifying homographies for a camera array, EP2917895 A1, 2015
[2] Hartley R., Zissermann A., Multiple View Geometry, Cambridge University Press, 2003
[3] Wilburn B., Joshi N., Vaish V., Talvala E., Antunez E., Barth A., Adams A., Levoy M., Horowitz M., High Performance Imaging Using Large Camera Arrays, Proc. of ACM SIGGRAPH 2005, Vol. 24, No. 3, pp. 765-776, 2005
[4] Zhang Z., A flexible new technique for camera calibration, Pattern Analysis and Machine Intelligence, IEEE Transactions on, 22(11), 1330-1334
[5] Aerts M., Tytgat D., Macq J., Lievens S., Method and arrangement for multi-camera calibration, EP 2 375 376 B1, 2013
[6] Zilly F., Method for the automated analysis, control and correction of stereoscopic distortions and parameters for 3D-TV applications, TU Berlin, 2015, http://dx.doi.org/10.14279/depositonce-4618
[7] Zilly F., Riechert C., Müller M., Waizenegger W., Sikora T., Kauff P., Multi-camera rectification using linearized trifocal tensor, 21st International Conference on Pattern Recognition (ICPR), 2012
[8] Kurillo, G., Baker, H., Li, Z., & Bajcsy, R. (2013, June). Geometric and color calibration of multiview panoramic cameras for life-size 3D immersive video. In 3D Vision-3DV 2013, 2013 International Conference on (pp. 374-381). IEEE.

[9] Li, Z., Baker, H., Kurillo, G., & Bajcsy, R. (2010). Projective epipolar rectification for a linear multi-imager array. In 3DPVT.

The invention claimed is:

1. Apparatus comprising:
   a first interface for receiving a plurality of partially overlapping images of an object from a corresponding plurality of camera positions being arranged along a first and a second direction according to a two-dimensional or three-dimensional camera pattern, wherein patterns comprising camera positions that differ in two directions are two-dimensional patterns and patterns comprising camera positions that differ in three directions are three-dimensional patterns;
   an analyzing unit configured for selecting at least one corresponding reference point in an overlap area of a set of overlapping images, and for determining a displacement information along the first and the second direction of the reference point in each of the other images of the set of images, wherein a misalignment of the plurality of images along the first and the second direction is compensated by the displacement information so as to acquire aligned images;
   a determining unit configured for determining an offset information between principal points at the plurality of camera positions using at least three aligned images; and
   a second interface for providing calibration data based on the displacement information and based on the offset information, the calibration data allowing for calibrating the plurality of images so as to comply to the camera pattern;
   wherein the analyzing unit is configured to determine the displacement information minimizing an error of a first minimization criteria, wherein for a 2D camera pattern the first minimization criteria is based on the determination rule;

$$\operatorname*{argmin}_{x_1, x_2, x_3, \ldots, x_N} \sum_{(p,q) \in \Omega} \| v(H(x_p, C_p, C_q) \cdot m_{p,q}^{(p)}) - v(H(x_q, C_p, C_q) \cdot m_{p,q}^{(q)}) \|$$

with $\|x\| = \sum_i x_i^2$ wherein the determining unit is configured to determine the offset information minimizing an error of a second minimization criteria, wherein for the 2D camera pattern the second minimization criteria is based on the determination rule $$\operatorname*{argmin}_{x_1, x_2, x_3, \ldots, x_N} \sum_{(p,q) \in \Psi}$$

$$\left\| (u(H(x_p, C_p, C_q) \cdot m_{p,q,r}^{(p)}) - u(H(x_q, C_p, C_q) \cdot m_{p,q,r}^{(q)})) \frac{1}{d(C_p - C_q)} - \right.$$

$$\left. (u(H(x_p, C_p, C_r) \cdot m_{p,q,r}^{(p)}) - u(H(x_r, C_p, C_r) \cdot m_{p,q,r}^{(q)})) \frac{1}{d(C_p - C_r)} \right\|$$

with $\|x\| = \sum_i x_i^2$ wherein argmin denotes the minimization criteria and p, q and r denote indices of individual cameras. $C_p$, $C_q$, $C_r$ denote camera positions of cameras p, q and r, $d(C_p - C_q)$ is a distance between the camera positions, $x_p$, $x_q$ and $x_r$ are vectors with parameters to be determined so as to minimizing the error for camera p, q and r, H(•) is a function providing a homography matrix undistorting points according to a parameter vector $x_p$ and camera positions $C_p$ and $C_q$, $m_{p,q} = [m^{(p)}_{p,q} \; m^{(q)}_{p,q}]$ denotes a set of reference points wherein $m^{(p)}_{p,q}$ corresponds to the respective reference points in camera p, $m_{p,q,r} = [m^{(p)}_{p,q,r} \; m^{(q)}_{p,q,r} \; m^{(r)}_{p,q,r}]$ denotes a set of reference points wherein $m^{(p)}_{p,q,r}$ corresponds to the respective reference points in camera p, Functions u(•) and v(•) extract the horizontal/vertical component of an image point respectively, the set $\Omega$ comprises all pairs of partially overlapping images; the set $\psi$ comprises triplets of partially overlapping images;
such that each of the N cameras considered in the minimization problem is comprised in at least one pair of cameras comprised in $\Omega$ and at least in one triplet of cameras comprised in $\psi$; and/or
wherein the analyzing unit is configured to determine the displacement information minimizing an error of a linearized first minimization criteria, wherein for a 2D camera pattern the linearized first minimization criteria is based on the determination rule;

$$\operatorname*{argmin}_{x_1, x_2, x_3, \ldots, x_N} \sum_{(p,q) \in \Omega} [J^{(p)}_{p,q} | J^{(q)}_{p,q}] \cdot \begin{bmatrix} x_p^T \\ x_q^T \end{bmatrix} + b_{p,q}$$

wherein $$(v(H(x_p, C_p, C_q) \cdot m_{p,q}^{(p)}) - v(H(x_q, C_p, C_q) \cdot m_{p,q}^{(q)}))^2 \approx$$

$$[J^{(p)}_{p,q} | J^{(q)}_{p,q}] \cdot \begin{bmatrix} x_p^T \\ x_q^T \end{bmatrix} + b_{p,q}$$

wherein the determining unit is configured to determine the offset information minimizing an error of a linearized second minimization criteria, wherein for the 2D camera pattern the linearized second minimization criteria is based on the determination rule $$\operatorname*{argmin}_{x_1, x_2, x_3, \ldots, x_N} \sum_{(p,q,r) \in \Psi} [J^{(p)}_{p,q,r} \; J^{(q)}_{p,q,r} \; J^{(r)}_{p,q,r}] \cdot \begin{bmatrix} x_p^T \\ x_q^T \\ x_r^T \end{bmatrix} + b_{p,q,r}$$

wherein $$\left( (u(H(x_p, C_p, C_q) \cdot m_{p,q,r}^{(p)}) - u(H(x_q, C_p, C_q) \cdot m_{p,q,r}^{(q)})) \frac{1}{d(C_p - C_q)} - \right.$$

$$\left. (u(H(x_p, C_p, C_r) \cdot m_{p,q,r}^{(p)}) - u(H(x_r, C_p, C_r) \cdot m_{p,q,r}^{(q)})) \frac{1}{d(C_p - C_r)} \right)^2 \approx$$

$$[J^{(p)}_{p,q,r} \; J^{(q)}_{p,q,r} \; J^{(r)}_{p,q,r}] \cdot \begin{bmatrix} x_p^T \\ x_q^T \\ x_r^T \end{bmatrix} + b_{p,q,r}$$

wherein argmin denotes the minimization criteria p, q and r denote indices of individual cameras, $C_p$, $C_q$, $C_r$ denote camera positions of cameras p, q and r, $d(C_p - C_q)$ is a distance between the camera positions, H(•) is a function providing a homography matrix undistorting points according to a parameter vector $x_p$ and camera positions $C_p$ and $C_q$, corresponding to camera p with parameter vector $x_p$, $x_q$ and $x_r$, are vectors with parameters to be determined so as to minimizing the error for camera p, q and r, $m_{p,q}=[m^{(p)}{}_{p,q}\ m^{(q)}{}_{p,q}]$ denotes a set of reference points wherein $m^{(p)}{}_{p,q}$ corresponds to the respective reference points in camera p, $m_{p,q,r}=[m^{(p)}{}_{p,q,r}\ m^{(q)}{}_{p,q,r}\ m^{(r)}{}_{p,q,r}]$ denotes a set of reference points wherein $m^{(p)}{}_{p,q,r}$ corresponds to the respective reference points in camera p, the set $\Omega$ comprises all pairs of partially overlapping images; the set $\psi$ comprises triplets of partially overlapping images; such that each of the N cameras considered in the minimization problem is comprised in at least one pair of cameras comprised in $\Omega$ and in at least one triplet of cameras comprised in $\psi$, functions $u(\bullet)$ and $v(\bullet)$ extract the horizontal/vertical component of an image point respectively, $J_{p,q}=[J^{(p)}{}_{p,q}\ J^{(q)}{}_{p,q}]$ and $J_{p,q,r}=[J^{(p)}{}_{p,q,r}\ J^{(q)}{}_{p,q,r}\ J^{(r)}{}_{p,q,r}]$ denote the Jacobi matrices for camera pairs and camera triplets, respectively, $J^{(p)}{}_{p,q}$ and $J^{(p)}{}_{p,q,r}$ denote sub-matrices corresponding to a camera p, $b_{p,q}$ and $b_{p,q,r}$ denote residual elements.

2. The apparatus according to claim 1, wherein the apparatus is configured, for determining the displacement information, for using a feature detection and matching algorithm to detect references on pairs of images and for acquiring matched image coordinates between the images of the pair of images.

3. The apparatus according to claim 1, wherein the apparatus is configured for performing a self-calibration without imaging a calibration chart.

4. The apparatus according to claim 1, wherein the analyzing unit is configured for determining the displacement information using a set of parameters indicating a real condition of the camera pattern, the parameters comprising a non-linear relationship with respect to each other, wherein the analyzing unit is configured to use a linearized version of the set of parameters and to determine the displacement information by minimizing an error of the linearized version with respect to a desired condition of the camera pattern.

5. The apparatus according to claim 1, wherein the analyzing unit is configured to determine the displacement information minimizing an error of a first minimization criteria, wherein for a 3D camera pattern the first minimization criteria is based on the determination rule;

$$\operatorname*{argmin}_{x_1, x_2, x_3, \ldots, x_N} \sum_{(p,q) \in \Omega} \left\| v(H(x_p, C_p, C_q) \cdot m_{p,q}^{(p)}) - v(H(x_q, C_p, C_q) \cdot m_{p,q}^{(q)}) \right\| \text{ with } \|x\| = \sum_l x_l^2$$

wherein the determining unit is configured to determine the offset information minimizing an error of a second minimization criteria, wherein for the 3D camera pattern the second minimization criteria is based on the determination rule $$\operatorname*{argmin}_{x_1, x_2, x_3, \ldots, x_N} \sum_{(p,q,r) \in \Psi} \|g(x_p, x_q, x_r)\| \text{ with } \|x\| = \sum_l x_l^2$$

wherein $$g(x_p, x_q, x_r) := [\tilde{H}(x_q) \cdot m_q]_x \cdot (u_p^\# \cdot T_{(p,q,r),1} + v_p^\# \cdot T_{(p,q,r),2} + T_{(p,q,r),3}) \cdot [\tilde{H}(x_r) \cdot m_r]_x$$

wherein $$m^\# = [u_p^\# \ v_p^\# \ 1]^T = \tilde{H}(x_p) \cdot m$$

wherein argmin denotes the minimization criteria, and p, q and r denote indices of individual cameras, $C_p$, $C_q$ denote camera positions of cameras p and q, $d(C_p - C_q)$ is a distance between the camera positions, $H(\bullet)$ is a function providing a homography matrix undistorting points according to a parameter vector $x_p$ and camera positions $C_p$ and $C_q$, corresponding to camera p with parameter vector $x_p$, $x_q$, $x_q$ and $x_r$ are vectors with parameters to be determined so as to minimizing the error for camera p, q and r, $m_{p,q}=[m^{(p)}{}_{p,q}\ m^{(q)}{}_{p,q}]$ denotes a set of reference points wherein $m^{(p)}{}_{p,q}$ corresponds to the respective reference points in camera p, $m_{p,q,r}=[m^{(p)}{}_{p,q,r}\ m^{(q)}{}_{p,q,r}\ m^{(r)}{}_{p,q,r}]$ denotes a set of reference points wherein $m^{(p)}{}_{p,q,r}$ corresponds to the respective reference points in camera p, Function $v(\bullet)$ extracts the vertical component of an image point, the set $\Omega$ comprises all pairs of partially overlapping images; the set $\psi$ comprises triplets of partially overlapping images; such that each of the N cameras considered in the minimization problem is comprised at least in one pair of cameras comprised in $\Omega$ and in at least one triplet of cameras comprised in $\psi$, wherein $T_{(p,q,r),i}$ represents a matrix representing the Trifocal Tensor corresponding to camera indices p, q, and r, $m_p^\#$ denotes a transformed point according to a homography matrix H wherein $u_p^\#$ and $v_p^\#$ denote the horizontal and vertical component of a point respectively, g models the Trifocal Tensor as defined and $\tilde{H}(x_i)$ is a result of a multiplication of a center matrix K with a rotation matrix $R_i$ of camera i, correcting a camera's orientation such that it corresponds to its ideal orientation as given by an ideal camera setup and the center matrix K modelling a standard camera matrix, K being based on $$k = \begin{pmatrix} f_x & s & \tau_x \\ 0 & f_y & \tau_y \\ 0 & 0 & 1 \end{pmatrix}$$

with $f_x$ and $f_y$ denoting focal lengths along a first and a second direction, s denotes a skew factor and $\tau_x$ and $\tau_y$ denote deviations along the first and second direction.

6. The apparatus according to claim 1, wherein the analyzing unit is configured to determine the displacement information minimizing an error of a linearized first minimization criteria, wherein for a 3D camera pattern the linearized first minimization criteria is based on the determination rule;

$$\operatorname*{argmin}_{x_1, x_2, x_3, \ldots, x_N} \sum_{(p,q) \in \Omega} [J_{p,q}^{(p)} \mid J_{p,q}^{(q)}] \cdot \begin{bmatrix} x_p^T \\ x_q^T \end{bmatrix} + b_{p,q}$$

-continued wherein $$(v(H(x_p, C_p, C_q) \cdot m_{p,q}^{(p)}) - v(H(x_q, C_p, C_q) \cdot m_{p,q}^{(q)}))^2 \approx$$

$$[J_{p,q}^{(p)} \mid J_{p,q}^{(q)}] \cdot \begin{bmatrix} x_p^T \\ x_q^T \end{bmatrix} + b_{p,q}$$

wherein the determining unit is configured to determine the offset information minimizing an error of a linearized second minimization criteria, wherein for the 3D camera pattern the linearized second minimization criteria is based on the determination rule $$\underset{x_1, x_2, x_3, \ldots, x_N}{\operatorname{argmin}} \sum_{(p,q,r) \in \Psi} [J_{p,q,r}^{(p)} \ J_{p,q,r}^{(q)} \ J_{p,q,r}^{(r)}] \cdot \begin{bmatrix} x_p^T \\ x_q^T \\ x_r^T \end{bmatrix} + b_{p,q,r}$$

wherein $$(g(x_p, x_q, x_r))^2 = ([\tilde{H}(x_q) \cdot m_q]_x \cdot (u_p^\# \cdot T_{(p,q,r),1} + v_p^\# \cdot T_{(p,q,r),2} + T_{(p,q,r),3}) \cdot$$

$$[\tilde{H}(x_r \cdot m_r)_x] \approx [J_{p,q,r}^{(p)} \ J_{p,q,r}^{(q)} \ J_{p,q,r}^{(r)}] \cdot \begin{bmatrix} x_p^T \\ x_q^T \\ x_r^T \end{bmatrix} + b_{p,q,r}$$

wherein $$m_p^\# = [u_p^\# \ v_p^\# \ 1]^T = \tilde{H}(x_p) \cdot m$$

wherein argmin denotes the minimization criteria p, q and r denote indices of individual cameras, $C_p$, $C_p$, $C_r$ denote camera positions of cameras p, q and r, H is a function providing a homography matrix $$H(x_p, C_p, C_q) = R_0 \cdot K \cdot R_i = R_0 \tilde{H}(x_p)$$

with $\tilde{H}(x_p) = K \cdot R_i$ corresponding to camera p with parameter vector $x_p$, $x_q$, and $x_r$, are vectors with parameters to be determined so as to minimizing the error for camera p, q and r, $m_{p,q} = [m^{(p)}_{p,q} \ m^{(q)}_{p,q}]$ denotes a set of reference points wherein $m^{(p)}_{p,q}$ corresponds to the respective reference points in camera p, $m_{p,q,r} = [m^{(p)}_{p,q,r} \ m^{(q)}_{p,q,r} \ m^{(r)}_{p,q,r}]$ denotes a set of reference points wherein $M^{(p)}_{p,q,r}$ corresponds to the respective reference points in camera p, the set $\Omega$ comprises all pairs of partially overlapping images; the set $\psi$ comprises triplets of partially overlapping images; such that each of the N cameras considered in the minimization problem is comprised in at least one pair of cameras comprised in $\Omega$ and in at least one triplet of cameras comprised in $\psi$, Functions u(•) and v(•) extract the horizontal/vertical component of an image point respectively, $J_{p,q} = [J^{(p)}_{p,q} \ J^{(q)}_{p,q}]$ and $J_{p,q,r} = [J^{(p)}_{p,q,r} \ J^{(q)}_{p,q,r} \ J^{(r)}_{p,q,r}]$ denote the Jacobi matrices according to $$f(x,a) := Tf(x,a) = T \, F_{x,a}(1,0) = F_{x,a}(0) + F_{x,a}'(0)$$

$$F_{x,a} : \mathbb{R} \to \mathbb{R} := t \mapsto f(a+t \cdot (x-a))$$

and $$0 = [Tg_{1,1}(\chi,a), Tg_{1,2}(\chi,a), \ldots, Tg_{3,3}(\chi,a)]^T$$

$$0 = J \cdot \chi + b$$

for camera pairs and camera triplets, respectively, $J^{(p)}_{p,q}$ and $J^{(p)}_{p,q,r}$ denote sub-matrices corresponding to a camera p, $b_{p,q}$ and $b_{p,q,r}$ denote residual elements, $T_{(p,q,r),i}$ represents a matrix representing the Trifocal Tensor corresponding to camera indices p, q, and r, $m_p^\#$ denotes a transformed point according to a homography H, wherein $u_p^\#$ and $v_p^\#$ denote the horizontal and vertical component of a point respectively and $\tilde{H}(x_i)$ of camera i is a multiplication of a rotation matrix $R_i$ correcting a camera's orientation such that it corresponds to its ideal orientation as given by an ideal camera setup and a center matrix K modelling a standard camera matrix based on $$K = \begin{pmatrix} f_x & s & \tau_x \\ 0 & f_y & \tau_y \\ 0 & 0 & 1 \end{pmatrix}$$

with $f_x$ and $f_y$ denoting focal lengths along a first and a second direction, s denotes a skew factor and $\tau_x$ and $\tau_y$ denote deviations along the first and second direction; wherein $R_0$ is an outer rotation matrix, $R_i$ is an inner rotation matrix $R_i$ of camera i=p, $C_p$, $C_q$ denote camera positions of cameras p and q and $x_p$ relates to a vector, $F_{x,a}$ is a function of t that evaluates the function f(x) at the point a+t·(x−a), f(x) is the function to approximate at a point a, parameters to the function f(x) are comprised in the parameter vector x, wherein t is a scalar value, a is a vector with identical size as x, first order Taylor approximation T of a function f(x) at the point a is expressed as Taylor expansion of a scalar function $F_{x,a}(t)$, wherein $F_{x,a}$ is expanded at point $t_0=0$ by computing the function value of $F_{x,a}$ with $t_0=0$ and the value of the first order derivative $F_{x,a}'=F_{x,a}d/dt$ also at $t_0=0$, wherein T $g_{i,j}(\chi, a)$ denotes the Taylor approximation of a function g and indices in g denote an entry in a matrix returned by function g.

7. The apparatus of claim 1, wherein the analyzing unit is configured to determine the displacement information pairwise for a pair of images of the plurality of images.

8. The apparatus of claim 1, wherein the analyzing unit is configured to first determine the displacement information along one of the first and the second direction and to subsequently determine the displacement information for the other direction.

9. The apparatus of claim 1, wherein the analyzing unit is configured to determine the displacement information along a first image direction independent from the displacement information along a second image direction.

10. The apparatus of claim 1, wherein the calibration data is based on angles that describe a rotation of the cameras, to a focal length of the cameras and to a principal point of the cameras, wherein the calibration data does not comprise information indicating a position of cameras of the plurality of camera positions.

11. The apparatus of claim 1, further comprising at least one camera being configured to provide the plurality of images from the plurality of camera positions, wherein the apparatus is configured to determine a depth map of an object region comprising a plurality of subregions, wherein the at least one camera is configured to provide the corresponding image by projecting one of the plurality of subregions.

12. The apparatus of claim 1, further comprising at least one camera being configured to provide the plurality of images from the plurality of camera positions, wherein the apparatus is configured to apply the calibration data to the plurality of images so as to acquire a plurality of rectified images and to provide the plurality of rectified images.

13. The apparatus of claim 1, wherein displacement information referring to an image of the plurality of images comprises at least one of a shift of the image along a lateral direction and a rotation of the image.

14. The apparatus of claim 1, wherein the set of images is a subset of the plurality of images.

15. Camera system comprising at least one camera being configured to provide a plurality of images from a corresponding plurality of camera positions and comprising a memory having stored thereon calibration information derived from calibration data generated from an apparatus according to one of previous claims, wherein the calibration information is the calibration data or incorporates at least part thereof.

16. The camera system of claim 15, further comprising an apparatus of claim 1.

17. Method for acquiring calibration data, the method comprising:
- receiving a plurality of partially overlapping images of an object from a corresponding plurality of camera positions being arranged along a first and a second direction according to a two-dimensional or three-dimensional camera pattern, wherein patterns comprising camera positions that differ in two directions are two-dimensional patterns and patterns comprising camera positions that differ in three directions are three-dimensional patterns;
- selecting at least one corresponding reference point in an overlap area of a set of overlapping images, and determining a displacement information along the first and the second direction of the reference point in each of the other images of the set of images, such that a misalignment of the plurality of images along the first and the second direction is compensated by the displacement information so as to acquire aligned images;
- determining an offset information between principal points at the plurality of camera positions using at least three aligned images; and
- providing calibration data based on the displacement information and based on the offset information, the calibration data allowing for calibrating the plurality of images so as to comply to the camera pattern; and
- determining the displacement information minimizing an error of a first minimization criteria, wherein for a 2D camera pattern the first minimization criteria is based on the determination rule;

$$\underset{x_1,x_2,x_3,\ldots,x_N}{\operatorname{argmin}} \sum_{(p,q)\in\Omega} \left\| v(H(x_p, C_p, C_q) \cdot m_{p,q}^{(p)}) - v(H(x_q, C_p, C_q) \cdot m_{p,q}^{(q)}) \right\| \text{ with } \|x\| = \sum_l x_l^2$$

determining the offset information minimizing an error of a second minimization criteria, wherein for the 2D camera pattern the second minimization criteria is based on the determination rule $$\underset{x_1,x_2,x_3,\ldots,x_N}{\operatorname{argmin}} \sum_{(p,q,r)\in\Psi} \left\| (u(H(x_p, C_p, C_q) \cdot m_{p,q,r}^{(p)}) - u(H(x_q, C_p, C_q) \cdot m_{p,q,r}^{(q)})) \right.$$

$$\frac{1}{d(C_p - C_q)} - (u(H(x_p, C_p, C_r) \cdot m_{p,q,r}^{(p)}) -$$

$$\left. u(H(x_r, C_p, C_r) \cdot m_{p,q,r}^{(r)}))\frac{1}{d(C_p - C_r)} \right\| \text{ with } \|x\| = \sum_l x_l^2$$

wherein argmin denotes the minimization criteria and p, q and r denote indices of individual cameras. $C_p$, $C_q$, $C_r$ denote camera positions of cameras p, q and r, $d(C_p - C_q)$ is a distance between the camera positions, $x_p$, $x_q$ and $x_r$ are vectors with parameters to be determined so as to minimizing the error for camera p, q and r, $H(\bullet)$ is a function providing a homography matrix undistorting points according to a parameter vector $x_p$ and camera positions $C_p$ and $C_q$, $m_{p,q}=[m^{(p)}_{p,q}\ m^{(q)}_{p,q}]$ denotes a set of reference points wherein $m^{(p)}_{p,q}$ corresponds to the respective reference points in camera p, $m_{p,q,r}=[m^{(p)}_{p,q,r}\ m^{(q)}_{p,q,r}\ m^{(r)}_{p,q,r}]$ denotes a set of reference points wherein $m^{(p)}_{p,q,r}$ corresponds to the respective reference points in camera p, Functions $u(\bullet)$ and $v(\bullet)$ extract the horizontal/vertical component of an image point respectively, the set $\Omega$ comprises all pairs of partially overlapping images; the set $\psi$ comprises triplets of partially overlapping images;

such that each of the N cameras considered in the minimization problem is comprised in at least one pair of cameras comprised in $\Omega$ and at least in one triplet of cameras comprised in $\psi$; and/or determining the displacement information minimizing an error of a linearized first minimization criteria, wherein for a 2D camera pattern the linearized first minimization criteria is based on the determination rule;

$$\underset{x_1,x_2,x_3,\ldots,x_N}{\operatorname{argmin}} \sum_{(p,q)\in\Omega} [J_{p,q}^{(p)} \mid J_{p,q}^{(q)}] \cdot \begin{bmatrix} x_p^T \\ x_q^T \end{bmatrix} + b_{p,q}$$

wherein $$(v(H(x_p, C_p, C_q) \cdot m_{p,q}^{(p)}) - v(H(x_q, C_p, C_q) \cdot m_{p,q}^{(q)}))^2 \approx$$

$$[J_{p,q}^{(p)} \mid J_{p,q}^{(q)}] \cdot \begin{bmatrix} x_p^T \\ x_q^T \end{bmatrix} + b_{p,q}$$

determining the offset information minimizing an error of a linearized second minimization criteria, wherein for the 2D camera pattern the linearized second minimization criteria is based on the determination rule $$\underset{x_1,x_2,x_3,\ldots,x_N}{\operatorname{argmin}} \sum_{(p,q,r)\in\Psi} [J_{p,q,r}^{(p)}\ J_{p,q,r}^{(q)}\ J_{p,q,r}^{(r)}] \cdot \begin{bmatrix} x_p^T \\ x_q^T \\ x_r^T \end{bmatrix} + b_{p,q,r}$$

wherein $$\left((u(H(x_p, C_p, C_q) \cdot m_{p,q,r}^{(p)}) - u(H(x_q, C_p, C_q) \cdot m_{p,q,r}^{(q)}))\frac{1}{d(C_p - C_q)} - \right.$$

$$\left. (u(H(x_p, C_p, C_r) \cdot m_{p,q,r}^{(p)}) - u(H(x_r, C_p, C_r) \cdot m_{p,q,r}^{(r)}))\frac{1}{d(C_p - C_r)}\right)^2 \approx$$

$$[J_{p,q,r}^{(p)}\ J_{p,q,r}^{(q)}\ J_{p,q,r}^{(r)}] \cdot \begin{bmatrix} x_p^T \\ x_q^T \\ x_r^T \end{bmatrix} + b_{p,q,r}$$

wherein argmin denotes the minimization criteria p, q and r denote indices of individual cameras, $C_p$, $C_q$, $C_r$ denote camera positions of cameras p, q and r, $d(C_p-C_q)$ is a distance between the camera positions, $H(\cdot)$ is a function providing a homography matrix undistorting points according to a parameter vector $x_p$ and camera positions $C_p$ and $C_q$, corresponding to camera p with parameter vector $x_p$, $x_q$ and $x_r$ are vectors with parameters to be determined so as to minimizing the error for camera p, q and r, $m_{p,q} = [m^{(p)}_{p,q}\ m^{(q)}_{p,q}]$ denotes a set of reference points wherein $m^{(p)}_{p,q}$ corresponds to the respective reference points in camera p, $m_{p,q,r} = [m^{(p)}_{p,q,r}\ m^{(q)}_{p,q,r}\ m^{(r)}_{p,q,r}]$ denotes a set of reference points wherein $m^{(p)}_{p,q,r}$ corresponds to the respective reference points in camera p, the set $\Omega$ comprises all pairs of partially overlapping images; the set $\psi$ comprises triplets of partially overlapping images; such that each of the N cameras considered in the minimization problem is comprised in at least one pair of cameras comprised in $\Omega$ and in at least one triplet of cameras comprised in $\psi$, functions $u(\cdot)$ and $v(\cdot)$ extract the horizontal/vertical component of an image point respectively, $J_{p,q} = [J^{(p)}_{p,q}\ J^{(q)}_{p,q}]$ and $J_{p,q,r} = [J^{(p)}_{p,q,r}\ J^{(q)}_{p,q,r}\ J^{(r)}_{p,q,r}]$ denote the Jacobi matrices for camera pairs and camera triplets, respectively, $J^{(p)}_{p,q}$ and $J^{(p)}_{p,q,r}$ denote sub-matrices corresponding to a camera p, $b_{p,q}$ and $b_{p,q,r}$ denote residual elements.

18. A non-transitory digital storage medium having a computer program stored thereon to perform the method for acquiring calibration data, the method comprising:

receiving a plurality of partially overlapping images of an object from a corresponding plurality of camera positions being arranged along a first and a second direction according to a two-dimensional or three-dimensional camera pattern, wherein patterns comprising camera positions that differ in two directions are two-dimensional patterns and patterns comprising camera positions that differ in three directions are three-dimensional patterns;

selecting at least one corresponding reference point in an overlap area of a set of overlapping images, and determining a displacement information along the first and the second direction of the reference point in each of the other images of the set of images, such that a misalignment of the plurality of images along the first and the second direction is compensated by the displacement information so as to acquire aligned images;

determining an offset information between principal points at the plurality of camera positions using at least three aligned images; and providing calibration data based on the displacement information and based on the offset information, the calibration data allowing for calibrating the plurality of images so as to comply to the camera pattern; and determining the displacement information minimizing an error of a first minimization criteria, wherein for a 2D camera pattern the first minimization criteria is based on the determination rule;

$$\underset{x_1,x_2,x_3,\ldots,x_N}{\text{argmin}} \sum_{(p,q)\in\Omega} \left\| v(H(x_p, C_p, C_q)\cdot m^{(p)}_{p,q}) - v(H(x_q, C_p, C_q)\cdot m^{(q)}_{p,q}) \right\| \text{ with } \|x\| = \sum_l x_l^2$$

determining the offset information minimizing an error of a second minimization criteria, wherein for the 2D camera pattern the second minimization criteria is based on the determination rule $$\underset{x_1,x_2,x_3,\ldots,x_N}{\text{argmin}} \sum_{(p,q,r)\in\Psi} \left\| (u(H(x_p, C_p, C_q)\cdot m^{(p)}_{p,q,r}) - u(H(x_q, C_p, C_q)\cdot m^{(q)}_{p,q,r})) \frac{1}{d(C_p - C_q)} - (u(H(x_p, C_p, C_r)\cdot m^{(p)}_{p,q,r}) - u(H(x_r, C_p, C_r)\cdot m^{(r)}_{p,q,r})) \frac{1}{d(C_p - C_r)} \right\| \text{ with } \|x\| = \sum_l x_l^2$$

wherein argmin denotes the minimization criteria and p, q and r denote indices of individual cameras. $C_p$, $C_q$, $C_r$ denote camera positions of cameras p, q and r, $d(C_p-C_q)$ is a distance between the camera positions, $x_p$, $x_q$ and $x_r$ are vectors with parameters to be determined so as to minimizing the error for camera p, q and r, $H(\cdot)$ is a function providing a homography matrix undistorting points according to a parameter vector $x_p$ and camera positions $C_p$ and $C_q$, $m_{p,q} = [m^{(p)}_{p,q}\ m^{(q)}_{p,q}]$ denotes a set of reference points wherein $m^{(p)}_{p,q}$ corresponds to the respective reference points in camera p, $m_{p,q,r} = [m^{(p)}_{p,q,r}\ m^{(q)}_{p,q,r}\ m^{(r)}_{p,q,r}]$ denotes a set of reference points wherein $m^{(p)}_{p,q,r}$ corresponds to the respective reference points in camera p, Functions $u(\cdot)$ and $v(\cdot)$ extract the horizontal/vertical component of an image point respectively, the set $\Omega$ comprises all pairs of partially overlapping images; the set $\psi$ comprises triplets of partially overlapping images;

such that each of the N cameras considered in the minimization problem is comprised in at least one pair of cameras comprised in $\Omega$ and at least in one triplet of cameras comprised in $\psi$; and/or determining the displacement information minimizing an error of a linearized first minimization criteria, wherein for a 2D camera pattern the linearized first minimization criteria is based on the determination rule;

$$\underset{x_1,x_2,x_3,\ldots,x_N}{\text{argmin}} \sum_{(p,q)\in\Omega} [J^{(p)}_{p,q}\ |\ J^{(q)}_{p,q}] \cdot \begin{bmatrix} x_p^T \\ x_q^T \end{bmatrix} + b_{p,q}$$

wherein $$(v(H(x_p, C_p, C_q)\cdot m^{(p)}_{p,q}) - v(H(x_q, C_p, C_q)\cdot m^{(q)}_{p,q}))^2 \approx [J^{(p)}_{p,q}\ |\ J^{(q)}_{p,q}] \cdot \begin{bmatrix} x_p^T \\ x_q^T \end{bmatrix} + b_{p,q}$$

determining the offset information minimizing an error of a linearized second minimization criteria, wherein for the 2D camera pattern the linearized second minimization criteria is based on the determination rule $$\underset{x_1,x_2,x_3,\ldots,x_N}{\text{argmin}} \sum_{(p,q,r)\in\Psi} [J^{(p)}_{p,q,r}\ J^{(q)}_{p,q,r}\ J^{(r)}_{p,q,r}] \cdot \begin{bmatrix} x_p^T \\ x_q^T \\ x_r^T \end{bmatrix} + b_{p,q,r}$$

-continued $$\left( (u(H(x_p, C_p, C_q) \cdot m^{(p)}_{p,q,r}) - u(H(x_q, C_p, C_q) \cdot m^{(q)}_{p,q,r})) \frac{1}{d(C_p - C_q)} - \right.$$

$$\left. (u(H(x_p, C_p, C_r) \cdot m^{(p)}_{p,q,r}) - u(H(x_r, C_p, C_r) \cdot m^{(r)}_{p,q,r})) \frac{1}{d(C_p - C_r)} \right)^2 \approx$$

$$[J^{(p)}_{p,q,r} \ J^{(q)}_{p,q,r} \ J^{(r)}_{p,q,r}] \cdot \begin{bmatrix} x_p^T \\ x_q^T \\ x_r^T \end{bmatrix} + b_{p,q,r}$$

wherein argmin denotes the minimization criteria p, q and r denote indices of individual cameras, $C_p$, $C_q$, $C_r$ denote camera positions of cameras p, q and r, $d(C_p-C_q)$ is a distance between the camera positions, $H(\bullet)$ is a function providing a homography matrix undistorting points according to a parameter vector $x_p$ and camera positions $C_p$ and $C_q$, corresponding to camera p with parameter vector $x_p$, $x_q$ and $x_r$, are vectors with parameters to be determined so as to minimizing the error for camera p, q and r, $m_{p,q}=[m^{(p)}_{p,q} \ m^{(q)}_{p,q}]$ denotes a set of reference points wherein $m^{(p)}_{p,q}$ corresponds to the respective reference points in camera p, $m_{p,q,r}=[m^{(p)}_{p,q,r} \ m^{(q)}_{p,q,r} \ m^{(r)}_{p,q,r}]$ denotes a set of reference points wherein $m^{(p)}_{p,q,r}$ corresponds to the respective reference points in camera p, the set $\Omega$ comprises all pairs of partially overlapping images; the set $\psi$ comprises triplets of partially overlapping images; such that each of the N cameras considered in the minimization problem is comprised in at least one pair of cameras comprised in $\Omega$ and in at least one triplet of cameras comprised in $\psi$, functions $u(\bullet)$ and $v(\bullet)$ extract the horizontal/vertical component of an image point respectively, $J_{p,q}=[J^{(p)}_{p,q} \ J^{(q)}_{p,q}]$ and $J_{p,q,r}=[J^{(p)}_{p,q,r} \ J^{(q)}_{p,q,r} \ J^{(r)}_{p,q,r}]$ denote the Jacobi matrices for camera pairs and camera triplets, respectively, $J^{(p)}_{p,q}$ and $J^{(p)}_{p,q,r}$ denote sub-matrices corresponding to a camera p, $b_{p,q}$ and $b_{p,q}$ denote residual elements, when said computer program is run by a computer.

* * * * *

UNITED STATES PATENT AND TRADEMARK OFFICE
CERTIFICATE OF CORRECTION

PATENT NO.       : 10,803,624 B2
APPLICATION NO.  : 16/586077
DATED            : October 13, 2020
INVENTOR(S)      : Ziegler et al.

It is certified that error appears in the above-identified patent and that said Letters Patent is hereby corrected as shown below:

In the Claims

-- In Claim 1, Line 44, Column 51: "argmin$x1,x2, x3, …,xN$p,q$\in\Psi$ $uH(xp, Cp, Cq)\cdot mp,q,rp-uH(xq, Cp, Cq)\cdot mp,q,rq1d(Cp-Cq) -uH(xp, Cp, Cr)\cdot mp,q,rp-uH(xr, Cp, Cr)\cdot mp,q,rr1d(Cp-Cr)$"
Should read as: --argmin$x1,x2, x3, …,xN$p,q,r$\in\Psi$ $uH(xp, Cp, Cq)\cdot mp,q,rp-uH(xq, Cp, Cq)\cdot mp,q,rq1d(Cp-Cq) -uH(xp, Cp, Cr)\cdot mp,q,rp-uH(xr, Cp, Cr)\cdot mp,q,rr1d(Cp-Cr)$--

-- In Claim 5, Line 50, Column 54: "k=fxsτx0fyτy001"
Should read as: --*K=fxsτx0fyτy001*--

-- In Claim 6, Line 36, Column 55, the sixth formula: "$Hxp,Cp,Cq= R0 \cdot K \cdot Ri=R0Hxp$ with $Hxp=K\cdot Ri$"
Should read as: --*$Hxp,Cp,Cq= R0 \cdot K \cdot Ri=$R0·Hxp with Hxp=K·Ri*--

-- In Claim 6, Line 46, Column 55: "wherein M(p)p,q,r corresponds to …"
Should read as: --wherein m$^{(p)}_{p,q,r}$ corresponds to …--

-- In Claim 6, Line 60, Column 55, the seventh formula: "$fx,a:=Tfx,a=TFx,a1,0=Fx,a0+Fx,a'0$ $Fx,a:R\rightarrow R := t>fa+t\cdot x-a$"
Should read as: --*fx,a:=Tfx,a=TFx,a1,0=Fx,a0+Fx,a'0 Fx,a:R→ R := t→fa+t·x-a*--

-- In Claim 6, Line 36, Column 56: "$Fx,a'=Fx,addt$"
Should read as: --*Fx,a'=Fx,addt*--

-- In Claim 18, Line 19, Column 62: "…and b$_{p,q}$ denote …"
Should read as: --…and b$_{p,q,r}$ denote …--

Signed and Sealed this
Fourteenth Day of June, 2022

Katherine Kelly Vidal
*Director of the United States Patent and Trademark Office*